United States Patent
Wong

(10) Patent No.: US 7,345,860 B2
(45) Date of Patent: Mar. 18, 2008

(54) LOAD RECOGNITION AND SERIES ARC DETECTION USING LOAD CURRENT/LINE VOLTAGE NORMALIZATION ALGORITHMS

(75) Inventor: Kon B. Wong, Cedar Rapids, IA (US)

(73) Assignee: Square D Company, Palatine, IL (US)

( * ) Notice: Subject to any disclaimer, the term of this patent is extended or adjusted under 35 U.S.C. 154(b) by 226 days.

(21) Appl. No.: 11/326,012

(22) Filed: Jan. 5, 2006

(65) Prior Publication Data

US 2006/0114627 A1 Jun. 1, 2006

Related U.S. Application Data

(63) Continuation-in-part of application No. 10/436,671, filed on May 13, 2003, now Pat. No. 7,136,265, which is a continuation-in-part of application No. 10/107,621, filed on Mar. 27, 2002, now Pat. No. 7,068,480, which is a continuation-in-part of application No. 09/981,603, filed on Oct. 17, 2001, now Pat. No. 7,151,656.

(51) Int. Cl.
*H02H 3/16* (2006.01)

(52) U.S. Cl. .......................... 361/42; 361/44
(58) Field of Classification Search ............... 361/42, 361/43, 44
See application file for complete search history.

(56) References Cited

U.S. PATENT DOCUMENTS

| | | | |
|---|---|---|---|
| 5,223,795 | A | 6/1993 | Blades |
| 5,839,092 | A | 11/1998 | Erger et al. |
| 6,590,754 | B1 | 7/2003 | Macbeth |
| 2001/0033469 | A1 | 10/2001 | Macbeth |
| 2001/0040458 | A1 | 11/2001 | Macbeth et al. |
| 2004/0042137 | A1 | 3/2004 | Wong et al. |

*Primary Examiner*—Robert L. Deberadinis
*Assistant Examiner*—Danny Nguyen

(57) ABSTRACT

A method and system for determining whether arcing is present in an electrical circuit. The methods includes sensing a change in an alternating current in the circuit and developing a corresponding input signal, analyzing the input signal to determine the presence of broadband noise in a predetermined range of frequencies, and producing a corresponding output signal. The method further includes determining a type of load connected to the electrical circuit, based at least in part upon the input signal and the output signal, incrementing one or more of a plurality of counters in a predetermined fashion in accordance with the input signal and the output signal and determining whether an arcing fault is present based at least in part on the states of one or more of a plurality of counters. The method also includes decrementing one or more of the plurality of counters based upon a secondary analysis.

20 Claims, 71 Drawing Sheets

Update_History_Buffers

Store_Half_Cycle_Results

LOAD RECOGNITION AND SERIES ARC DETECTION USING LOAD CURRENT/LINE VOLTAGE NORMALIZATION ALGORITHMS

CROSS-REFERENCE TO RELATED APPLICATION

This is a continuation-in-part of U.S. patent application Ser. No. 10/436,671, filed May 13, 2003, now U.S. Pat. No. 7,136,265 entitled "Load Recognition and Series Arc Detection Using Bandpass Filter Signatures," which is a continuation-in-part of U.S. patent application Ser. No. 10/107,621, filed Mar. 27, 2002, now U.S. Pat. No. 7,068,480 entitled "Arc Detection Using Load Recognition, Harmonic Content and Broadband Noise", which is a continuation-in-part of U.S. patent application Ser. No. 09/981,603, filed Oct. 17, 2001, now U.S. Pat. No. 7,151,656 entitled "Arc Fault Circuit Interrupter System".

FIELD OF THE INVENTION

The present invention relates to the protection of electrical circuits and, more particularly, to the detection of electrical faults of the type known as arcing faults in an electrical circuit.

BACKGROUND OF THE INVENTION

The electrical systems in residential, commercial and industrial applications usually include a panelboard for receiving electrical power from a utility source. The power is then routed through protection devices to designated branch circuits supplying one or more loads. These overcurrent devices are typically circuit interrupters such as circuit breakers and fuses which are designed to interrupt the electrical current if the limits of the conductors supplying the loads are surpassed.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector ("series" arcs), or, between two conductors supplying a load, or between a conductor and ground ("parallel" arcs). However, arcing faults may not cause a conventional circuit breaker to trip. Arcing fault current levels may be reduced by branch or load impedance to a level below the trip curve settings of the circuit breaker. In addition, an arcing fault which does not contact a grounded conductor or person will not trip a ground fault protector.

There are many conditions that may cause an arcing fault. For example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and/or cause the conductor to reach an unacceptable temperature.

The present invention concerns detection of low current series arcs that occur within the normal operating range of household appliances and/or low current series arc fault detection that is within the handle rating of the protection device (e.g., a household circuit breaker).

U.S. Pat. No. 6,008,973 (commonly assigned) based largely on slope changes in the load current and does not look at specific sub harmonic, broadband noise content and/or utilize load recognition. In contrast, this invention uses sub harmonic content, broadband noise and load recognition to set thresholds and select arc signatures.

In our above-referenced application (pending U.S. patent application Ser. No. 10/107,621, filed Mar. 27, 2002) frequency was monitored at half cycle intervals for broadband noise, primarily in 33 KHz and 58 KHz bands. We have discovered that certain load types, such as a light dimmer load, have certain high frequency characteristics which can be used to develop algorithms to detect, for example, approximately what phase angle the light dimmer is set at and to use the appropriate arcing algorithms to detect arcing for that particular dimmer setting. We have found that the high frequency component of a typical light dimmer wave form will occur primarily on the rising edge of the current wave form. During arcing, noise is not localized to the rising edge of the current waveform, however. Therefore, this characteristic can be used to better distinguish arcing from normal operating noise. Also, in some load types, during arcing conditions, noise is present only where the current is non-zero; however, during arcing, currents are zero around the voltage zero crossings. High frequency noise is therefore essentially zero at these areas of the wave form. We have found that this generally holds true for any arcing in any type of load.

Furthermore, in the present invention, we have discovered that monitoring high frequency noise in a 20 KHz band at ⅛ line cycle intervals may be used to obtain improved load recognition using arc detection methods and apparatus described in the above-referenced parent applications.

The invention may be applied to residential, commercial, industrial applications for circuit protection against series arc faults.

SUMMARY OF THE INVENTION

In accordance with one aspect of the present invention, a method of determining whether arcing is present in an electrical circuit is provided. The method includes sensing a change in current in said circuit and developing a corresponding input signal. The input signal is analyzed to determine the presence of broadband noise in a predetermined range of frequencies, and producing a corresponding output signal. The type of load connected to the electrical circuit is determined. The determination is based at least in part upon the input signal and the output signal. One or more of a plurality of counters is incremented in a predetermined fashion in accordance with the input signal and the output signal.

In accordance with another aspect of the invention, a system for determining whether arcing is present in an electrical circuit comprises a sensor for sensing an alternating current in the circuit and developing a corresponding sensor signal, a circuit for analyzing the sensor signal to determine the presence of broadband noise in a predetermined range of frequencies, and producing a corresponding output signal, and a controller for processing the sensor signal and the output signal to determine current characteristics and a type of load connected to the electrical circuit.

The controller also determines, using the load current characteristics and the presence of broadband noise, whether an arcing fault is present in the circuit. The system also includes at least one counter that is incremented in a predetermined fashion in accordance with the input signal and the output signal. The at least one counter is adapted to be decremented based upon a secondary analysis. The controller is also adapted to determine whether an arcing fault is present based at least in part on the states of the at least one counter.

In accordance with another aspect of the invention, there is provided a method of determining whether arcing is present in an electrical circuit in response to input signals, the input signals corresponding to an alternating current in the circuit and to the presence of broadband noise in a predetermined range of frequencies in the circuit. The method comprises incrementing one or more of a plurality of counters in accordance with the input signals, decrementing the one or more of the plurality of counters in accordance with a result of a secondary factor, determining a type of load connected to the electrical circuit and whether an arcing fault is present using the states of one or more of the plurality of counters, and monitoring high frequency noise in the 20 KHz band for each ⅛ cycle of the alternating current.

DETAILED DESCRIPTION OF THE ILLUSTRATED EMBODIMENT

Figure 1A:
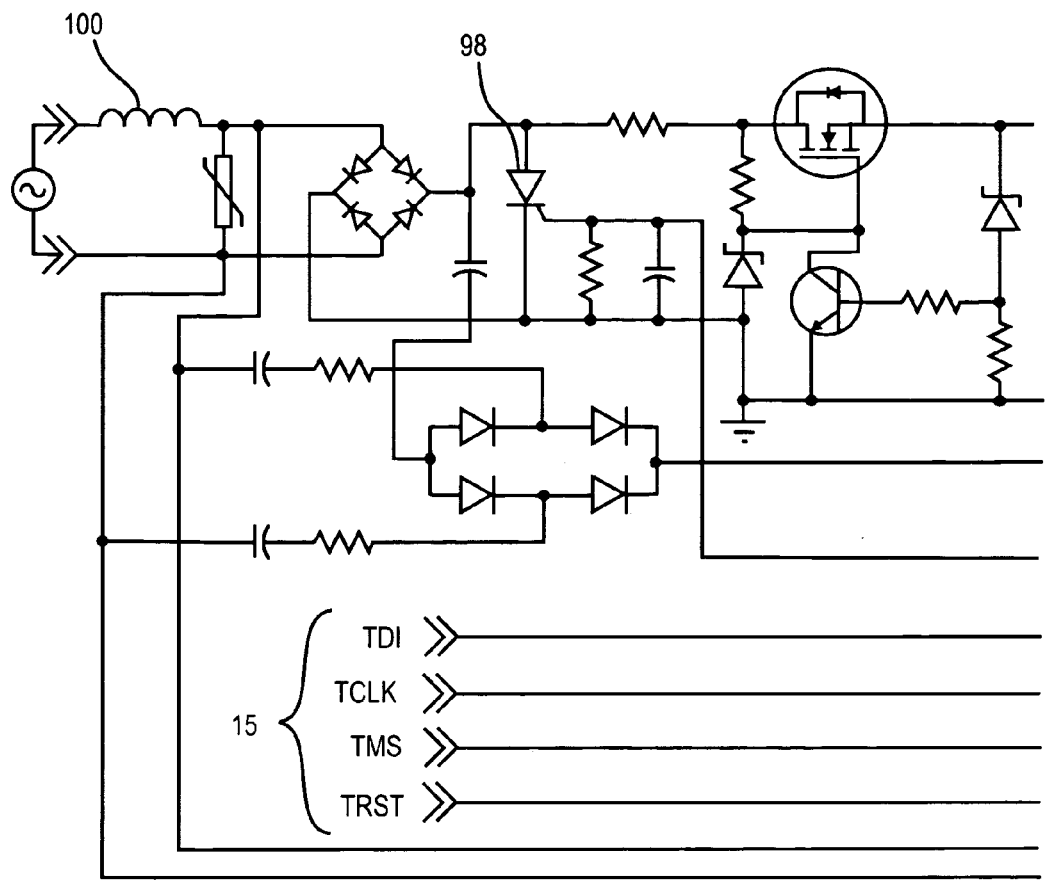
FIGS. 1a and 1b form a circuit schematic of an arc fault circuit interrupter system in accordance with the invention.
Figure 1A:
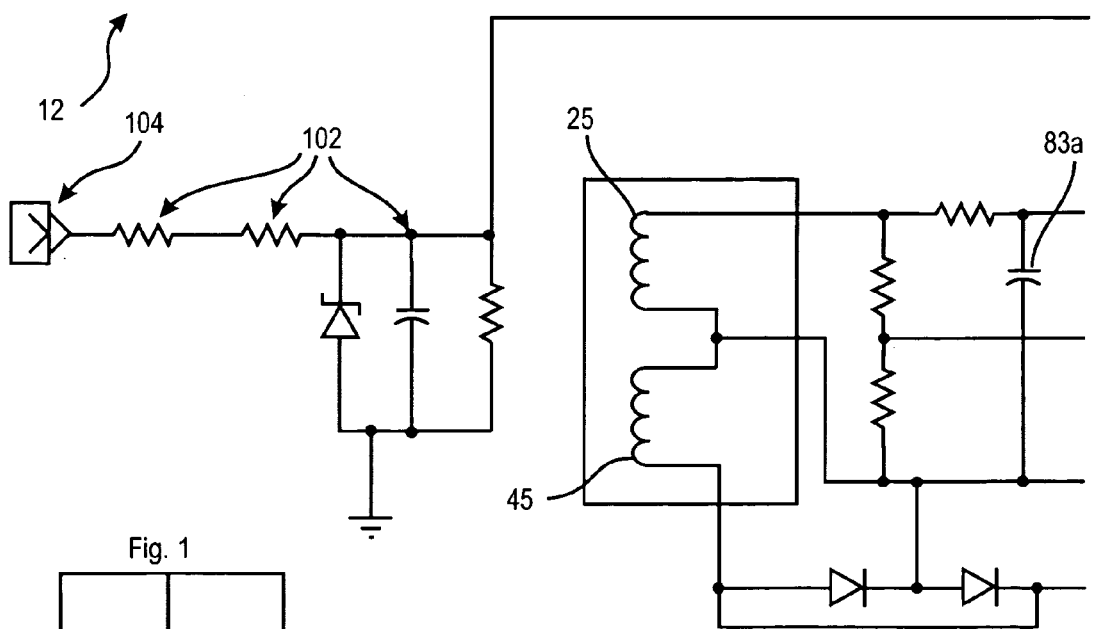
Figure 1B:
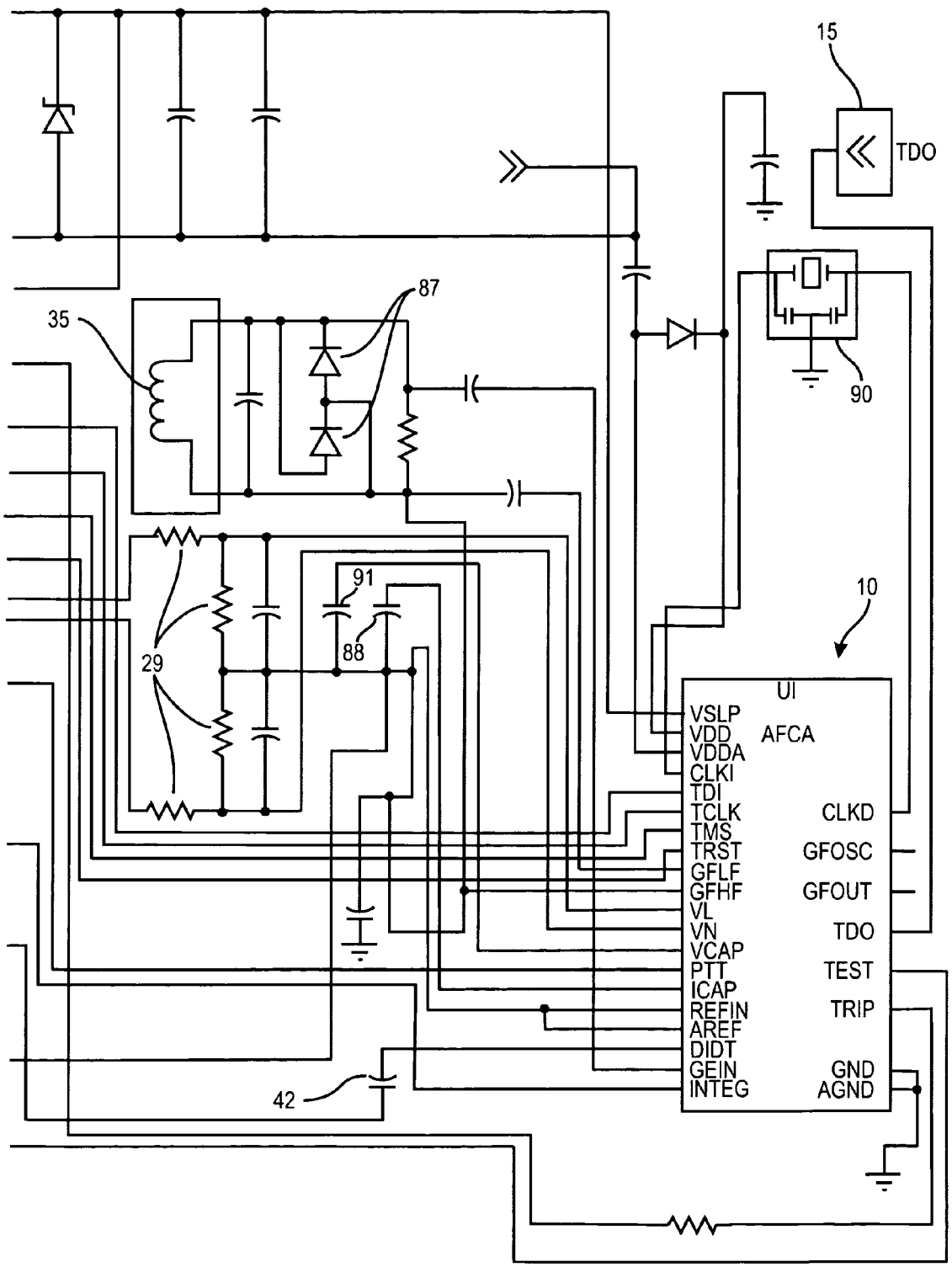

This invention pertains to the use of a system on chip solution for arc fault detection primarily for use in circuit breakers or electrical outlet receptacles, or other electrical devices, typically but not limited to the 15 or 20 ampere size. Referring to FIGS. 1a and 1b, this microchip 10, when incorporated on an electronic printed wiring board 12 with a minimum of external components, provides arc fault detection and tripping of the host wiring device.

Figure 2:
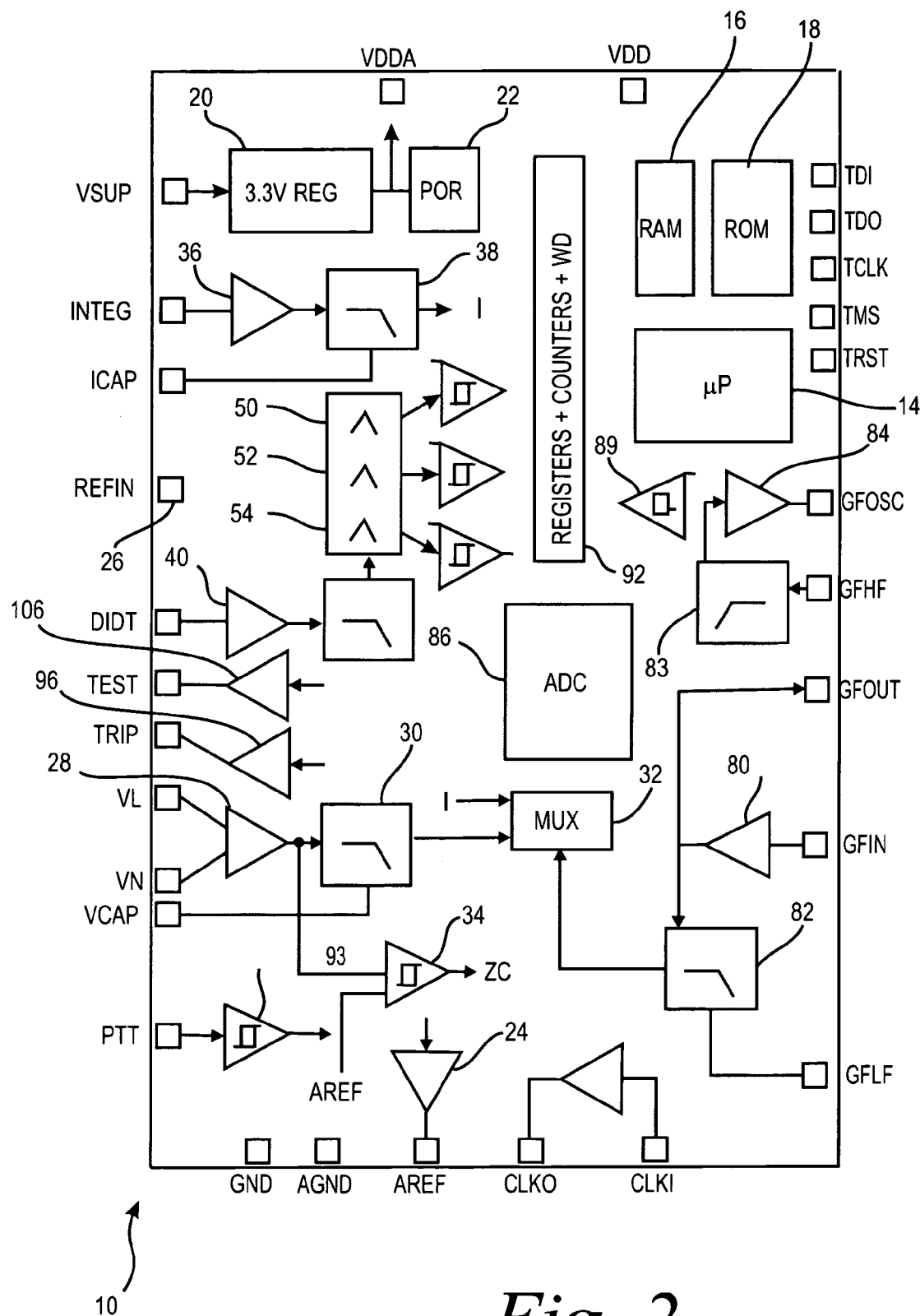
FIG. 2 is a functional diagram showing further details of an application specific integrated circuit chip which forms a part of a system of FIG. 1.

The system on chip is an application specific integrated circuit which combines analog and digital signal processing on a single microchip. A block diagram is shown in FIG. 2.

The "system on chip" 10 monitors line voltage and current in the host device and analyzes them for the presence of an arc fault. If certain arc detection criteria are met as determined by an arcing algorithm embedded within the software of a microcontroller's 14 memory 18, the chip signals an external SCR98 causing it to disconnect the device from the load.

The ASIC generally includes a processor or microcontroller 14, memories, amplifier stages, filters, A/D converter, analog multiplexer, a voltage regulator and power on reset circuit. The tasks of the ASIC are: measure line voltage, detect voltage zero crossings, measure 60 Hz line current, measure ground fault current, detect ground loops (grounded neutral) in neutral line, detect high frequency components of line current, provide voltage regulation for all ASIC circuits, detect presence of a signal to commence self test, generate a self test high frequency current source, provide under voltage reset (POR) for the microcontroller, provide a trip signal to fire a trip solenoid driver, provide a watchdog to reset the microcontroller, and make a trip decision based on embedded code in the microcontroller.

The ASIC can operate in two different modes:

The "normal" mode corresponds to the mode where the processor 14 is the master. In normal mode, the microprocessor controls the data conversion rate (A-to-D), counters, interruptions and data memories. The microprocessor executes code stored in a ROM memory. Moreover, the microprocessor controls the activity of all analog blocks by forcing "power down" signal in order to limit the power dissipation. This mode is the normal operation mode of the ASIC.

The "slave" mode corresponds to the mode where the processor 14 is the slave and is controlled by a standard communication channel (e.g., a JTAG) interface or port 15 (see FIGS. 1a and 1b). Two main operations can be done in this mode using the JTAG interface 15: debug mode, and register values and data transfer. The JTAG port can be used to couple a personal computer (PC) or other external processor to the ASIC, using the processor 14 of the ASIC as a slave processor. This permits interrogation of the ASIC counters, registers, etc. as well as rewriting to memories, registers, etc. of the ASIC. The JTAG ports 15 include data in/out ports (TDI, TDO), and reset (TRST), clock (TCLK) and mode select (TMS) ports.

The processor 14, in one embodiment, is the ARM7TDMI from ARM company. The ARM has a boundary scan circuit around its interface which is used for production test or for connection to an in-circuit emulator (ICE) interface (i.e., the JTAG) for system and software debugging. The JTAG interface is accessible via the pins TDI, TDO, TMS, TCK and TRST and behaves as specified in the JTAG specification.

The processor is 32 bits wide and has a CPU frequency of 12 MHz. An external resonator 90 (FIG. 1b) has a frequency of 24 MHz which is divided by two for the CPU. The microprocessor analyzes the current, ground fault and di/dt signals and by means of an arc detection algorithm makes a trip decision, using the presence of broadband noise and the current signature and rise time (di/dt). One such algorithm is described in U.S. Pat. No. 6,259,996, issued Jul. 10, 2001 to which reference is invited. While the line voltage is fed to the microprocessor, it may be optionally used by the algorithm to effect various levels of arc is detection as dictated by the embedded software. The microprocessor uses the zero crossing signal to synchronize the arc detection algorithm with line voltage.

There are different clock domains in the ASIC: A clock for the ARM, the bus controller and the memories. The microprocessor clock frequency is 12 MHz. Clocks for the peripherals (counters, watchdog, ADC, BP filters) are 4 MHz, 1 MHz and 250 KHz frequencies. These clocks are fixed and derived from the ARM clocks.

There are two memory domains. The program memory, which contains the software for the ARM operation, the program memory space contains a 10 kb ROM (2560 words of 32 bits), and the program memory start address is 0000:0000hex. The data memory 16 contains the program data and consists of two RAMs of 128 bytes×16 bits for a total of 512 bytes. The memory access can be 32 bits or 16 bits wide. The ARM selects the access mode. The data memory start address is 0004:0000hex. In addition to the memories, the processor can also access registers. The register memory start address is 0008:0000hex.

The various functional blocks (see FIG. 2) and their respective operation is described briefly below:

A 3.3V regulator 20 provides a finely regulated DC power source for use by the analog and digital sections of the chip. The input to the chip need only be roughly regulated to within coarse limits, for example 4 to 7 volts.

The POR or power on reset circuit 22 senses the chip's regulated voltage supply and holds the microcontroller in a reset state if the voltage is below a safe operating limit.

The analog reference circuit (AREF) 24 provides a reference point for the input signals at the midpoint of the analog power supply to allow the amplified signals to swing both positive and negative. The AREF is externally connected to the REFIN pin 26.

A V1/n differential amplifier 28 differentially measures line voltage at the terminals of the host device via an externally located voltage divider 29 (FIG. 1b). The voltage signal is low pass filtered as shown at the low pass filter block 30 to remove high frequency noise or harmonics and to provide anti-aliasing. The filtered signal is sent to a first channel of a multiplexer 32 and also to the input of a zero crossing detector 34. The output voltage at VCAP pin and an external capacitor 91 (FIG. 1b) provides an anti-aliasing low-pass filter (LPF) for the A/D converter 86. The typical differential input range at the inputs is +/−0.65V.

A comparator 34 at the output of the line voltage differential amplifier 28 detects zero crossings (ZC) in the line voltage for use in synchronizing an arc detection algorithm.

An amplifier 36 at the INTEG input amplifies the externally integrated output of a di/dt sensor before it is lowpass filtered 38 for anti-aliasing and sent to a second channel of the multiplexer 32 previously referenced.

The output of a di/dt sensor 25 (see FIG. 1) monitoring line current through the host device is connected to the input of a di/dt amplifier 40 after first being high pass filtered by filter capacitors 42 (FIG. 1b) to remove the 60 Hz component. The di/dt signal is amplified at amplifier 40 and sent to the input of three bandpass filters 50, 52, 54. Broadband noise in the 10 KHz to 100 KHz range appearing at the DIDT input is one indicator of the presence of arcing.

Figure 3:
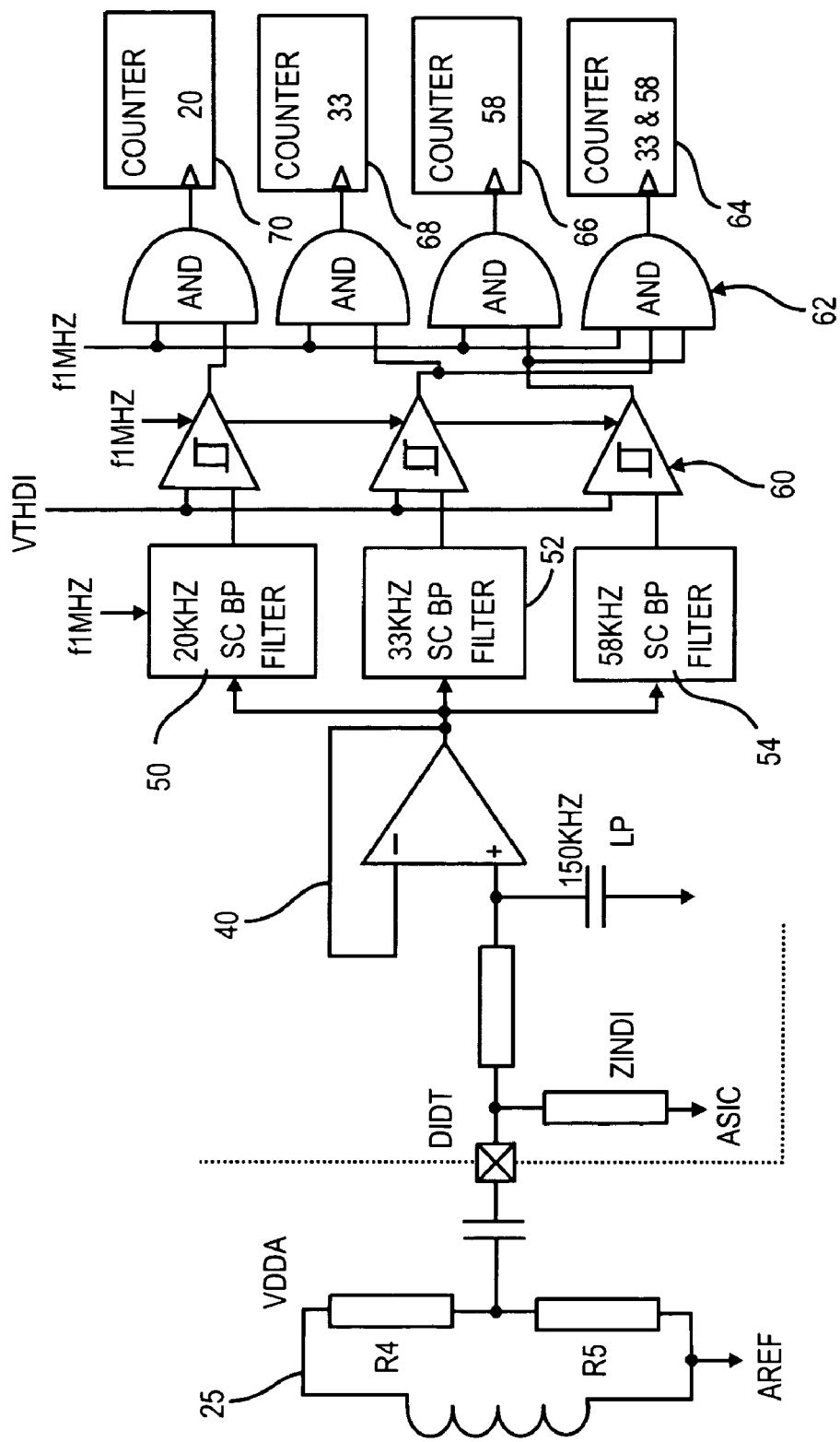
FIG. 3 is a functional block diagram illustrating operation of a digital circuit portion of the chip of FIG. 2.

FIG. 3 shows a more detailed block diagram of the di/dt sensing system. Three switched cap (SC) bandpass filters (BPF) 50, 52, 54 set respectively at 20, 33 and 58 KHz, filter the di/dt signal to determine if there is broadband noise in the line current. The output of the filters is monitored by a set of comparators 60 whose outputs change state when a predetermined threshold is exceeded. The microprocessor 14 (FIG. 2) monitors the state of each filter's comparator individually and also the logically ANDed output at AND gates 62 of the 33 and 58 KHz filters to determine the presence of broadband noise. The comparator 60 outputs and the AND gates 62 are synchronized by the same clock (f=1 MHz) as the switched capacitor bandpass filters 50, 52 54. It should be noted that the ANDing of the comparator outputs with the clock insures that the components of high frequency in the passbands of both the 33 KHz and 58 KHz filters must be simultaneously present and of sufficient amplitude in order to be considered broadband noise and therefore be counted by the 33/58 counter. Separate counters are provided for future use, for counting the components in the passbands of the 20 KHz, 33 KHz and 58 KHz BPF's, respectively.

The ASIC provides an amplification of the di/dt input signal and performs analog signal processing. As described above, the signal going through three independent switched-cap bandpass filters (BP) (20, 33 and 58 KHz) is compared to a fixed threshold reference voltage in both directions (positive and negative). The 20 KHz BP has a typical quality factor Q of 4. Both 33 and 58 KHz BP have typical Q of 8. The outputs of the comparators control separate counters. The ANDed boolean combination of 33 and 58 KHz BP comparator outputs controls a $4^{th}$ counter as shown in FIG. 3. All comparator outputs are synchronized on the switched-cap clock (1 MHz) and are stable during each period of 1 μs. The counters can be reset or disable by software. An anti-aliasing filter is placed in the first stage. The cut-off frequency is typically 150 KHz. The sampling clock frequency of bandpass filters is $F_{1MHz}$. Clamping anti-parallel diodes are placed between AREF and DIDT pins internal to the ASIC.

The Z-domain function of the switched-cap bandpass filters can be described by the following expression:

$$Y_i = a(X_i - X_{i-1}) - b\, Y_{i-1} - c\, Y_{i-2}$$

Where $X_i$ and $Y_i$ are, respectively, the $i^{th}$ samples of input and output voltages and a, b and c are the filter coefficients.

| Coefficient of normalized BP | 20 KHz | 33 KHz | 58 KHz |
|---|---|---|---|
| a | 0.031 | 0.026 | 0.047 |
| b | −1.953 | −1.932 | −1.825 |
| c | 0.969 | 0.974 | 0.952 |

The output of a ground fault sensing transformer 35 (FIG. 1b) is connected to the input of a GFIN amplifier 80 (FIG. 2), which has a high gain to amplify the small output from the sensor. The ground fault signal is amplified and lowpass filtered (82) (FIG. 2) for anti-aliasing before being fed to the third channel of the multiplexer 32 (FIG. 2).

Figure 4:
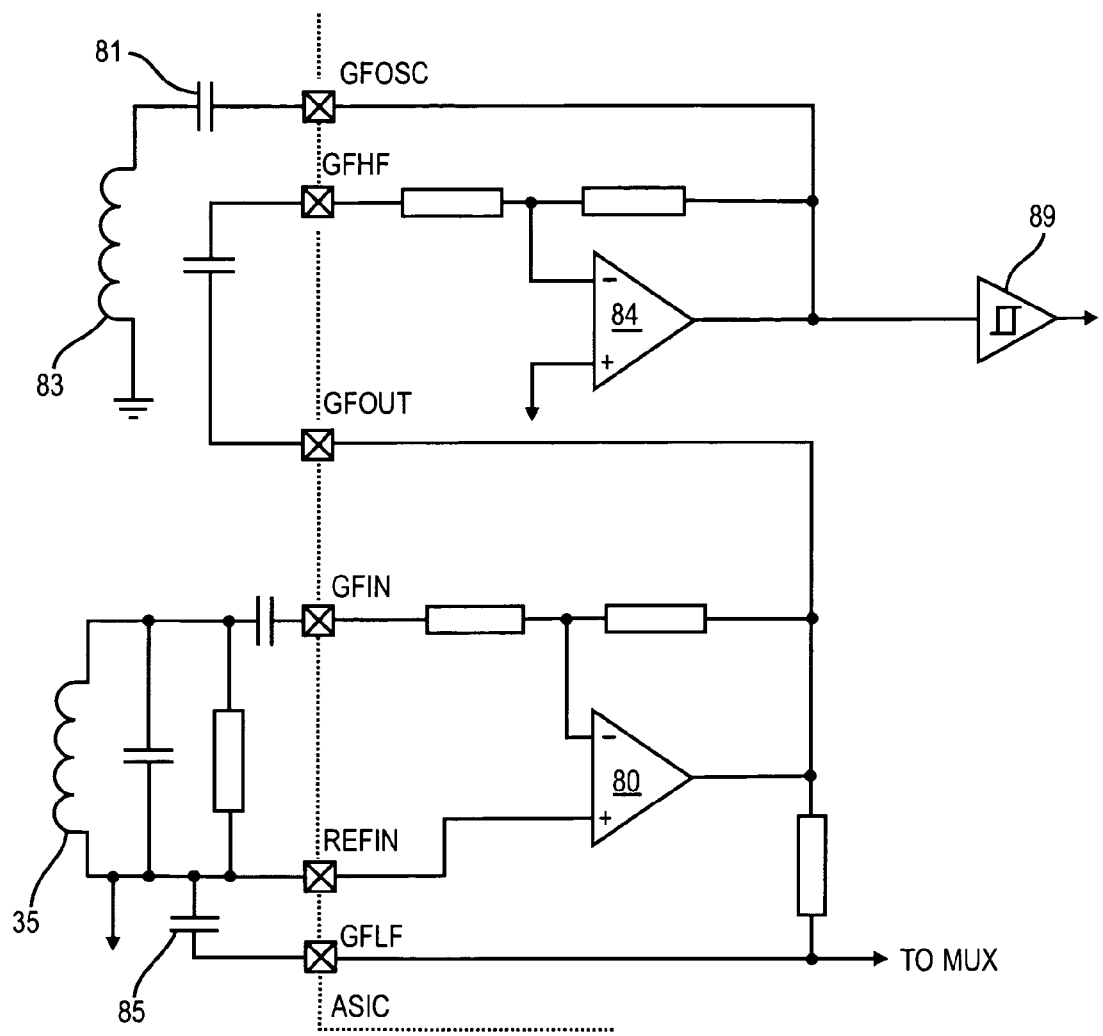
FIG. 4 is a circuit schematic of a signal processing circuit which forms a part of the chip of FIG. 1b.

Referring also to FIG. 4, this circuit performs an amplification and anti-aliasing low pass (LP) filtering of the ground fault (GF) input voltage before A-to-D conversion and provides high pass (HP) filtering and amplification for the grounded neutral detection at pin GFOSC. The first gain stage 80 is a current-to-voltage converter providing signal for both low and high pass filters 82, 83 (FIG. 2). The 3 dB bandwidth of the high pass filter will be typical 15 KHz. The LP and HP filters are made by internal resistors and external capacitors 81 and 85 respectively. Clamping anti-parallel diodes 87 (see FIG. 1b) are placed between AREF and GFIN pins for transient protection.

The chip 10 has provision for personnel level ground fault protection when provided with a grounded neutral sensing transformer 83 (FIG. 4) as well as the 5 mA ground fault transformer 35 (FIG. 4). To make this feature functional, the output GFOUT may be coupled by means of a capacitor 81 to the input of GFHF. GFOSC is then capacitively coupled to the winding of the neutral sensing transformer 83. When thus connected, this forms a dormant oscillator neutral detection system, including second opamp 84 and comparator 89. The function of the second amplifier 84 at GFHF is to provide the total loop gain necessary to put the dormant oscillator into oscillation when a sufficiently low resistance grounded neutral condition exists.

The multiplexer 32 (FIG. 2) alternately selects between the three channel inputs, i.e., current, line voltage or ground fault and passes the selected signal to the input of an analog to digital (A/D) converter (ADC) 86 (FIG. 2). The analog to digital converter 86 is a single channel sigma delta converter which alternately digitizes the current, line voltage and ground fault signals for analysis by the microprocessor.

The line current signal at ASIC pin INTEG is obtained by an external low-pass filter 83a placed in the output of the di/dt coil 25 (FIG. 1a). The ASIC amplifies the INTEG signal. An anti-aliasing LP filter is obtained by an external capacitor 88 (FIG. 1b) placed at ICAP pin before A-to-D conversion stage.

The watchdog (WD) 92 monitors the operation of the ARM microprocessor 14. If the software does not reset the watchdog counter at periodic times, the watchdog generates a hard reset of the microprocessor. Alternately, it could be used to cause a trip condition. The watchdog is based on a 15 bit wide periodic counter which is driven by the 250 KHz clock. The counter is reset by software with the WDG_RST address. Writing a 1 on this address resets the counter. As noted, the watchdog must be reset only in a specific time window, otherwise a hard reset is generated. If the watchdog is reset before the counter reaches 2^14 or if the counter is not reset before the counter reaches 2^15, the watchdog reset is generated for the ARM and for the WD counter.

To allow the ARM to check the watchdog value, the MSB (bit 14) can be read and if the value is 1, the processor must reset the counter.

When the watchdog generates a reset, a specific register is set to indicate that a watchdog reset has occurred. This register value can be read even after the reset.

When a trip decision is reached, a trip signal buffer 96 latches and drives the gate of an SCR 98 of an external firing circuit (FIG. 1a). In order to conserve stored energy during the trip sequence, the microprocessor is halted and portions of the analog circuitry are disabled. The SCR 98 is connected in series with a trip coil 100. In the ON state, the SCR 98 causes the coil 100 to be momentarily shorted across the line to mechanically de-latch the contacts of the host device and to subsequently interrupt flow of current.

The push to test (PTT) circuit 102 monitors the status of a push to test (PTT) button 104. When the push to test button is depressed, line voltage is applied through an external voltage divider in circuit 102 to the PTT input of the chip 10. The circuit senses that a system test is being requested and signals the microprocessor to enter a test mode. The activation of the test button 104 (not part of the ASIC) is detected by the PTT comparator 93 (FIG. 2) as a voltage at a PTT (Push-to-Test) pin.

With the microprocessor in the test mode, test signal buffer 106 acts as a current source driving a test winding 45 (FIG. 1a) of the di/dt sensor with a sharply rising and falling edge square wave at each of the center frequencies of the bandpass filters, namely 20 KHz (when used), 33 KHz and 58 KHz in turn.

| Name | Type | Description |
|---|---|---|
| VSUP | Power | High positive ASIC supply voltage |
| VDDA | Power | Analog positive ASIC supply voltage and regulator output |
| VDD | Power | Digital positive ASIC supply voltage (input) |
| AGND | Power | Analog ground |
| GND | Power | Digital ground |
| INTEG | Analog | Input for Current measurement |
| ICAP | Analog | Input for LP filter |
| REFIN | Analog | Input sense of reference voltage |
| AREF | Analog | Analog reference output |
| DIDT | Analog | Input for DIDT measurement |
| TEST | Analog | Test output signal |
| TRIP | Analog | Trip output signal |
| VL | Analog | Input for voltage measurement |
| VN | Analog | Input for voltage measurement |
| VCAP | Analog | Input for LP filter |
| PTT | Analog | PTT Input signal |
| CLKI | Analog | Input clock of quartz |
| CLKO | Analog | Output clock of quartz |
| GFIN | Analog | Input signal for GF measurement |
| GFOUT | Analog | Output of gain stage |
| GFLF | Analog | Input for LP filter |
| GFHF | Analog | Input for HP filter |
| GFOSC | Analog | Output of GF dormant gain stage |
| TDI | Digital-in | Data in |
| TDO | Digital-out | Data out |
| TCLK | Digital-in | Clock in |
| TMS | Digital-in | Select in |
| TRST | Digital-in | Reset in (active low) |

Additional Operational Description

The ground fault detection feature's primary purpose is to detect arcing to ground, in the incipient stages of arcing, where a grounding conductor is in the proximity of the faulty line conductor. Such detection and tripping can clear arc faults before they develop into major events. As discussed earlier, by the use of appropriate ground fault and neutral sensing transformers, this feature can be used to provide personnel protection as well as arc to ground detection.

When the push to test button 104 is depressed, line voltage is applied to push to test circuit 102 in such a way as to cause ground fault current to flow through the ground fault sensing transformer 83 and simultaneously force the microcontroller 14 into the test mode as described previously. The microprocessor monitors the output of both the ground fault detection circuitry and the output of the bandpass filters (caused by the test buffer driving the test winding) to determine if the bandpass filter detection circuitry is functional. Only if counters 66 and 68 have sufficiently high counts and sufficiently high ground fault signal peaks are present, will a trip signal be given.

A calibration routine allows the microprocessor 14 to compensate for the offset voltages generated by each of the operational amplifiers in the line voltage, current and ground fault measurement circuits. Immediately following power up and at periodic intervals (to update the data, e.g., to compensate for thermal drift), the microprocessor initiates a calibration procedure. During this time period, the line voltage and current measurement circuits are internally disconnected from their respective input terminals and each of the operational amplifiers is connected in turn to analog reference voltage (AREF) 24. The respective offset voltages (one for each op amp) are then read by the microprocessor and their values are stored in memory. The stored offset voltages are subtracted from the measured signal values by the software. The ground fault offset is measured by internally shorting the first stage amplifier (80) gain setting resistors and reading the offset voltage on an external AC coupling capacitor directly from the input. The software subtracts this value from the measured signal value.

Residential type circuit breakers incorporating arc fault circuit protection require a very small printed wiring board with low power dissipation. Arc fault circuit interruption requires significant analog and digital signal processing in order to reliably distinguish between arc faults and electrically noisy loads, such as arcs from light switches and universal motors. In a previous embodiment, such processing was achieved using a separate analog ASIC (application specific integrated circuit) and a microcontroller.

The system on chip design provides a reduced package size, approximately ⅓ reduction, as well as a reduction in external components required. The combination of reduced parts and part placement results in a significant cost reduction and ease of assembly. Bandpass filter performance is more consistent, offset voltage correction is improved, test circuit performance is improved, and ground fault personnel protection can be provided.

Using load current, rate of rise of the load current (di/dt) and system line voltage, the invention detects series arcing conditions in household appliance cords and electrical wiring. Using load current, rate of rise of the load current (di/dt) and system line voltage inputs the method presented below will recognize the load if one is present, use the appropriate arc detection algorithms that match the load and determine if there are arcing signatures. When arcing signatures are detected, a trip signal is initiated and opens the circuit breaker, disabling the arcing source.

The described embodiment of the invention is for 15 A or 20 A household branch circuit breakers but the invention is not so limited.

We have found that series arc signatures are different with different types of loads in series with the arc. We have found that the best way to detect series arcing is to first categorize the signature of the load current and then look for arcing signatures for that type of load. We have found that most residential loads can be categorized, by their wave shape and phase relationship, into eight categories. We have designated these categories: "compressors," "computers," "computers and resistive," "brush motor," "light dimmer," "light dimmer and resistive," "variable speed motors" and "resistive." Even though these load type designations were used, others may be included or substituted, without departing from the invention.

We have achieved improved arc detection times and improved resistance to nuisance trips using the below-described technique. This technique is described hereinbelow in connection with a number of flowcharts briefly described above and which will be more fully described hereinbelow. In particular, in addition to the technique described in our above-referenced parent applications, we have found that the use of the high gain low queue factor 20 KHz bandpass filter divided into ⅛ line cycle increments offers additional improvement in some types of load. That is, using the high-resolution high frequency components at each ⅛ line cycle and looking for the presence of high frequency components at different locations of the line cycle, provides improved arc detection and resistance to nuisance tripping. Depending on the load type, the signature for the high frequency components will be different under normal load conditions, such as start up, and steady state conditions, from that under arcing conditions.

In particular, we have discovered with some loads such as a typical vacuum cleaner load, that a high gain low queue filter bandpass filter will have a constant non-zero output. However, during series arcing of such a load, the continuous filter output will go to zero near the voltage zero crossings when the arcing current is zero. During arcing, there will be no high frequency components when the currents are zero, which occur randomly in arcing events, whereas during normal running loads the high frequency components are generally more uniform. Thus, using a high gain, low queue filter and dividing the line cycle into multiple sections, we have found that improved arc detection can be achieved.

Figure 5A:
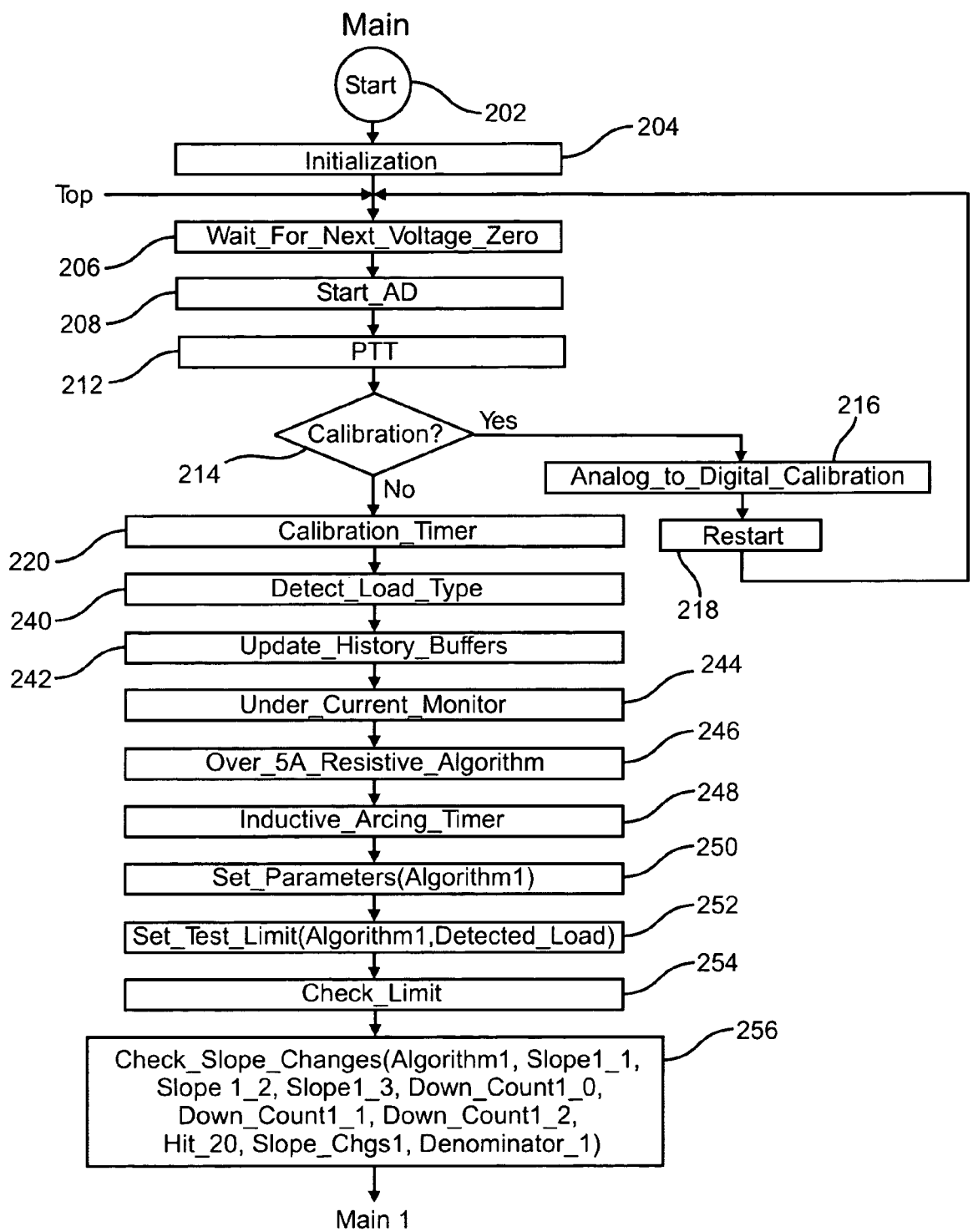
FIGS. 5A-5C are flowcharts showing operation of a main program sequence in accordance with the invention.
Figure 5B:
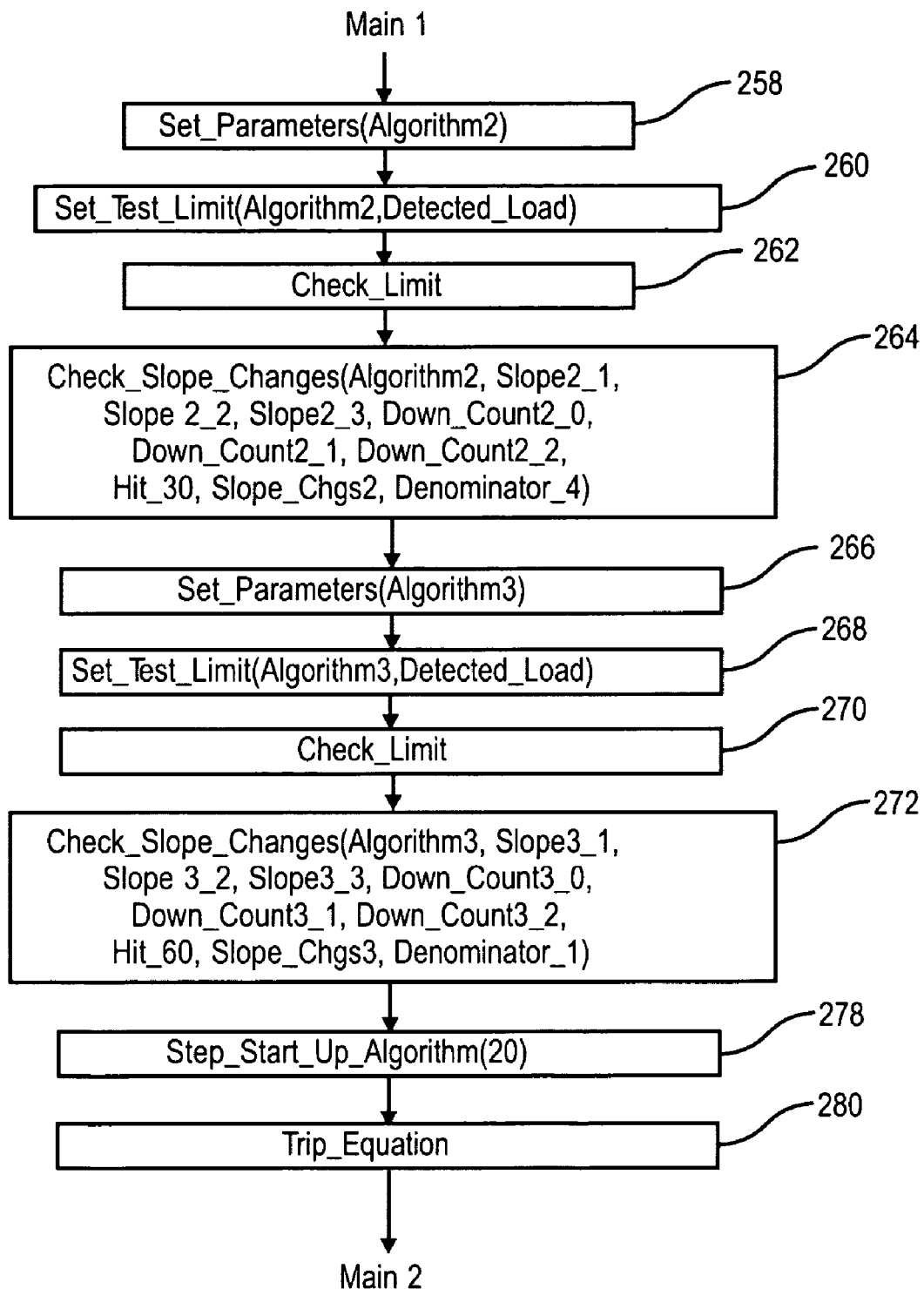
Figure 5C:
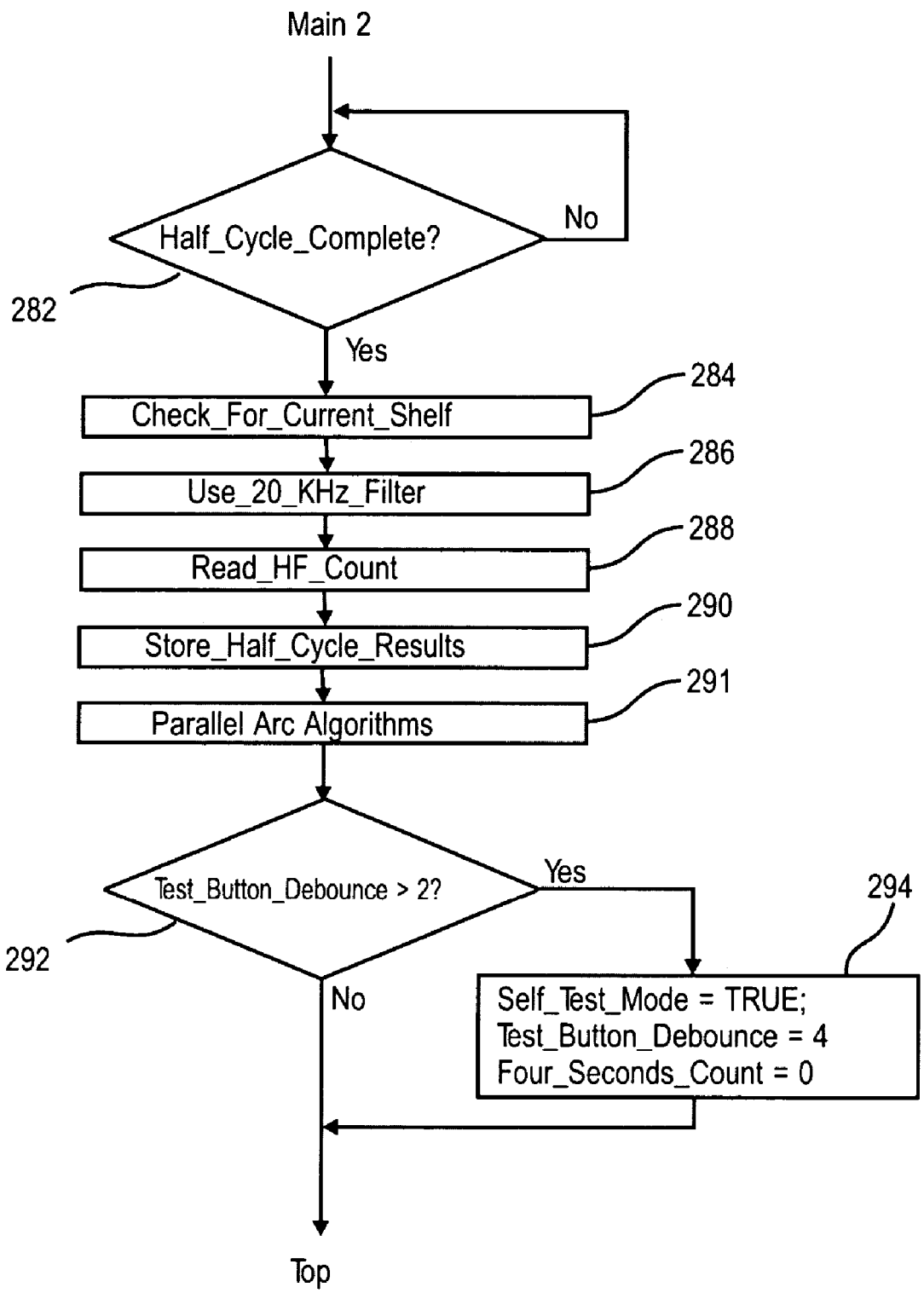

Referring now to FIGS. 5A-5C, a main program sequence at a start 202 initializes 204 the microprocessor or controller (see FIG. 6), and then waits 206 for the next zero voltage crossing of monitored current and then starts A/D conversion 208. A self test or push to test (PTT) mode 212 is then enabled which, if called for and successful, energizes a trip solenoid to trip a breaker.

In addition to the foregoing, the flowcharts briefly described above and more fully discussed hereinbelow offer some additional improvements over those disclosed in our above-referenced copending application (Ser. No. 10/107,621, filed Mar. 27, 2002). One aim in the present application was to improve code efficiency and also to recompile the coding and modules for use with an improved processor type. In the embodiment described hereinabove, the processor, may be of a type designated ARM7TDMI provided by the ARM Company (Advanced Reduced Instruction Set Computer (IRSC) Machine) which is essentially code provided for the ASIC vendor to permit the ASIC carry out the arc detection in accordance with the invention.

Referring now again to FIGS. 5A-5C, the main program sequence then sequences through a number of other modules, further details of which are shown in the following figures of drawing. Briefly, these include a detect load type module 240, shown in FIGS. 7A-7J, an update history buffers module 242, shown in FIG. 8 and an undercurrent monitor module 244, shown in FIG. 9. These are followed by an over 5 amp resistive algorithm module 246 shown in FIG. 10, an inductive arcing timer module 248 shown in FIG. 11, and a set parameters module 250 shown in FIG. 12. This latter module 250 and the following three modules 252, 254 and 256 shown respectively in FIG. 12 FIGS. 13A-13F, FIGS. 14A-14B and FIGS. 15A-15D are repeated three times for each of three separate algorithms which are designated algorithm 1, algorithm 2 and algorithm 3. In each of these algorithms, some of the parameters are changed somewhat as each of the modules are run. Accordingly, modules 258, 260, 262 and 264 are identical modules run with somewhat differing parameters for "algorithm 2" and similarly, modules 266, 268, 270 and 272 are the same modules, again run with somewhat different parameters for "algorithm 3."

Figure 16:
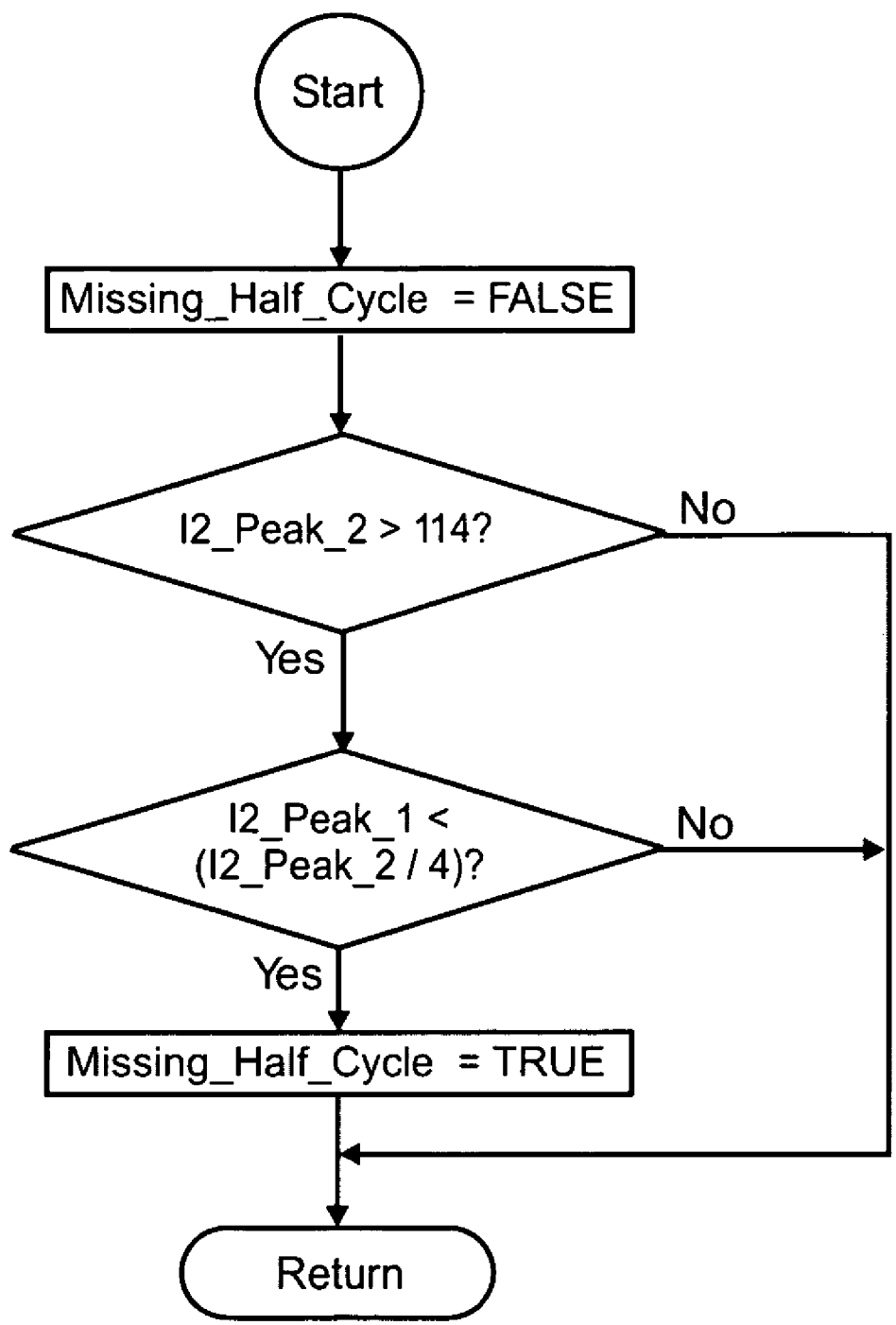
FIG. 16 is a flowchart showing operation of a missing half cycle check program module.
Figure 17A:
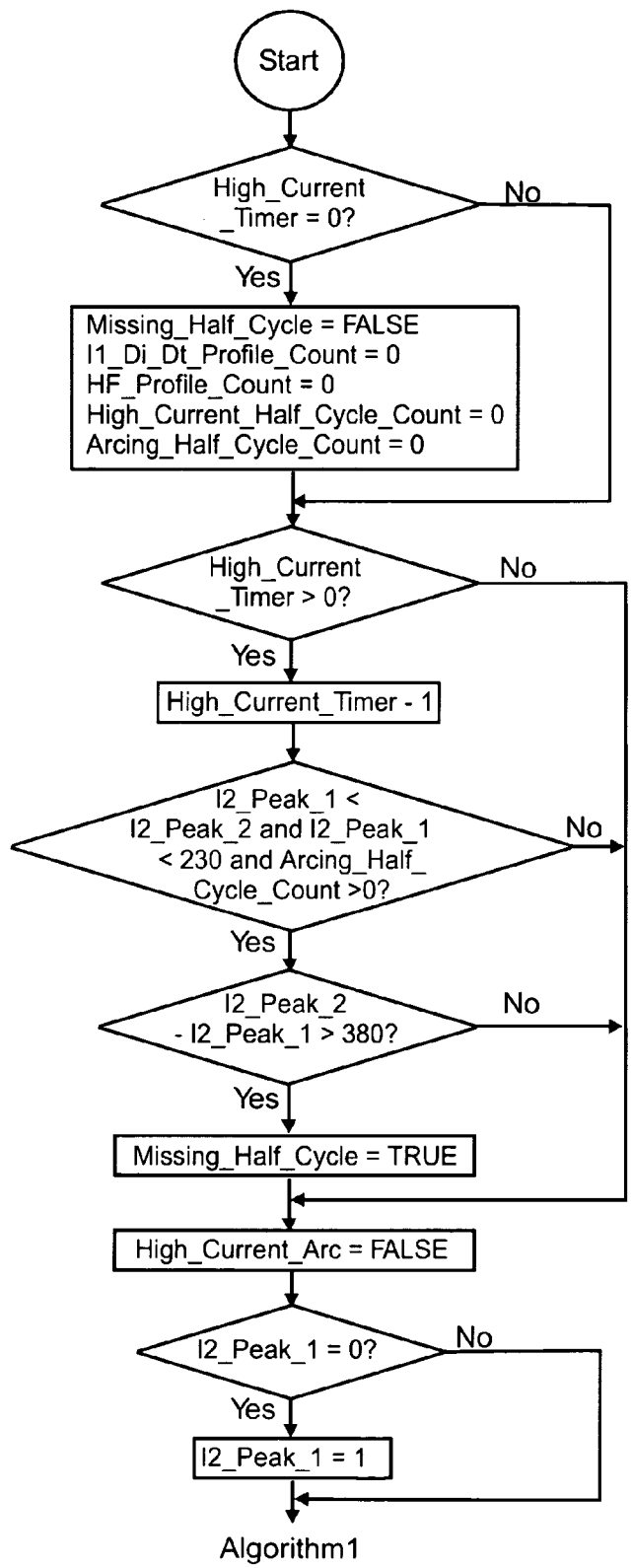
FIGS. 17A-17F show a flowchart showing operation of a parallel arc algorithms program module.
Figure 17B:
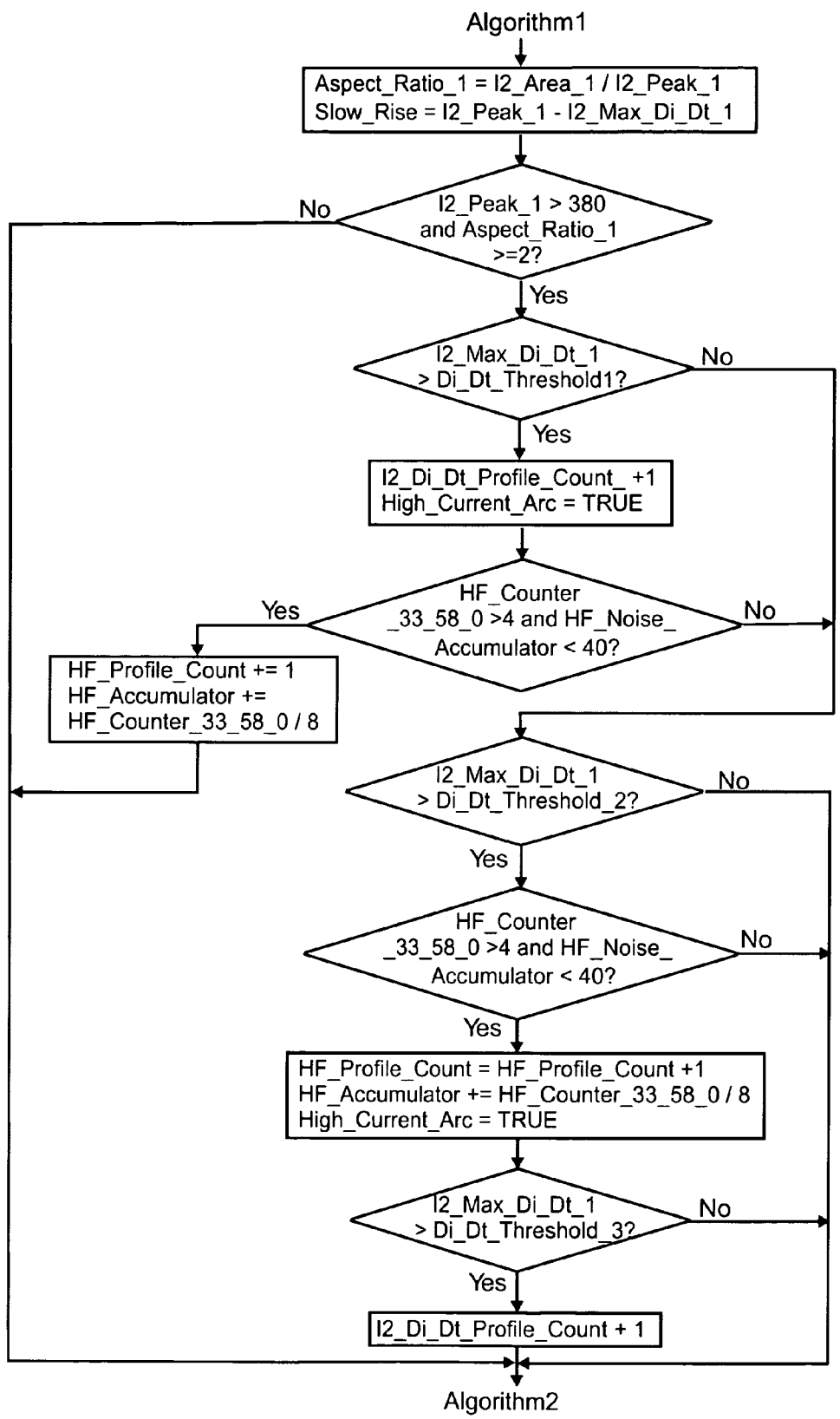
Figure 17C:
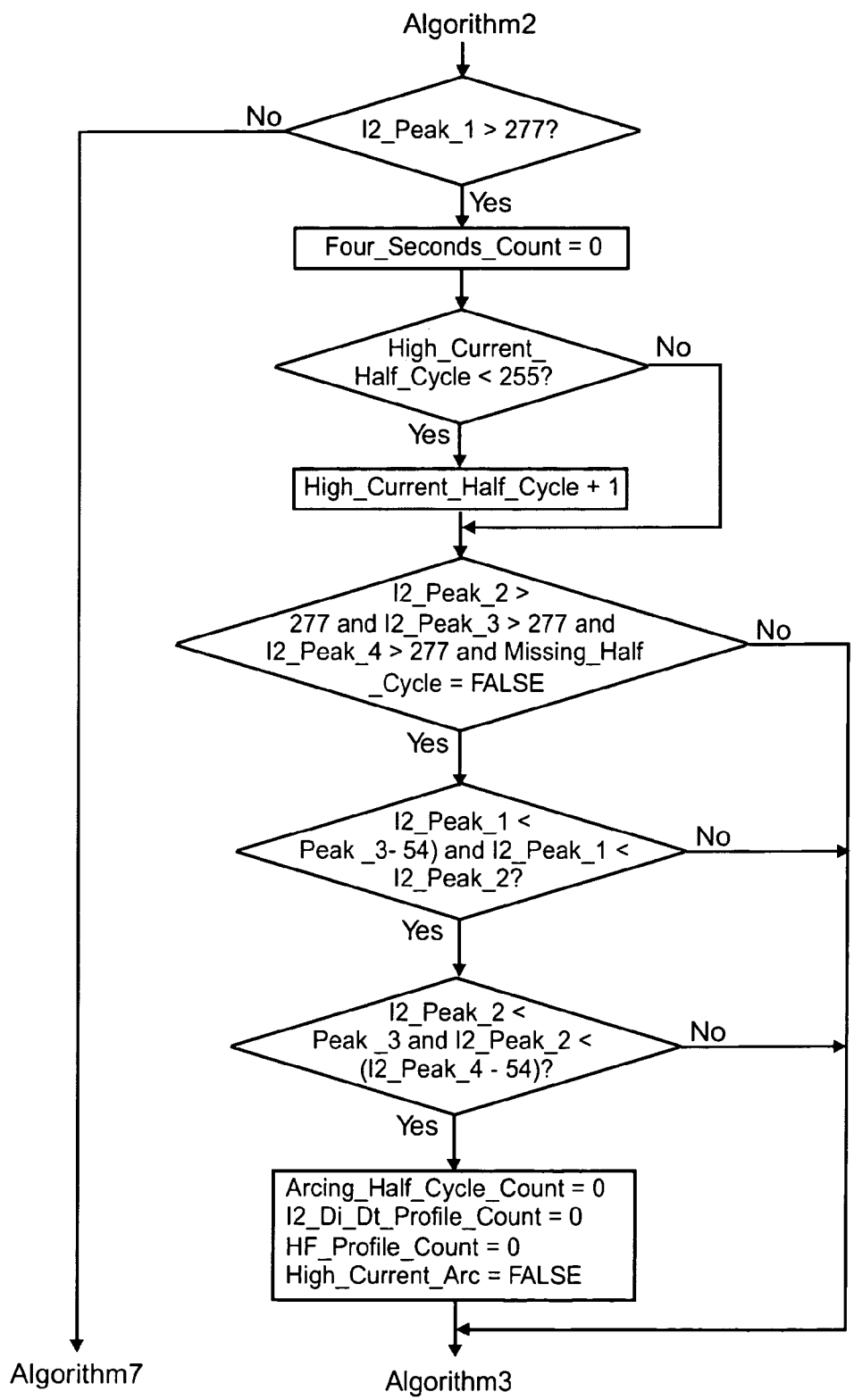
Figure 17D:
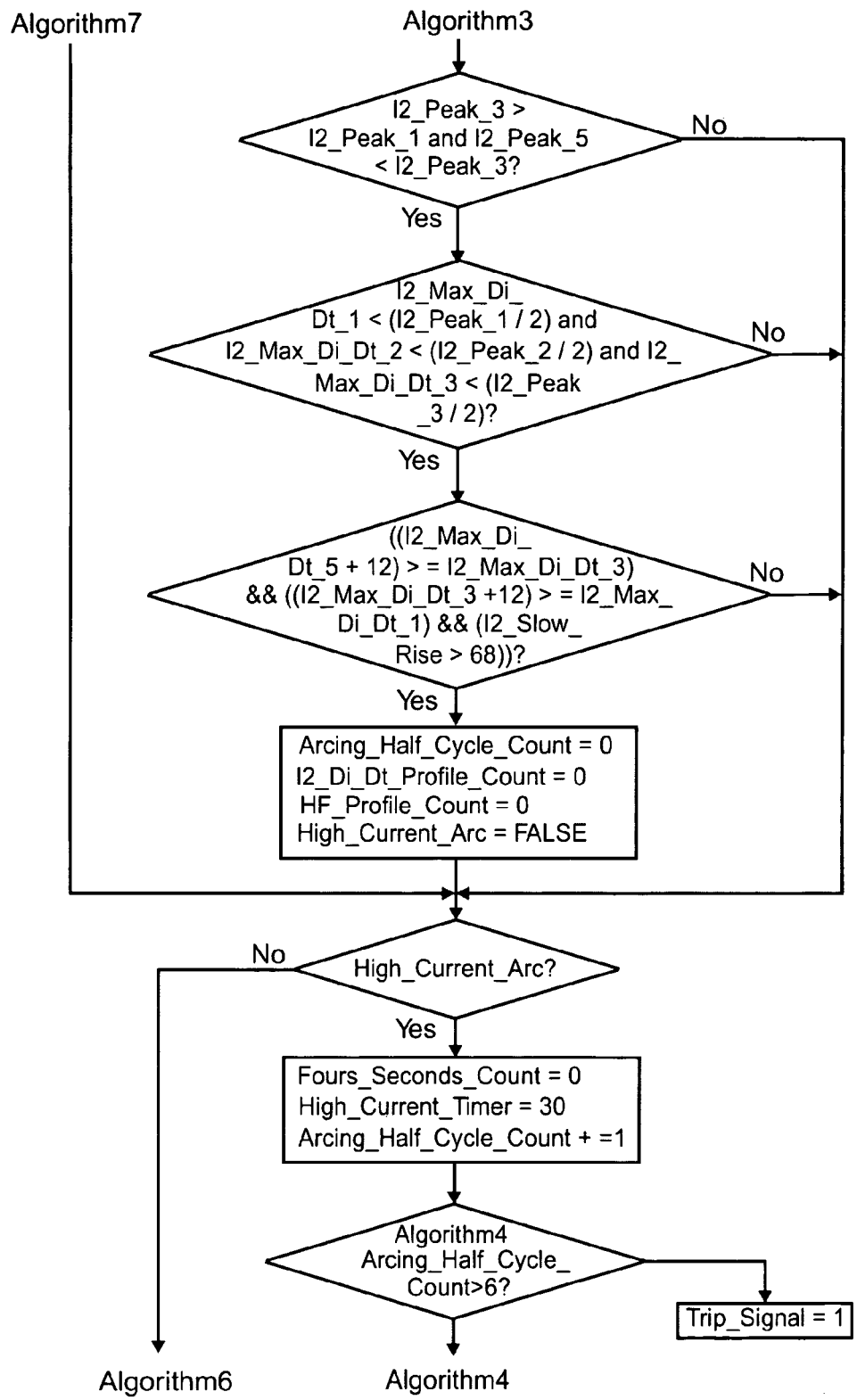
Figure 17E:
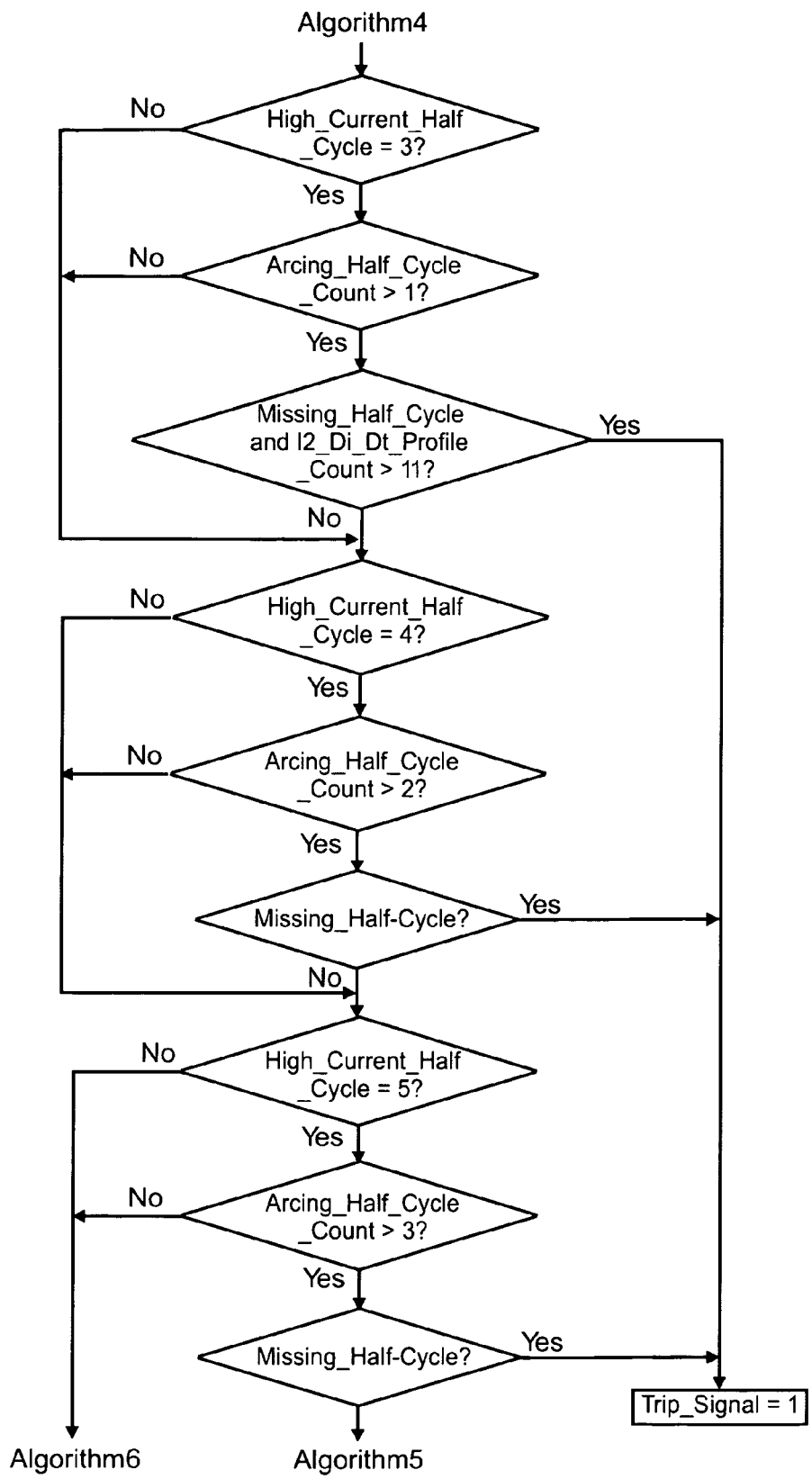
Figure 17F:
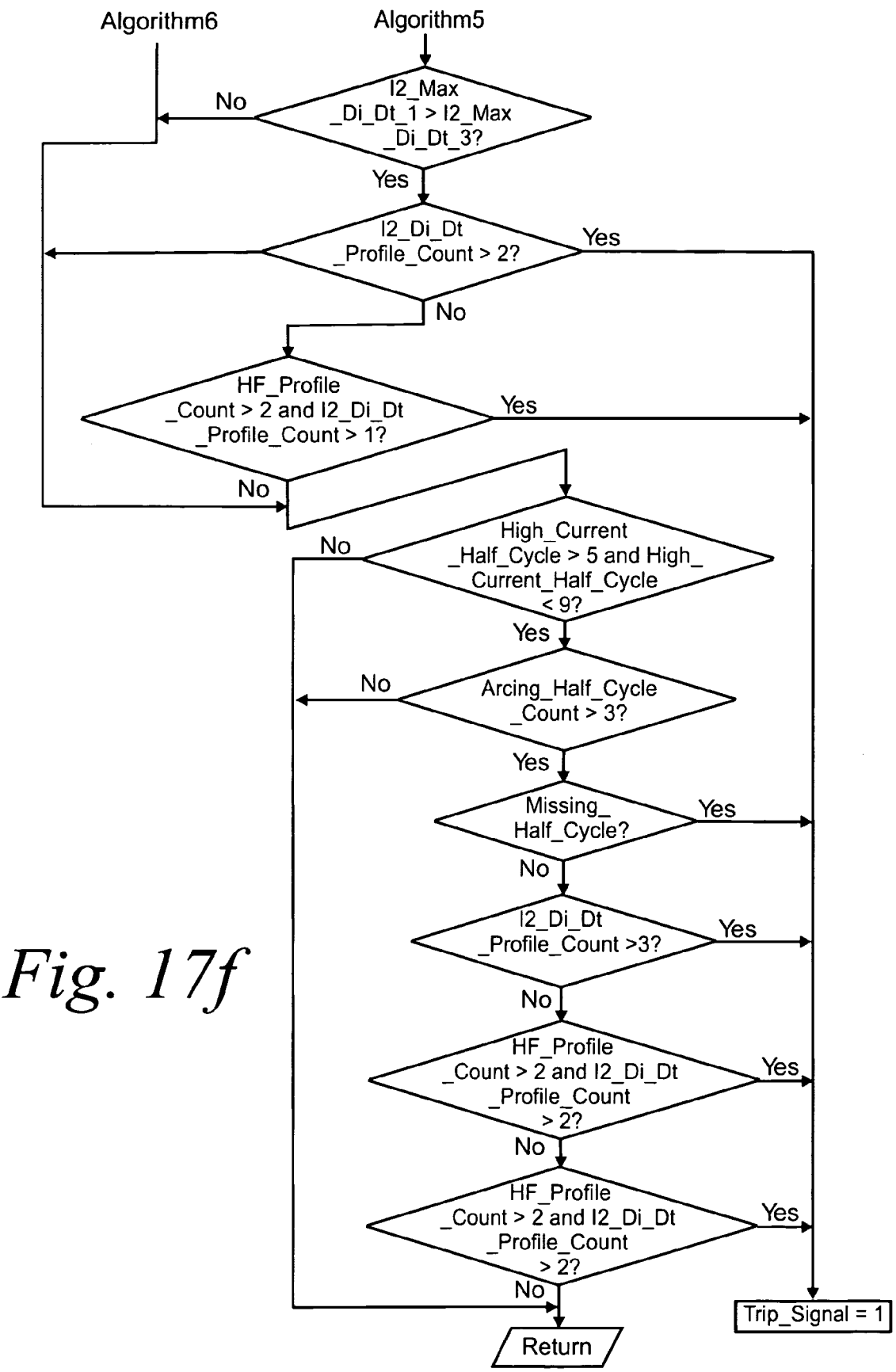

Next, a missing half cycle module 291 is shown in FIG. 16 and a parallel arc algorithms module 291 shown in FIGS. 17A-17F are run. This latter parallel arc algorithms module 291 is a so-called type B algorithm to test for parallel arcing in a manner more fully explained in our prior U.S. Pat. No. 6,259,996 accordingly, and referring briefly to FIGS. 13A-13F, the algorithms shown here are essentially similar to those shown in our above-referenced prior patent.

Figure 18:
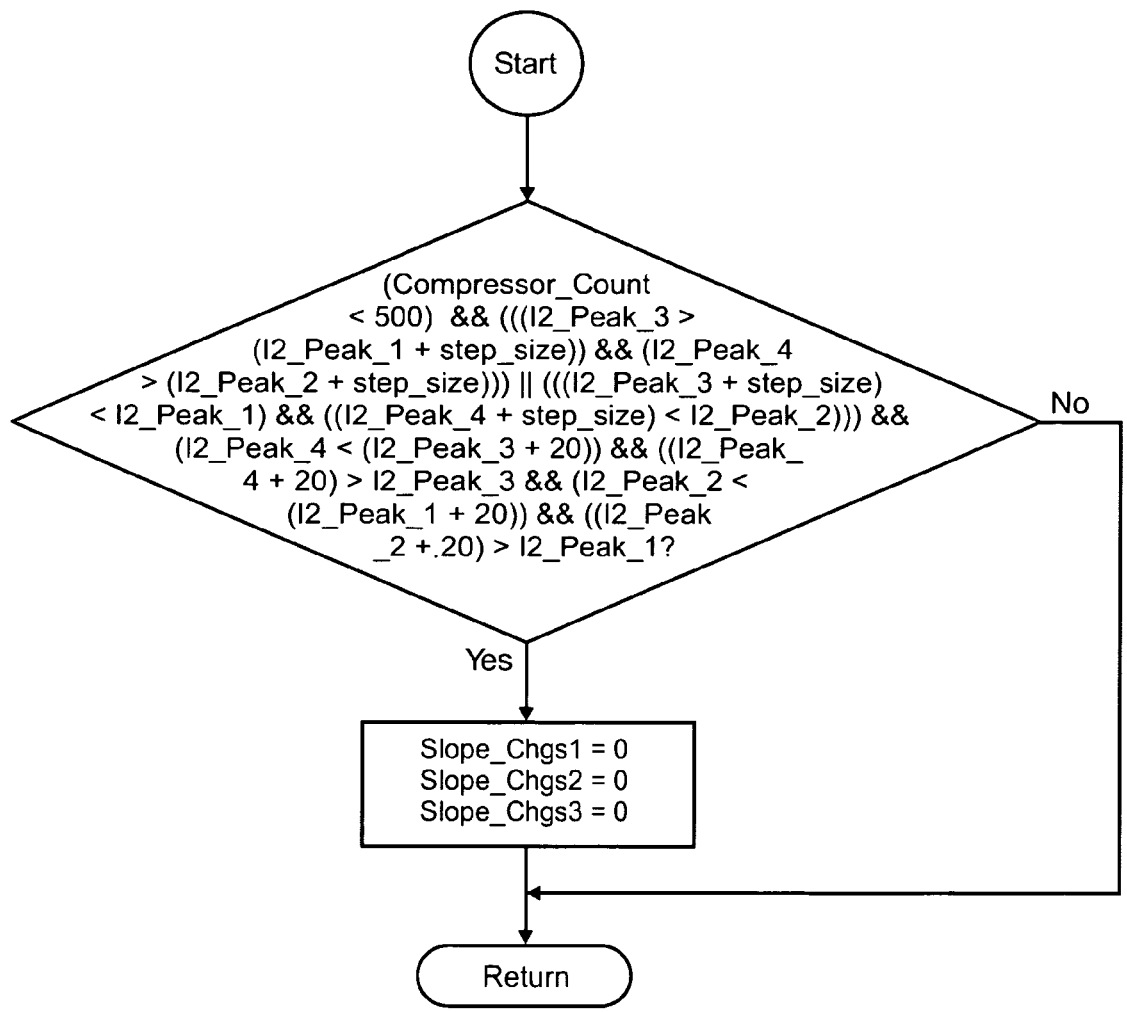
FIG. 18 is a flowchart showing operation of a step start up algorithms program module.

Following the parallel arc algorithms, start up algorithms 278 are performed as shown in FIG. 18. At this point, the trip equation is run at 280, as shown in FIGS. 19A-19J.

At 282, the program sequence checks for zero crossing to verify the half cycle is complete. Upon completion of the half cycle, the main sequence proceeds to a check for current shelf module 284 shown in FIGS. 20A-20B followed by a use 20 KHz filter module 286 shown in FIGS. 21A-21C. It is at this point that the 20 KHz filter is used in accordance with one aspect of the invention to monitor high frequency noise for each ⅛ line cycle as discussed above. The next module 288 reads the high frequency count from the 20 KHz filter as shown further in FIGS. 22A-22B, and the half cycle results are stored at module 290 shown in FIG. 23. A test button debounce register is read at 292 and if greater than 2, the self-test mode is set true, the test button debounce is set equal to 4 and the four seconds count register is set to zero at 294, whereupon the main sequence is ready to repeat from the top of FIG. 5A.

While the specific algorithms shown herein differ somewhat from those shown in the above-referenced parent application, the basic theory and manner of operation is the same, wherein the module looks at various peaks, areas and rise times, as well as various ratios of values from one sample to the next for over given groups of samples, as well as factors such as the change in peak position from one cycle to the next. All of these factors are used to increment or set a number of registers or counters in software for selecting an appropriate load type algorithm to be run later in the arc detection algorithms or trip equation of FIGS. 19A-19J.

Figure 6:
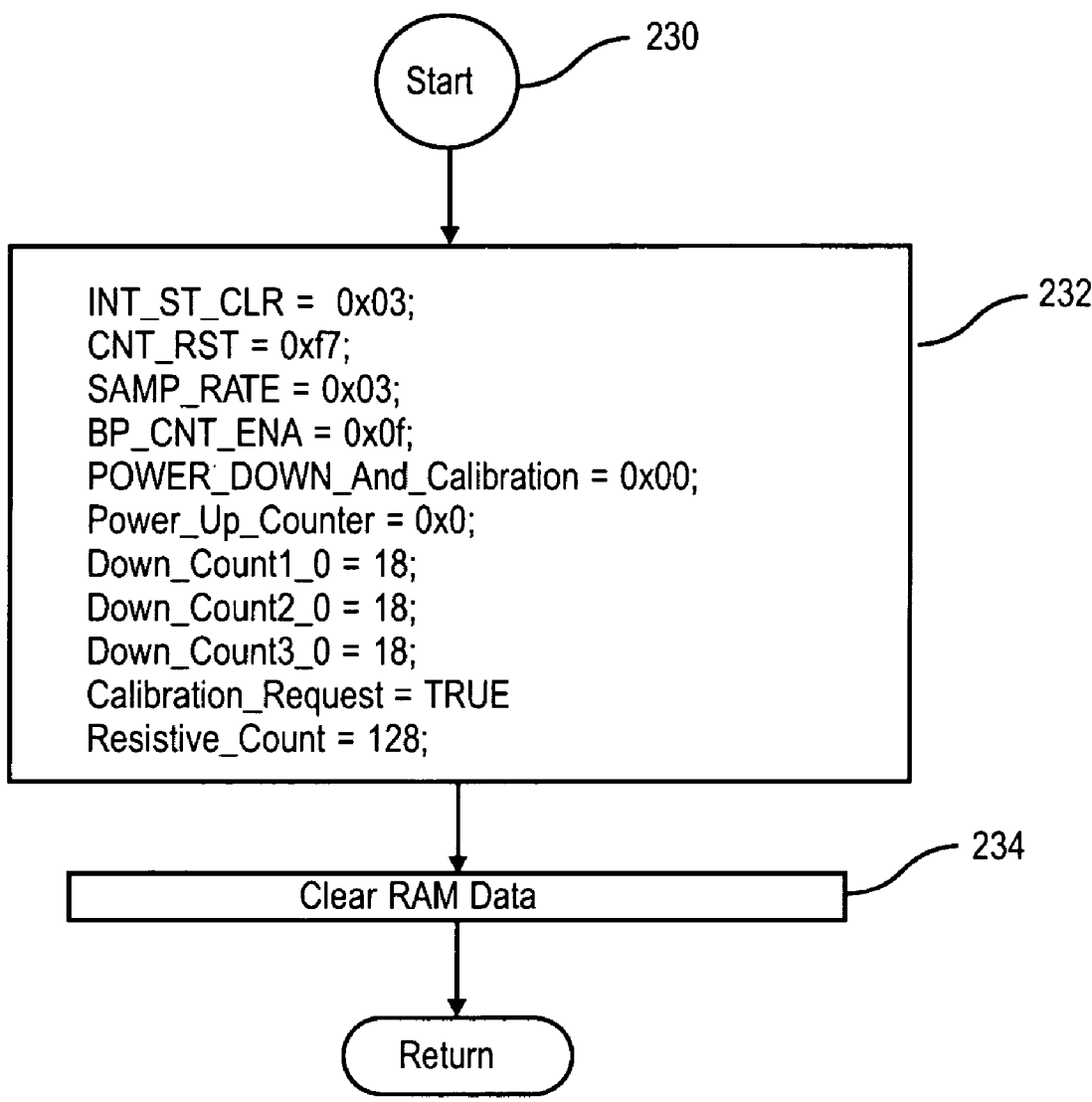
FIG. 6 is a flowchart showing operation of an initialization program module.

FIG. 6 shows the above-referenced initialization module 204 which includes a start 230, initialization of software counters/registers 233, clears RAM data, and goes to a return.

The designated load types in the present embodiment are compressor load, computer load, resistive computer load, resistive, inductive brush load, light dimmer, light dimmer resistive load and variable speed motor. Other load types or subgroupings of upload types based on the same or other criteria may be designated or utilized without departing from the invention.

In accordance with the described embodiment of the invention, the microcontroller or microprocessor implements a number of counters in software. These counters are incremented and decremented in accordance with the detect load type routine or module, to be described presently, as well as in accordance with other routines or modules, including an arc detection algorithm or "trip equation" to be described later. The controller then determines, based upon the states of various counters or subgroups of counters not only the load type, from among the types given above, but also whether arcing is present. As will be seen presently, a different algorithm or different subroutines or portions of algorithms are used for each kind of load, once the type of load has been determined, to determine whether arcing is occurring based upon the sensor inputs obtained as described above. Thus, a number of counters or registers are incremented and/or set in accordance with the incoming sensor signals. The states of these registers and/or counters are used in various algorithms or subroutines to determine not only the load type, but the occurrence of arcing of a type and/or sufficient magnitude to cause a trip signal to be given, so as to trip a circuit breaker to an open position. As will become apparent from the ensuing description, the method of the invention also selects one of the load types as a default. In the present embodiment, the resistive load type is the default selection in the event that none of the other load types is determined to be present by the detect load type routine of FIGS. 7A through 7J.

Figure 7A:
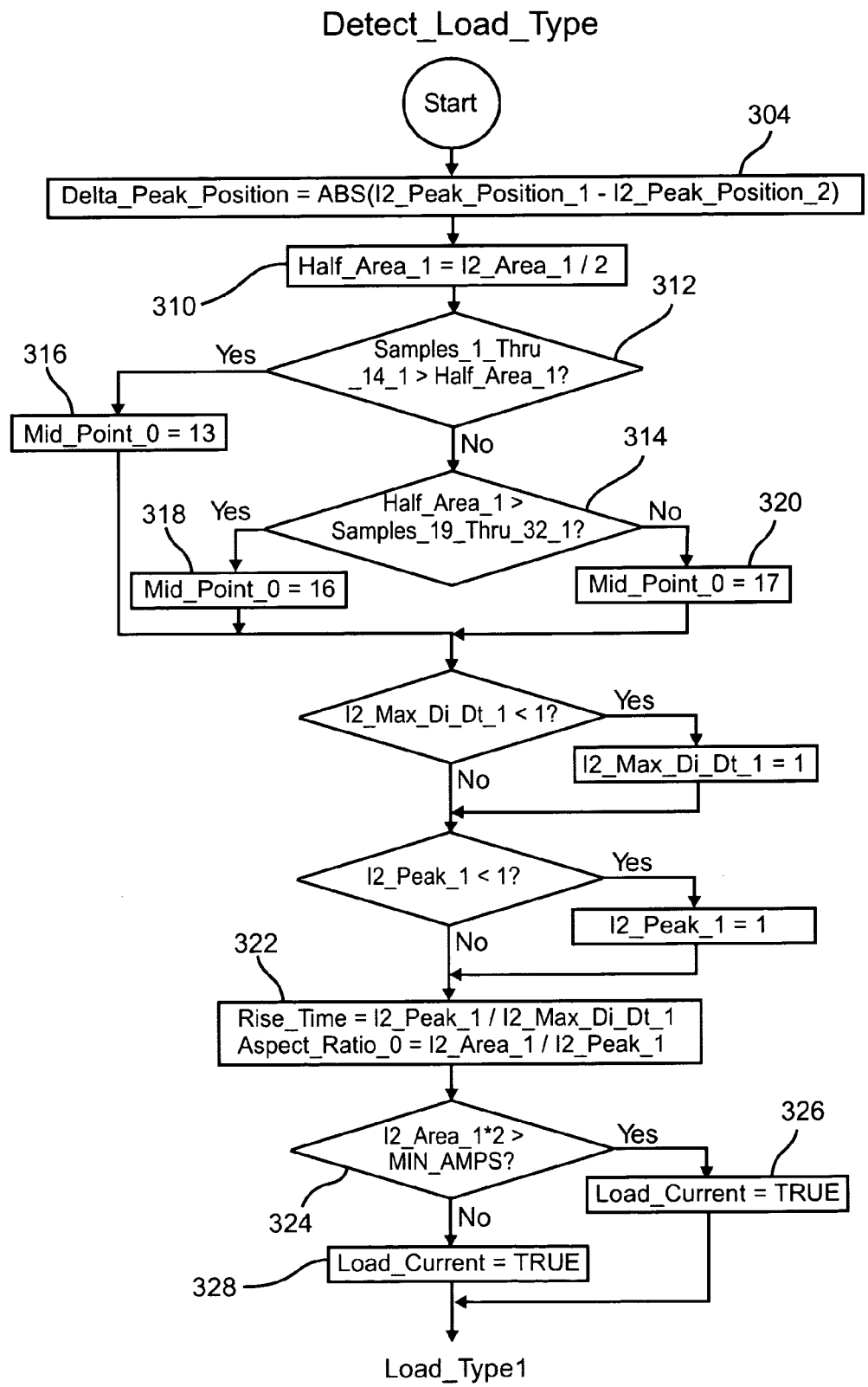
FIGS. 7A-7J are a flowchart showing operation of a detect load type program module.

Referring now to FIG. 7A, at 304 a peak position of the incoming waveform is monitored for the purpose of setting the absolute value for the peak position difference between half cycle 1 and half cycle 2 in a delta peak position register. Thereupon, a half area n register 310 sets the area equal to one half of area n, the area under the waveform on the nth (e.g., first) half cycle. The algorithm then looks at a plurality of previously taken samples (1-14) at 312 and (15-32) at 314 to determine an appropriate setting for a midpoint register at 316, 318 or 320. In this regard, the illustrated embodiment takes 32 samples per line cycle. The midpoint register or counter count corresponds to the sample and the cycle at which the midpoint or spike in current occurs. Next, at 322 a rise time register is set equal to the ratio of peak 1 to maximum di/dt1, i.e., of the first half cycle, and an aspect ratio register is set equal to the ratio of the area to the peak in the first half cycle. If two times the area in the first half cycle is greater than the value in the minimum amps register (324), load current is set true at 326. If not, load current is set false at 328.

Figure 7B:
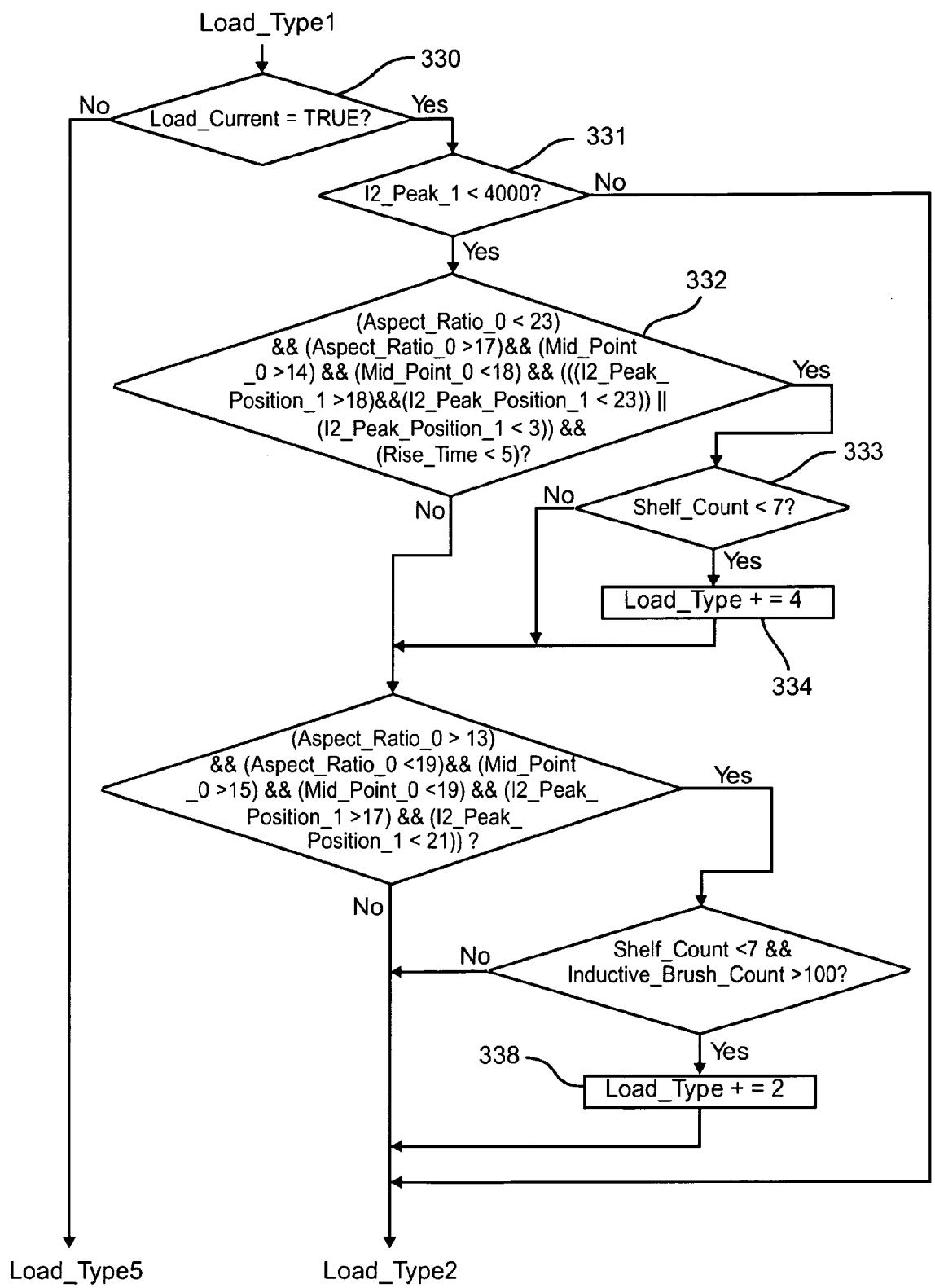
Figure 7C:
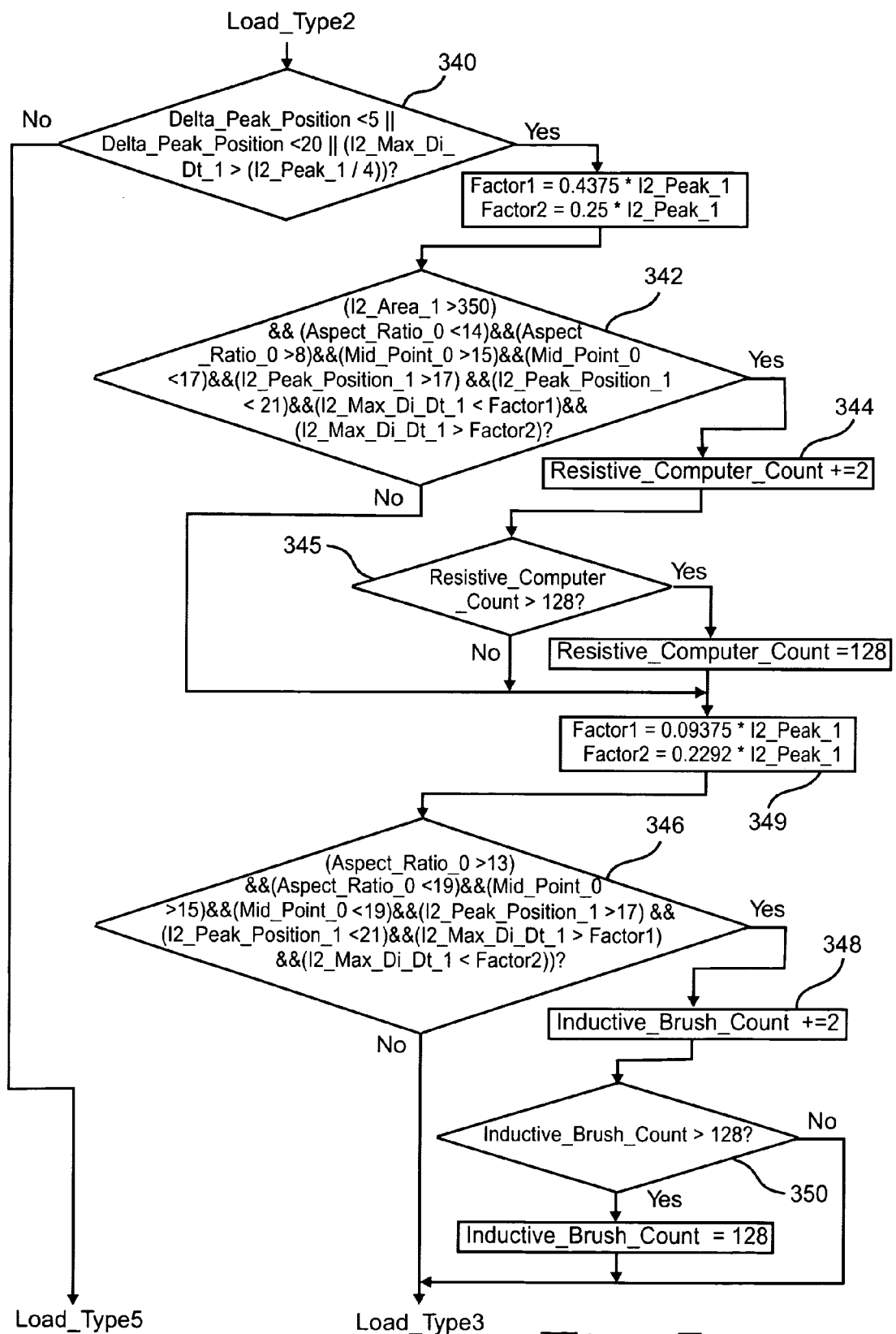

Continuing to FIG. 7B, if the load current is true 330, the peak register is checked, and if below 4000 (331), values in the aspect ratio peak position, rise tune and midpoint registers are checked at 332. The shelf count is checked at 333, and the load type counter is incremented 334 if these registers are less than certain values. If not, aspect ratio peak portion and midpoint values (at 336) the shelf count and inductive brush count (at 337) are checked and the load type register or counter is incremented by two at 338, depending on these values, i.e., if these values are greater than or less than selected quantities. In FIG. 7C, delta and peak position max di/dt register values are read at 340 and if these values are greater or less than selected quantities, the factor 1 and 2 register are set to selected values at 341. Next, aspect ratio register and others are read at 342, and if greater or less than selected quantities, the resistive computer count register or counter is incremented by two at 344. Additional checking of register values and incrementing of inductive brush count and resistive computer count load type register and setting of factors are illustrated at 345, 346, 347, 348, 349, 350 and 352, whereupon the program proceeds to FIG. 7D. It will be noted that a "false" reading in the load current=true register 330 or a "no" at the peak position and midpoint readings 340 direct the program to FIG. 7G.

Figure 7D:
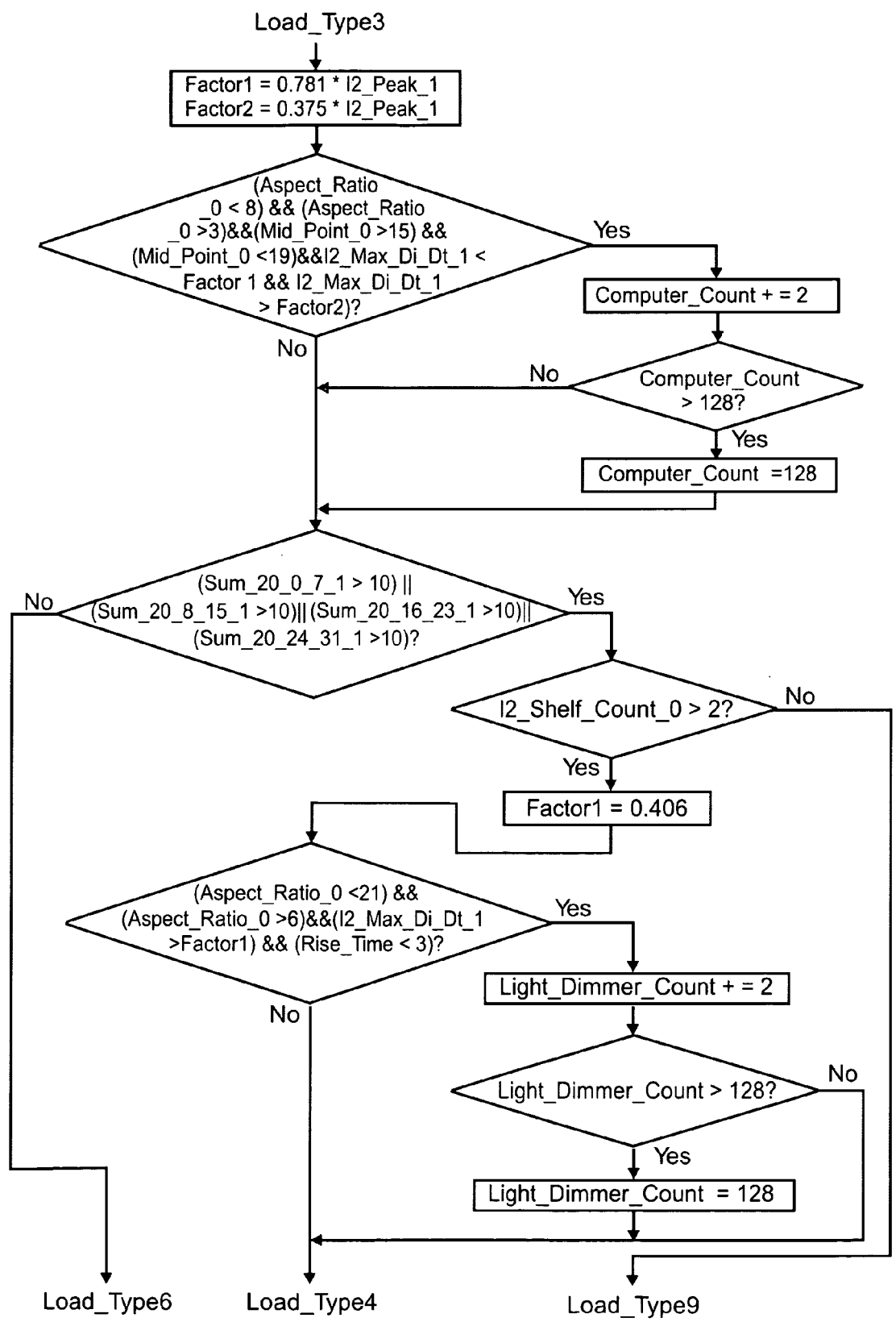
Figure 7E:
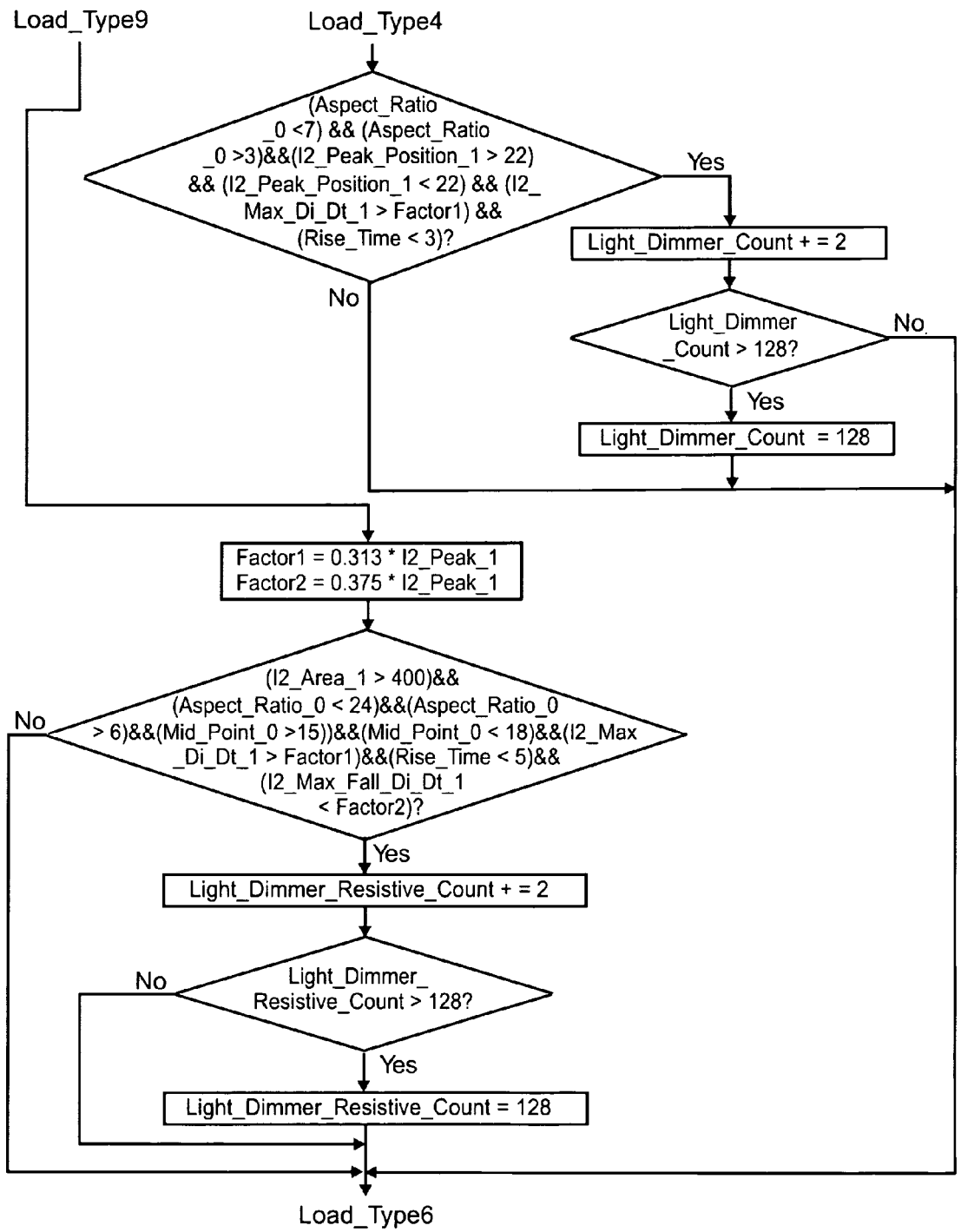
Figure 7F:
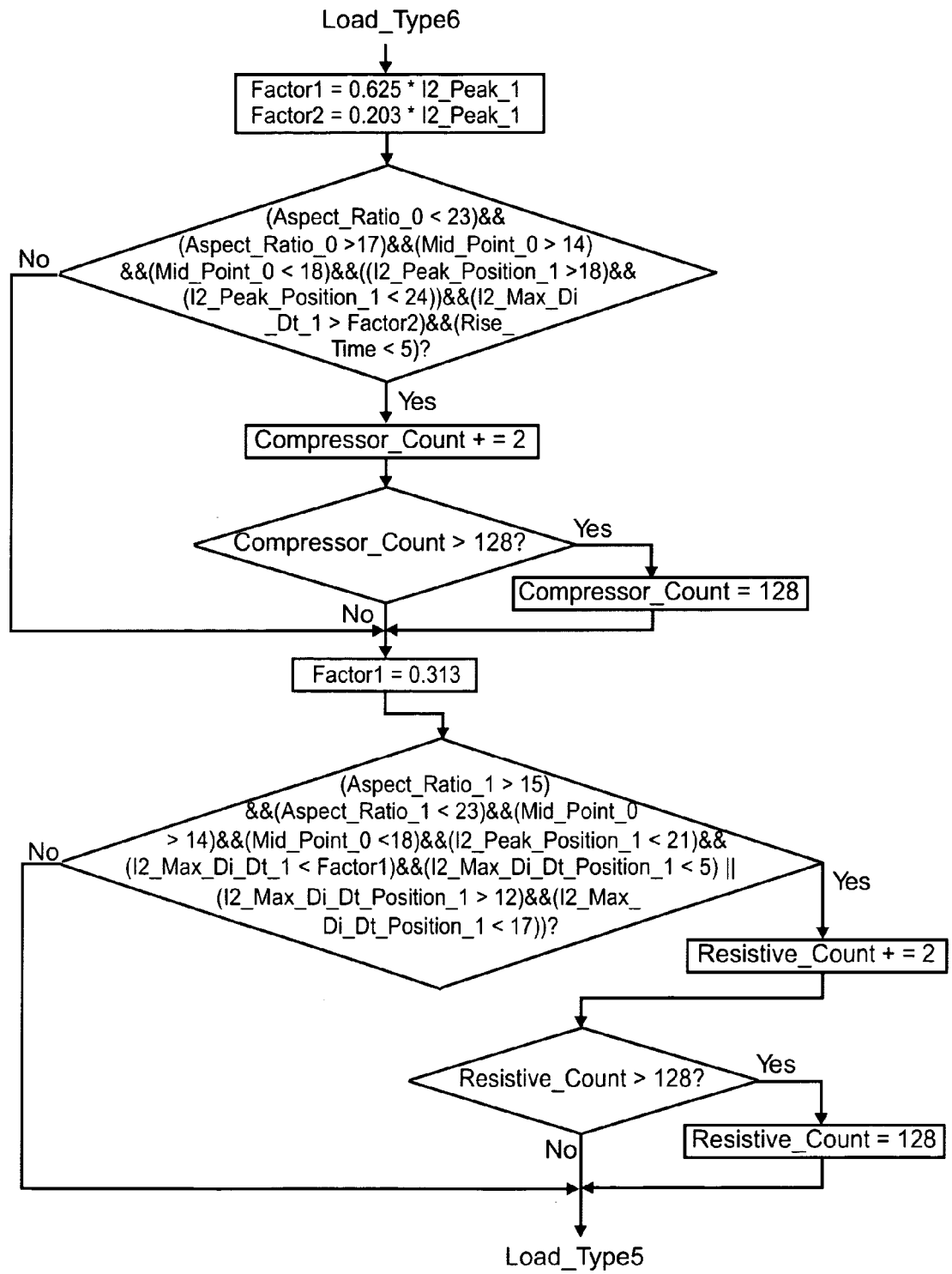

In FIGS. 7D, 7E and 7F, a number of other register values are tested and if within certain ranges, or above or below certain values, various load type registers and factor registers are set, in much the same way as in FIG. 7C.

Figure 7G:
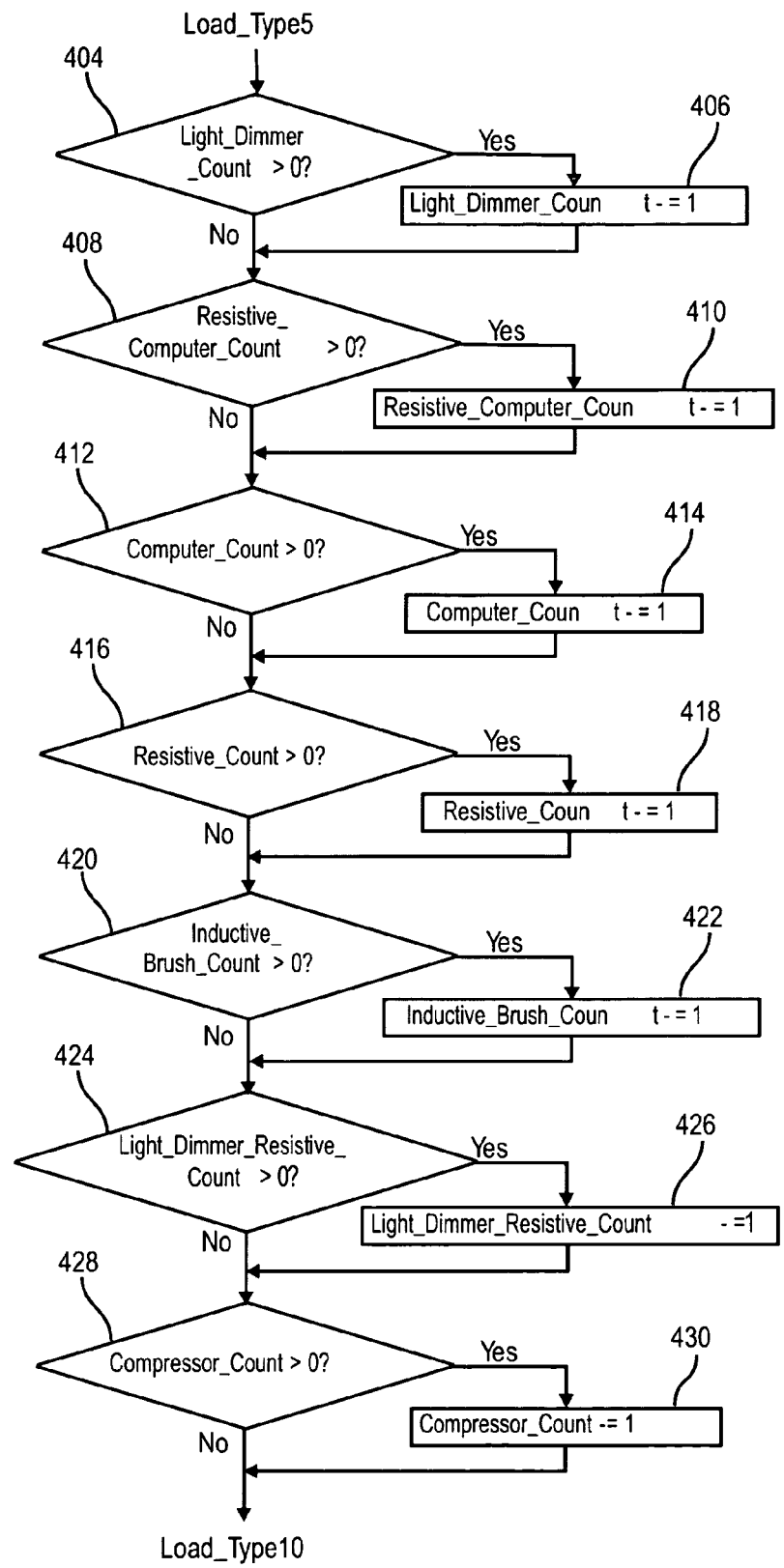

Referring next to FIG. 7G, in the described embodiment, the load type counters are essentially free running, and in order to prevent them from overflowing, they are all decremented by one count, assuming they are currently above zero. This is illustrated in the steps 404 through 430.

Figure 7H:
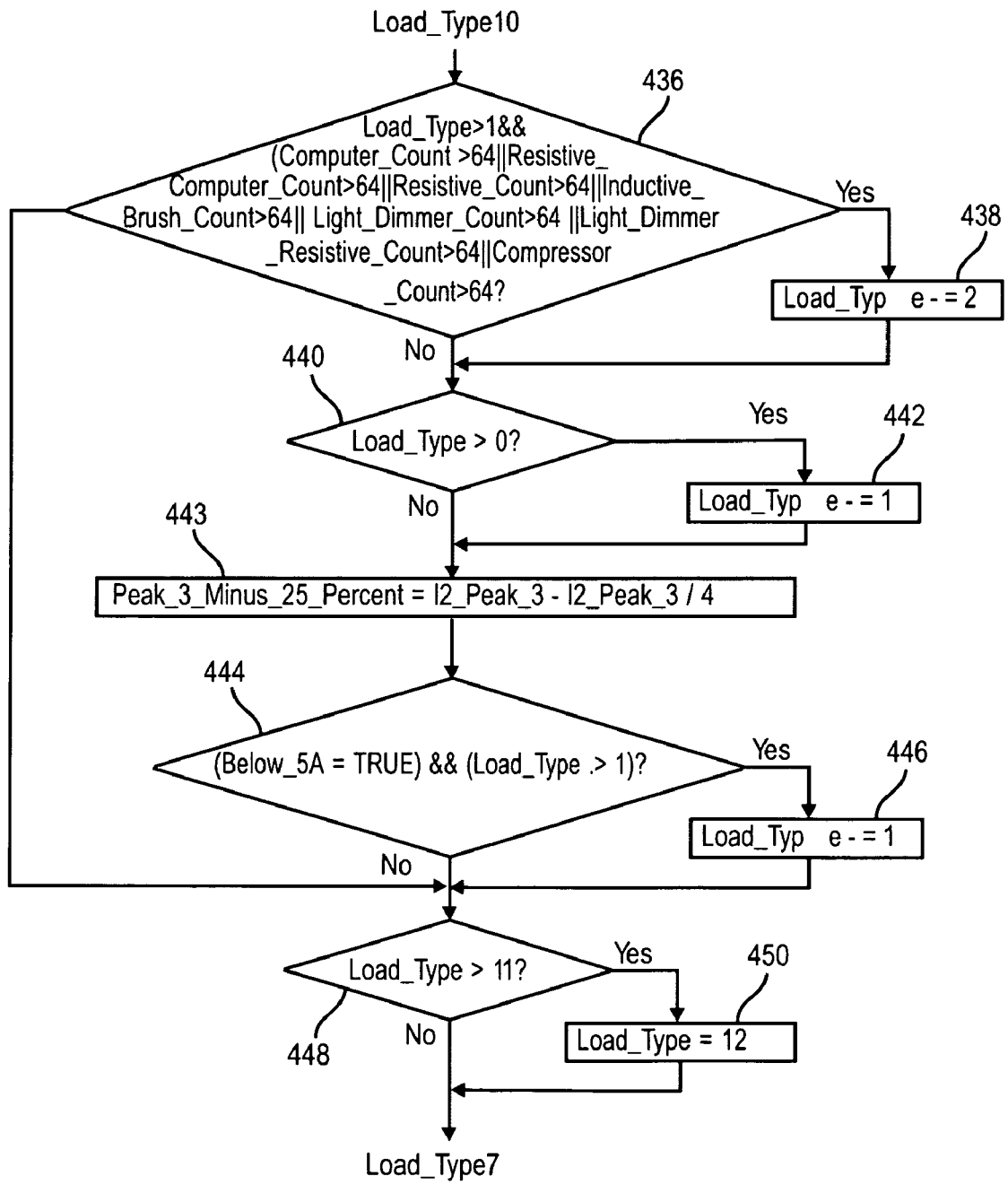

Proceeding to FIG. 7H, the counts in the counters for the various load type are checked at 436 along with a "load type" counter and if greater than certain values, the load type counter is decremented by two at 438 or, if not, and the load type counter is non-zero (440), the load type counter is decremented by one at 442. If the load type counter is not greater than 0, a peak minus 25 percent register is reset at 443. At reference numerals 444-450, further checks of the load type counter and a below 5A register (at 444) are run for either decrementing the load type counter (446) or for setting the load type counter equal to 12 (450).

Figure 7I:
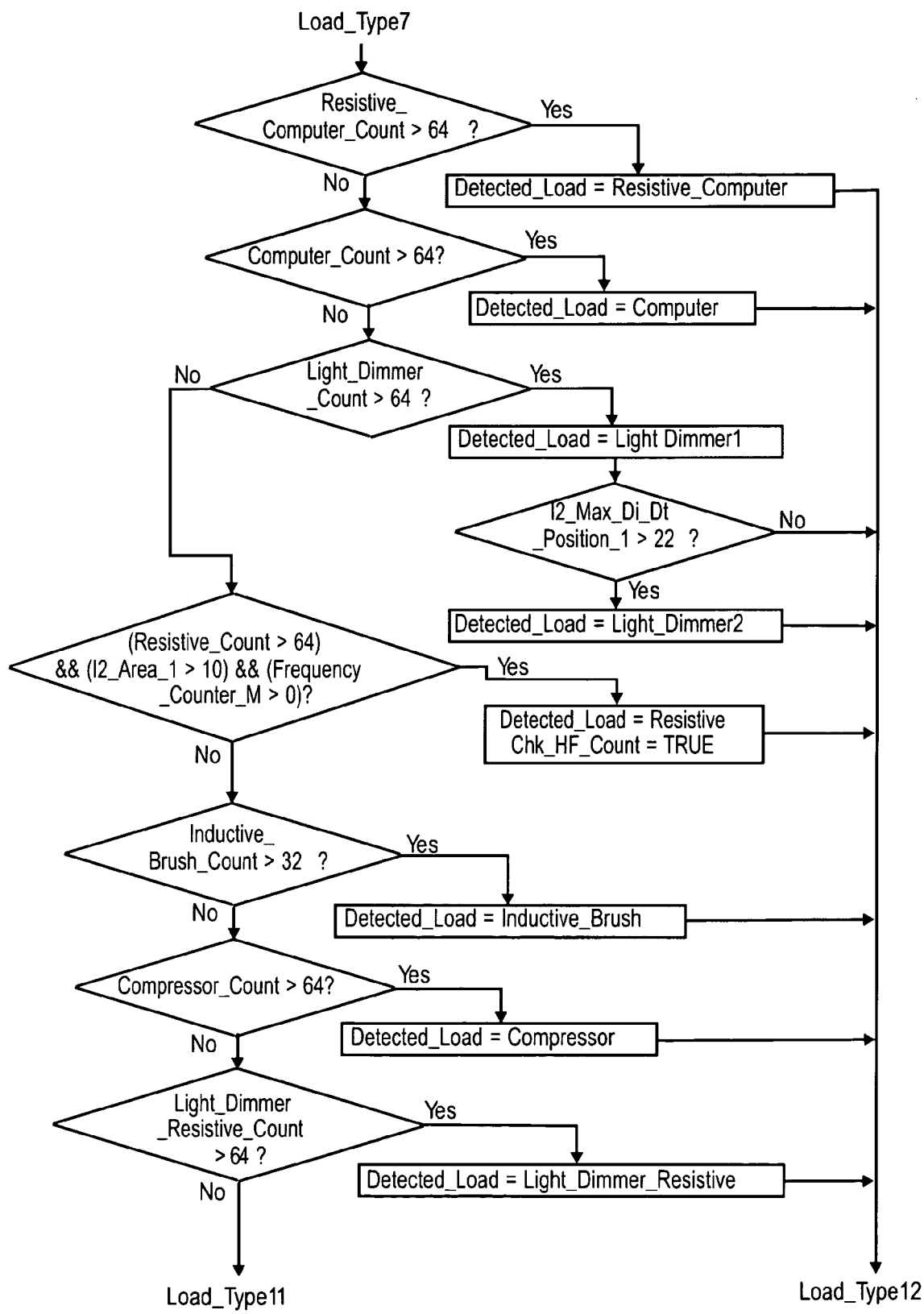
Figure 7J:
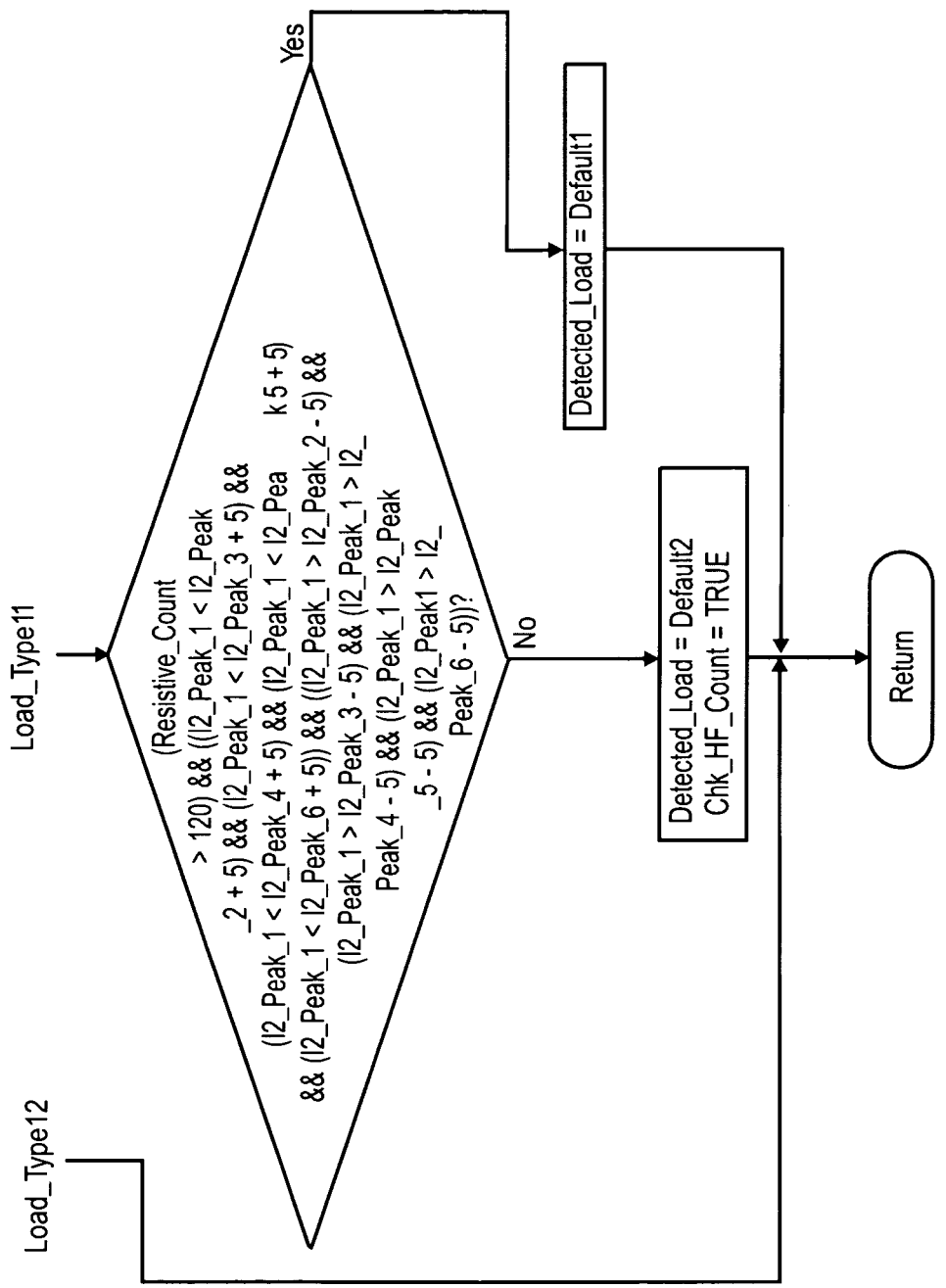

FIGS. 7I and 7J indicate a number of settings of a detected load counter or register, based upon the counts in a number of the load type counters. FIG. 7J indicates setting of a detected load counter to default 1 or default 2 conditions and the setting of a check high frequency count register to true based on certain conditions in resistive count and various peak counters as indicated.

Figure 8:
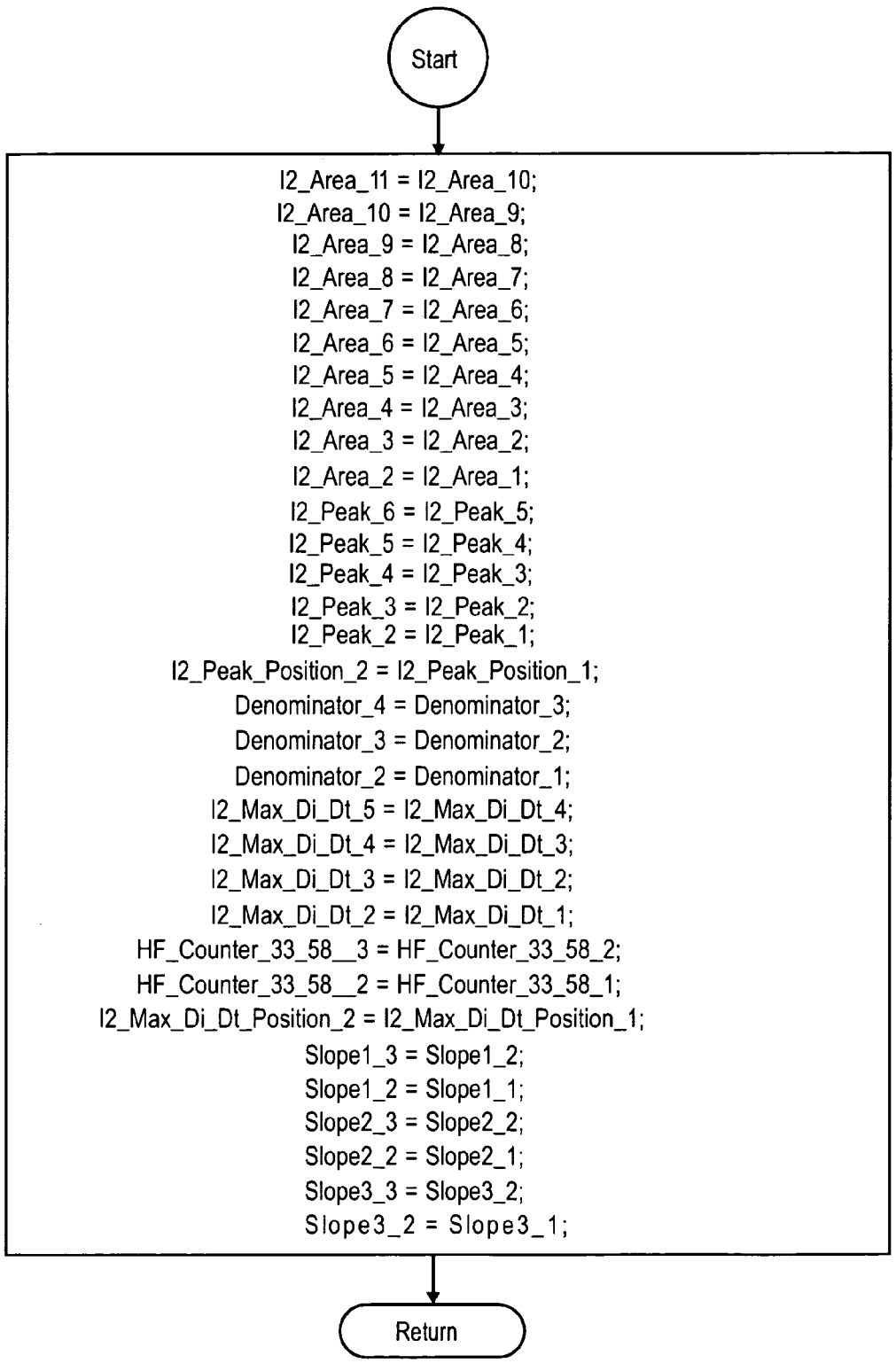
FIG. 8 is a flowchart of an update history buffers program module.
Figure 9:
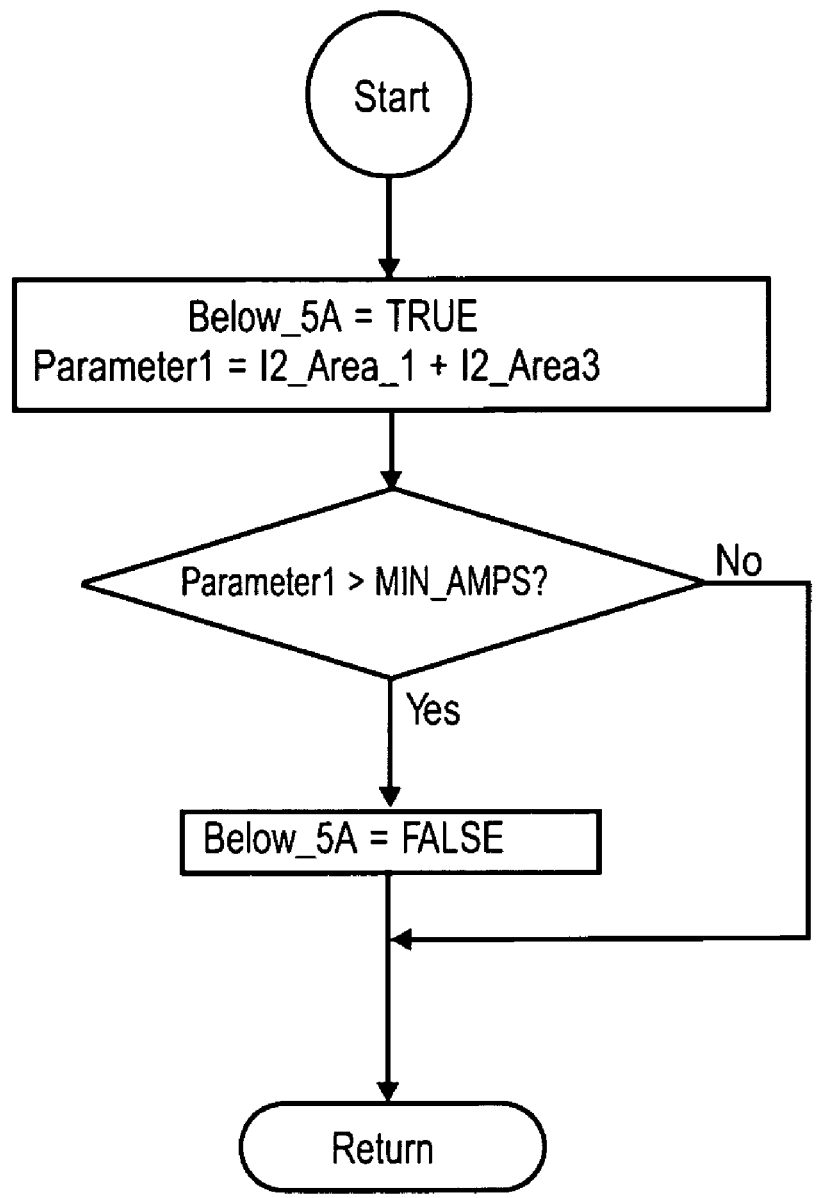
FIG. 9 is a flowchart of an under current monitor program module.

FIG. 8 shows the module 242 for updating history buffers in which a number of registers or buffers are updated as indicated. FIG. 9 shows the undercurrent monitor module 244 which checks for a below 5 amp current condition.

Figure 10:
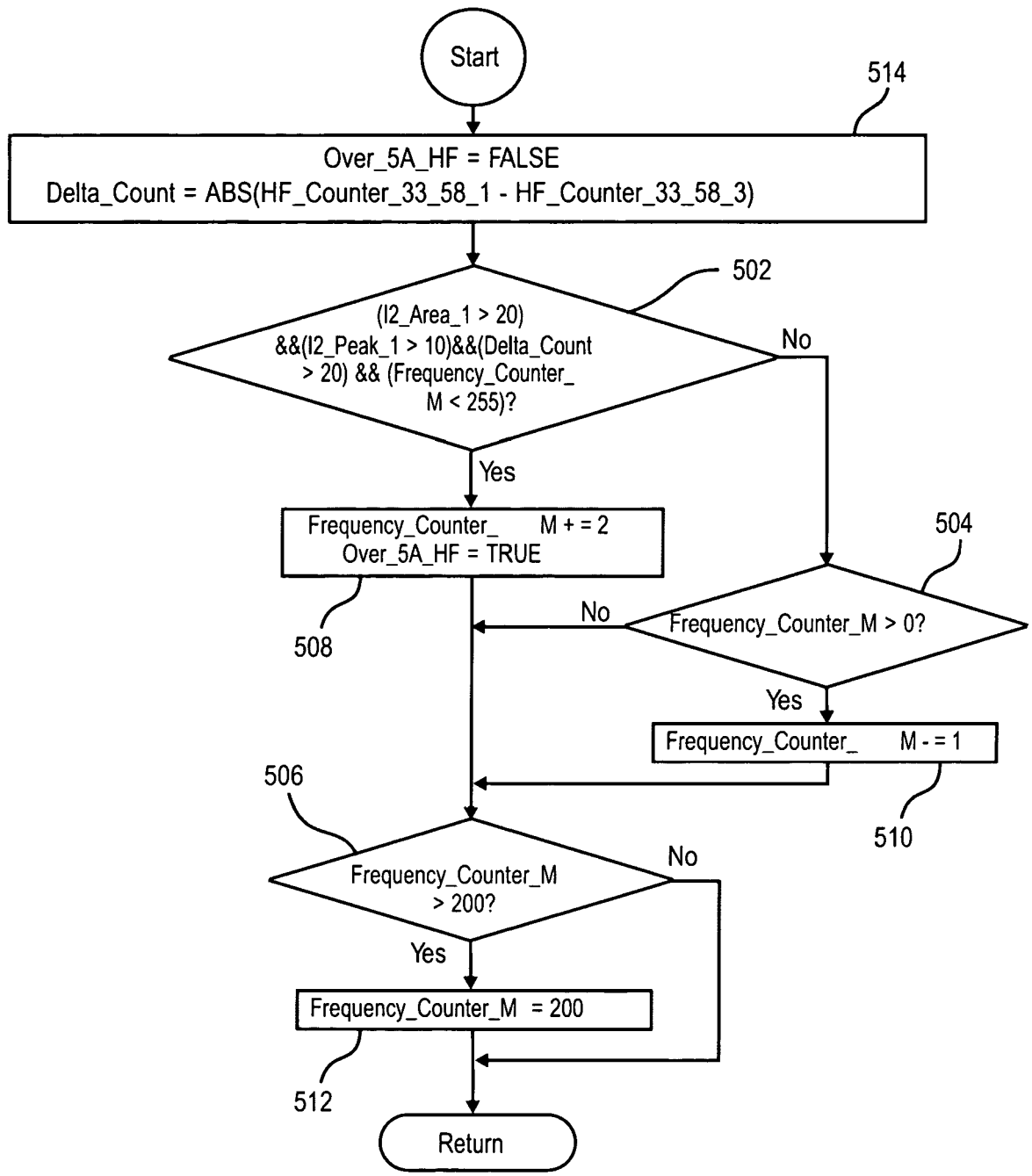
FIG. 10 is a flowchart of an over 5 amp resistive program module.

FIG. 10 shows the over 5 amp resistive module 246. This module monitors the condition of a number of counters as indicated at 502-506 and increments or decrements a frequency counter, as shown at 508-512. At 514, an over 5 amp high frequency register is initially set false and the absolute value of the difference between a high frequency count at is 33 KHz and 58 KHz for the first and third half cycles is calculated.

Figure 11:
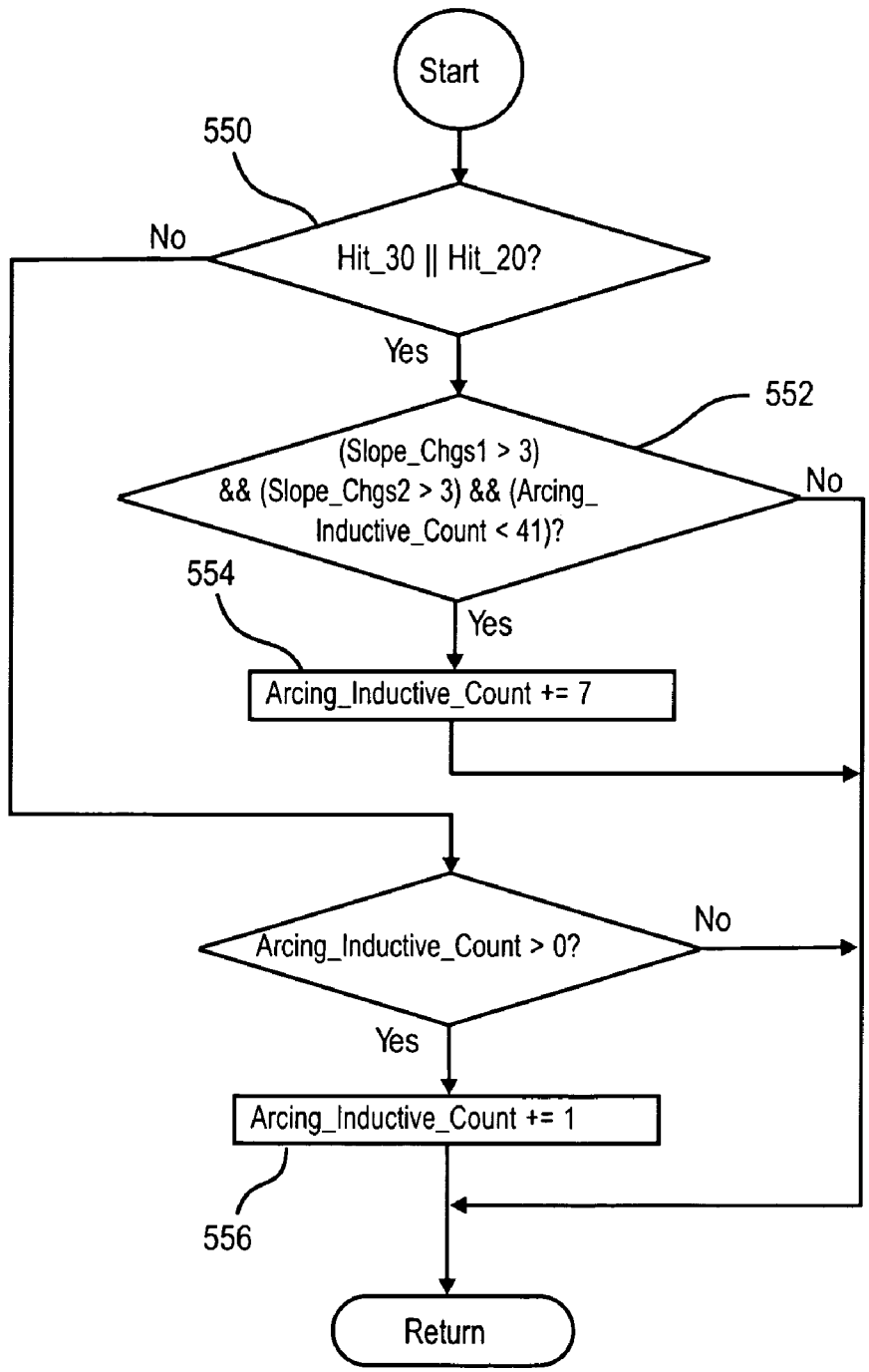
FIG. 11 is a flowchart showing operation of an inductive arcing timer program module.

Referring now to FIG. 11, the inductive arcing timer module 248 is shown in additional detail. This module begins at 550 by checking hit 30 and hit 20 registers. These registers relate to 30 Hz or 20 Hz harmonics in the current signature. The inductive arcing timer module then checks the states of slope changes counters and correspondingly increments or decrements an arcing inductive counter at 552 and 554 or 556, depending on its current state.

Figure 12:
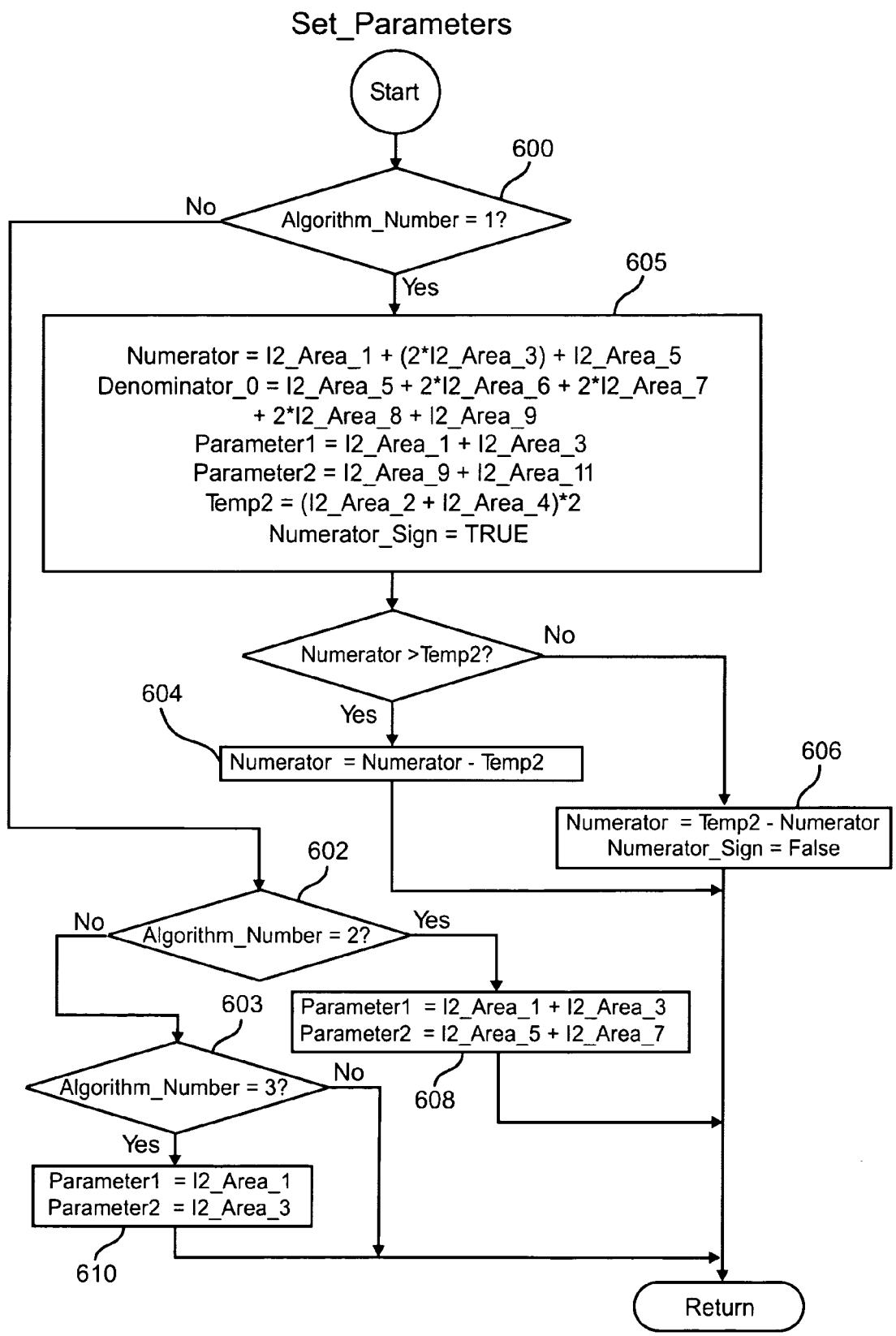
FIG. 12 is a flowchart showing operation of a set parameters program module.
Figure 13A:
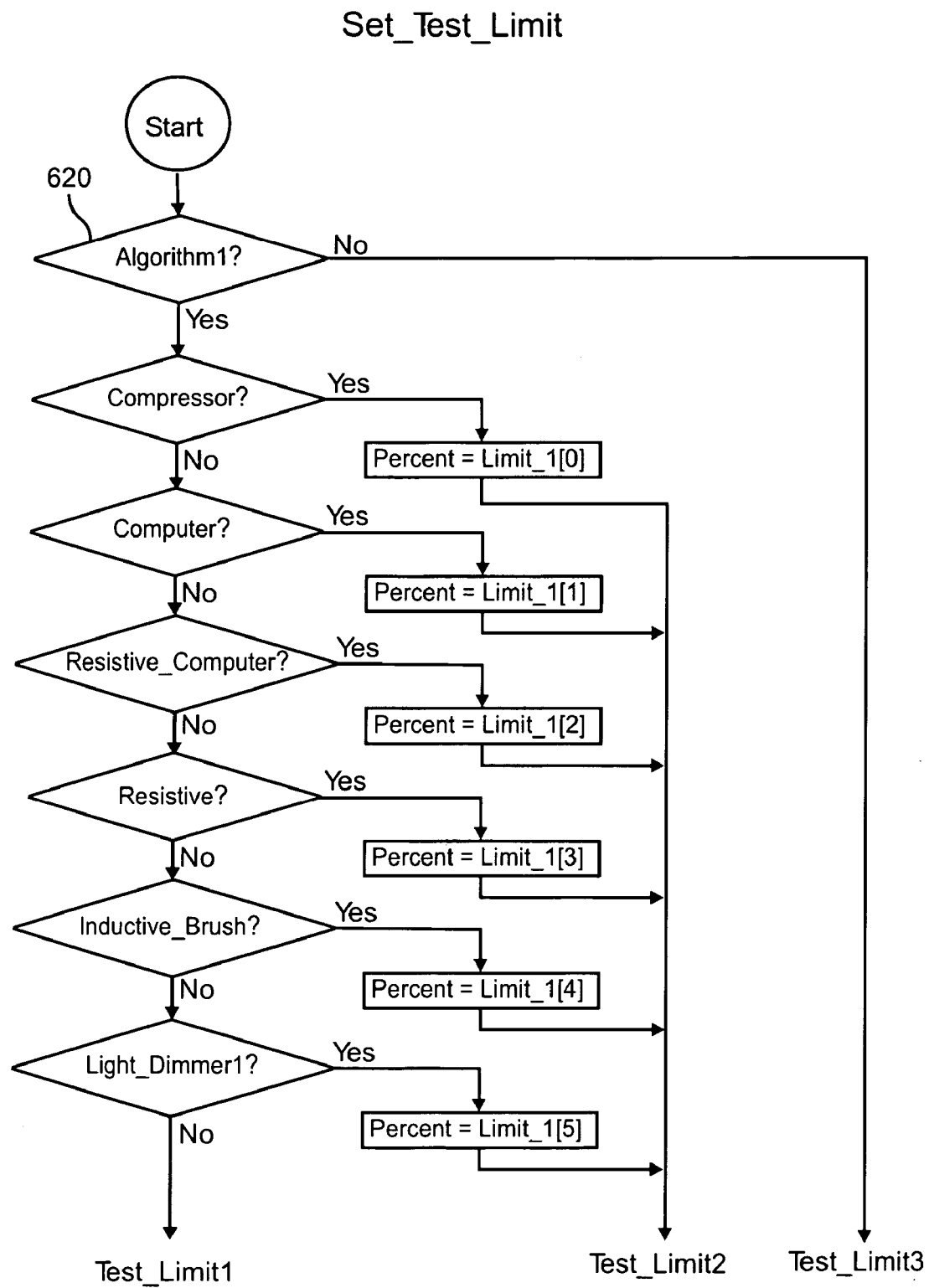
FIGS. 13A-13F show a flowchart showing operation of a set test limit program module.
Figure 13B:
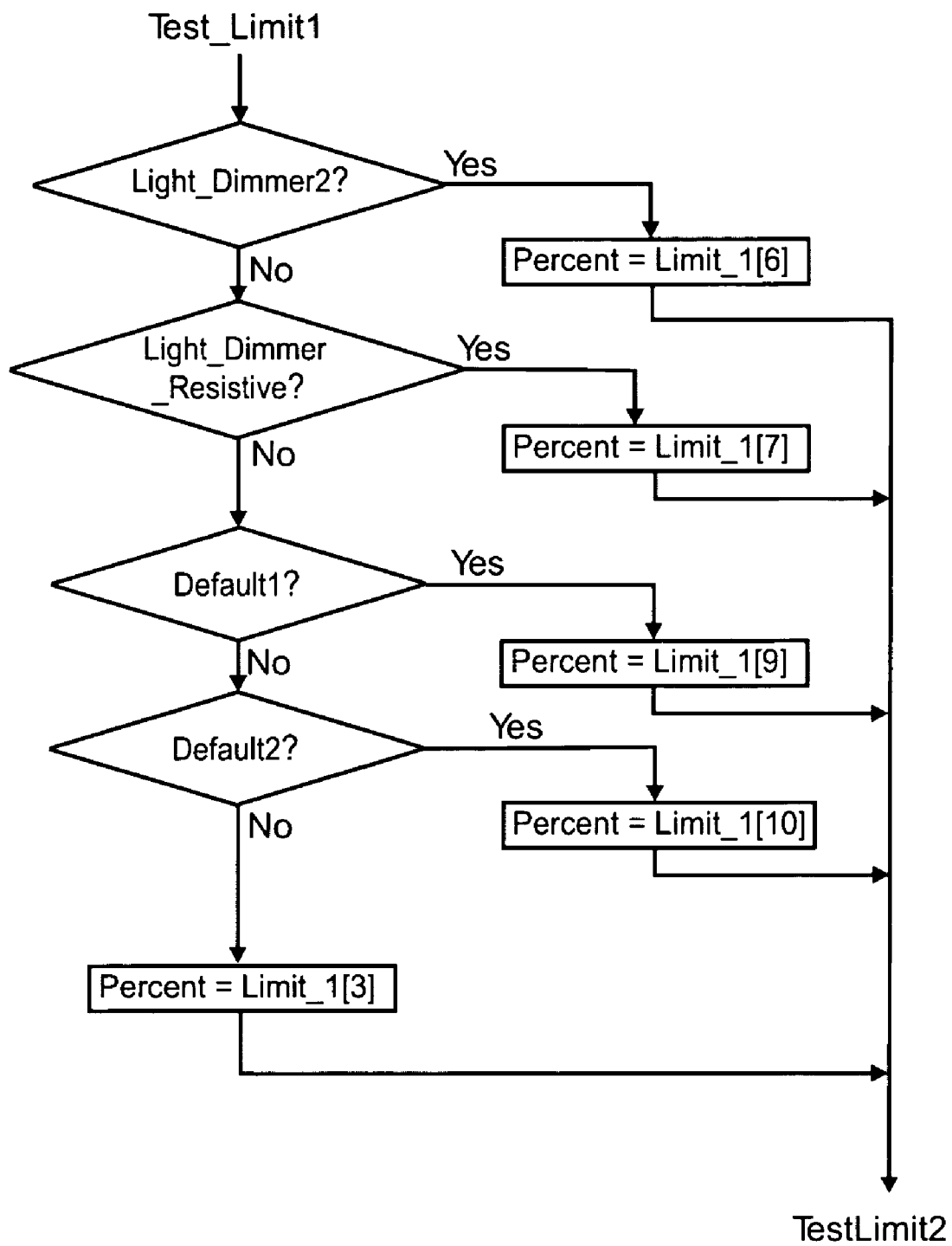
Figure 13C:
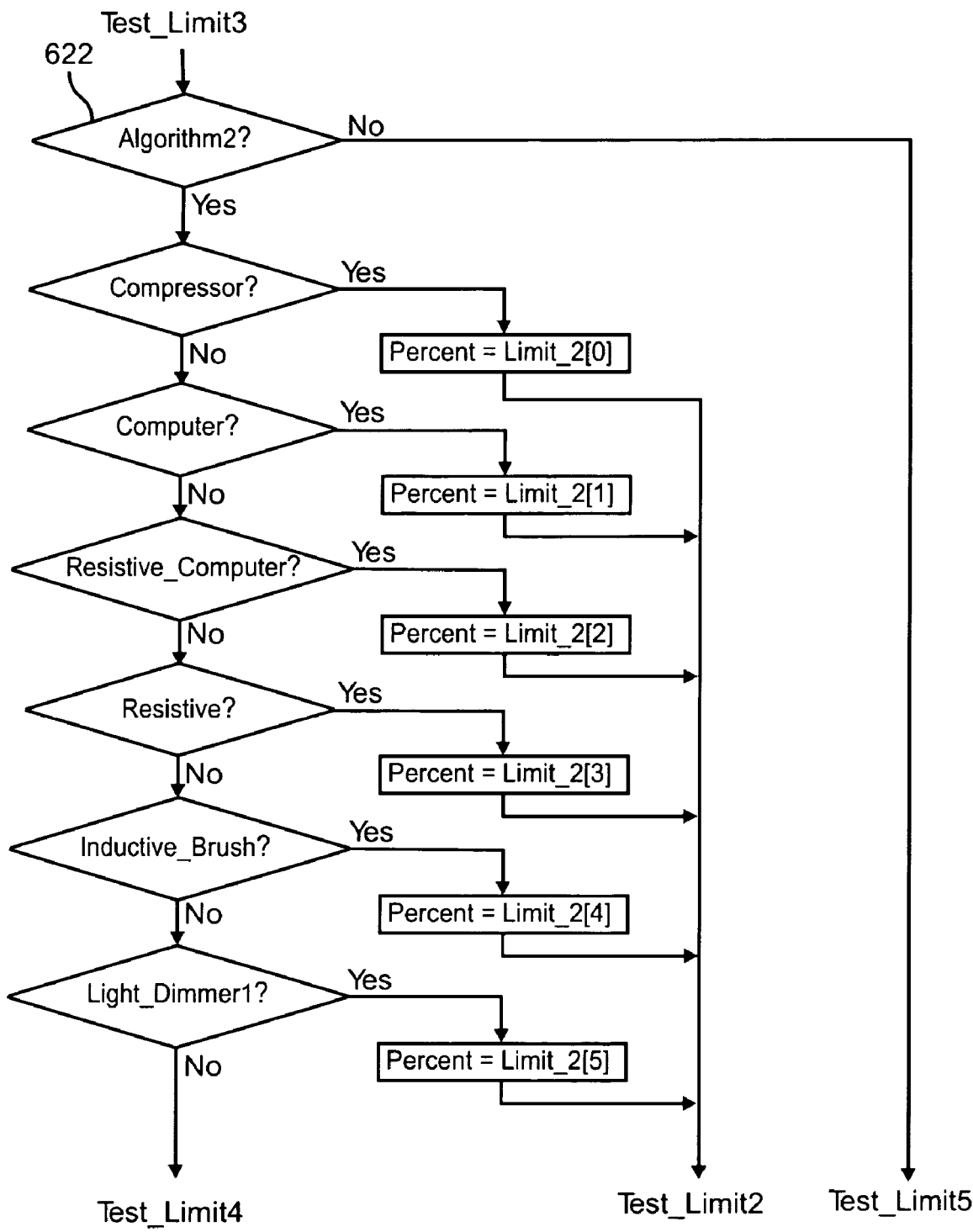
Figure 13D:
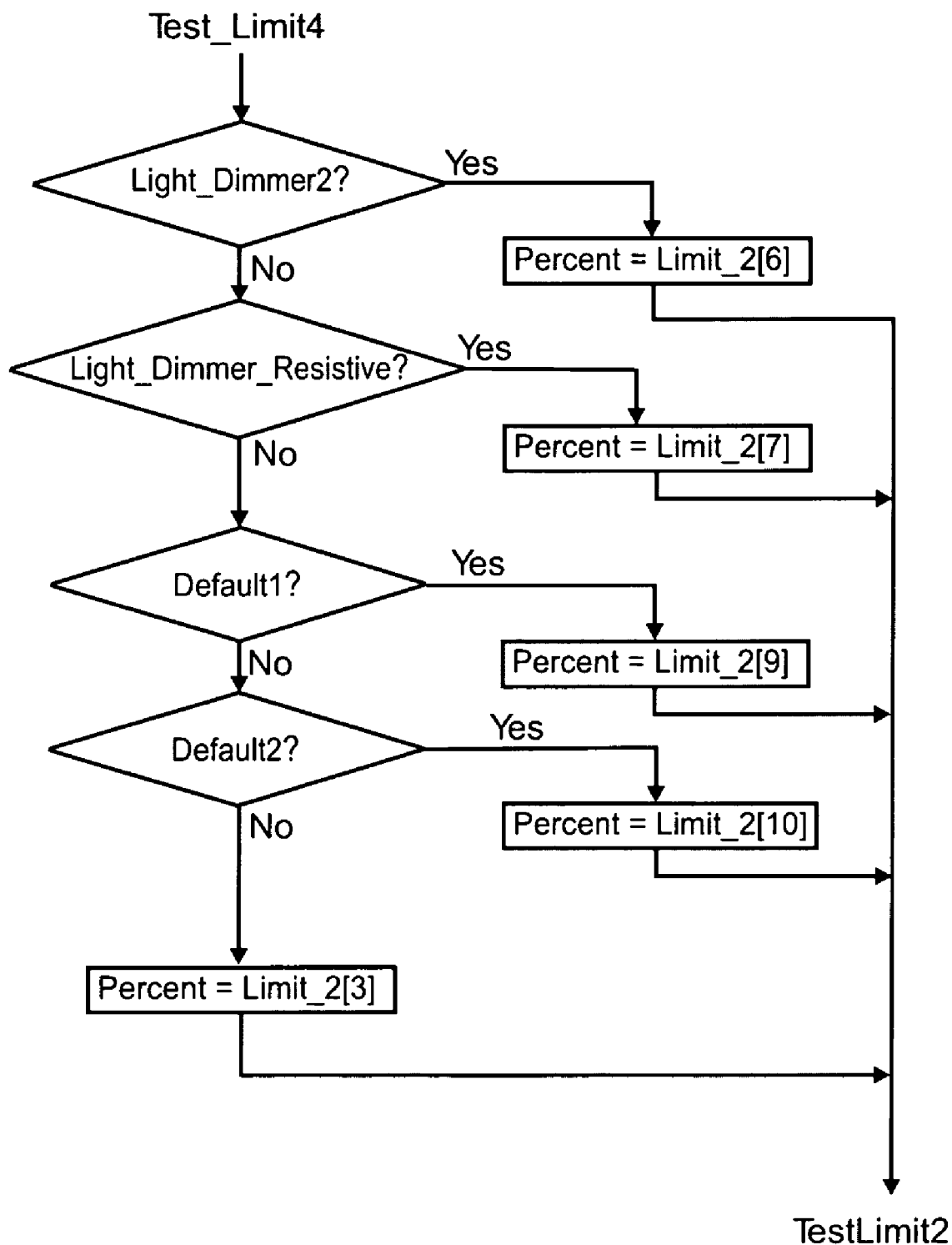
Figure 13E:
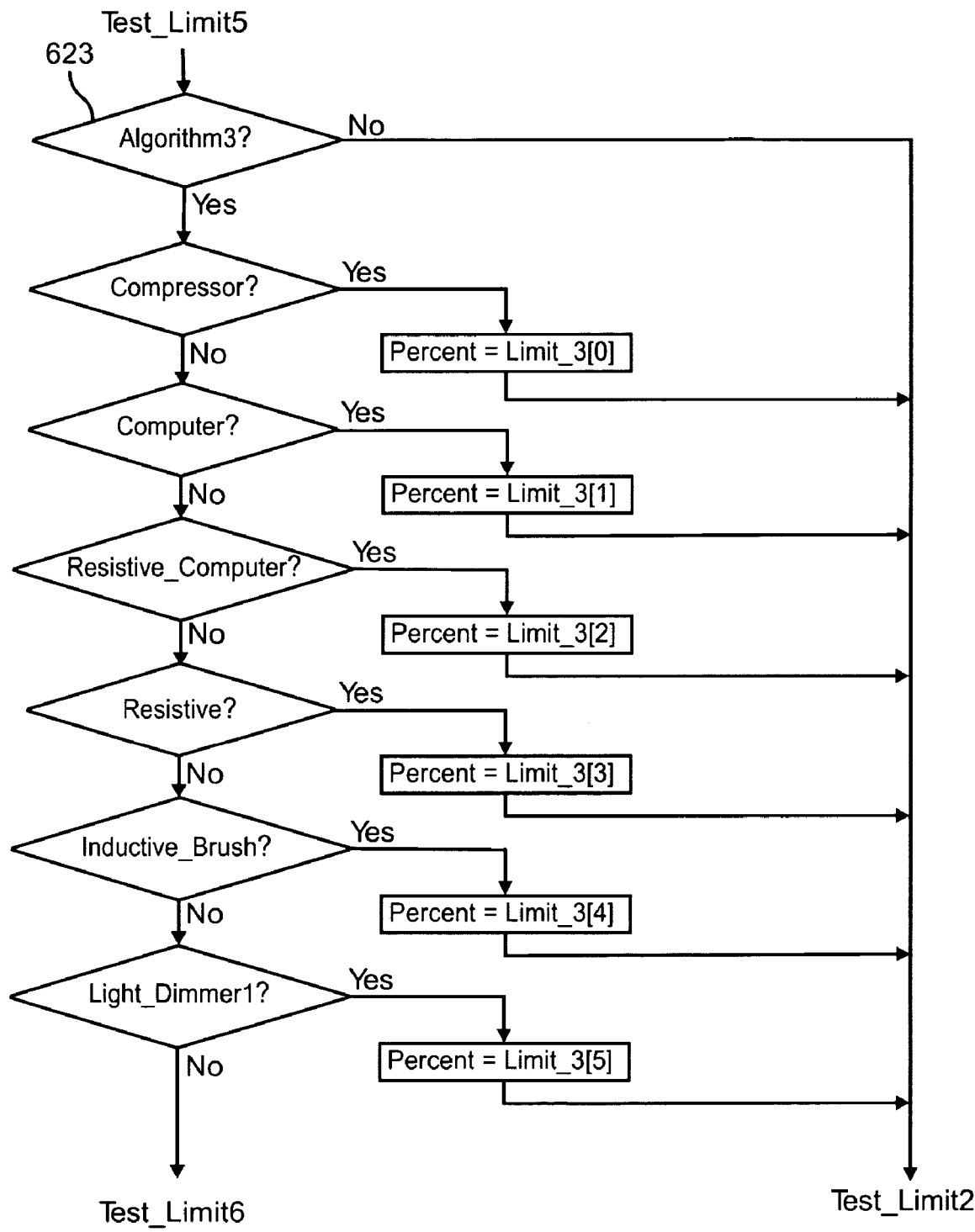
Figure 13F:
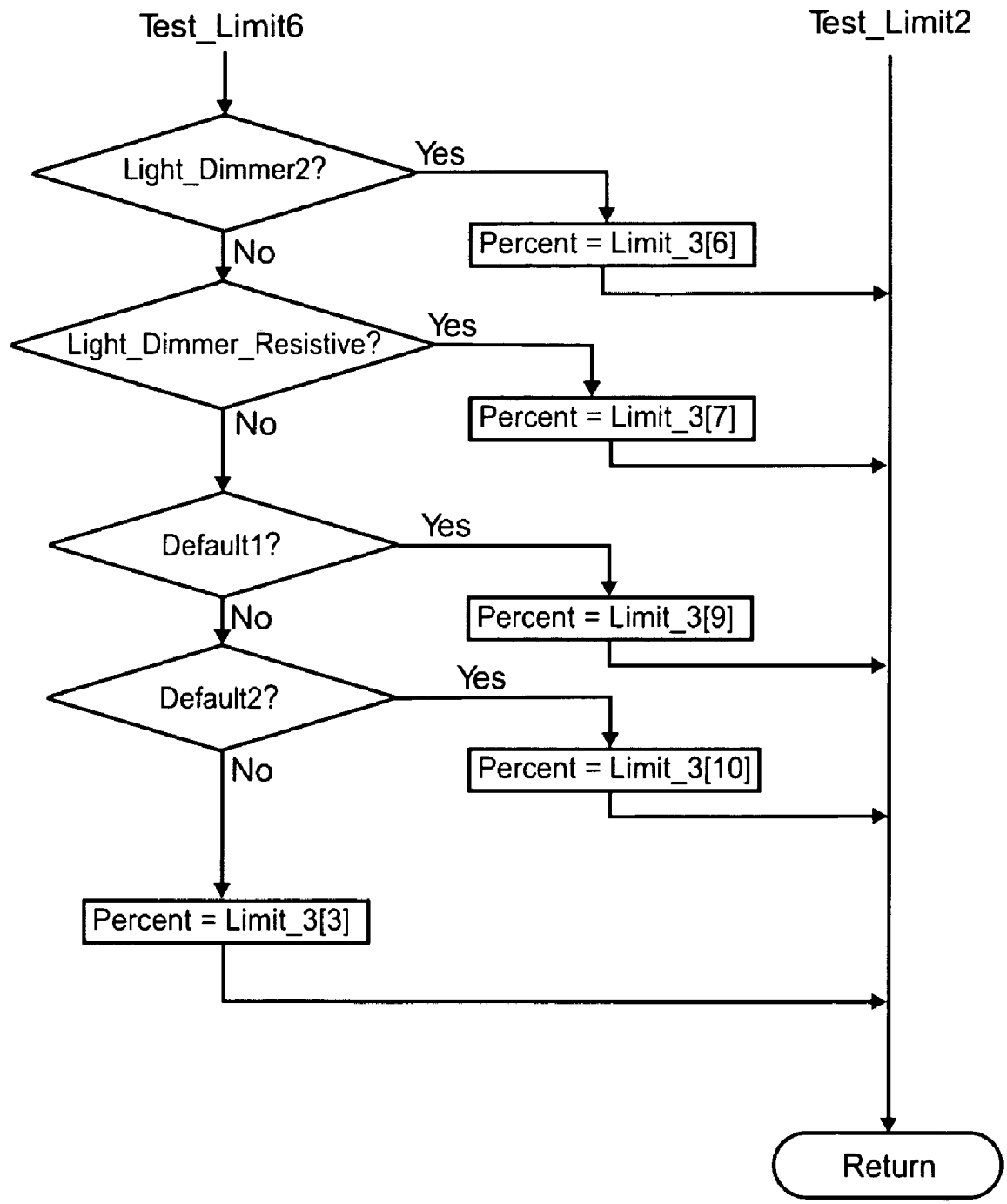

FIG. 12 shows the set parameters module 250. This module sets parameter 1 and parameter 2 registers and a numerator and denominator sign register as well as an a Temp 2 register, depending on the algorithm selected. In this regard three algorithms are selectable in the illustrated embodiment, and as seen with respect to the main program sequence. In FIGS. 5A-5C, the module of FIG. 12 is run three times, one for each of these algorithms. The module itself, as seen in FIG. 12, determines which algorithm is being called for, as indicated at reference numerals 600, 602 and 603. Similarly, the registers set by the module are indicated at reference numerals 604, 605, 606, 608 and 610.

FIGS. 13A-13F show a self-test limit module 252. This module sets certain limits of a percent register for each of the three algorithm types, and like the module of FIG. 12 is run three times as shown in FIGS. 5A-5C, one time for each algorithm, determined as indicated at 620, 622 and 623. In each case, the module sets percent limits (as defined in the table below) for the various load types for each algorithm as generally shown in FIGS. 13A-13F. This includes settings for default 1 and default 2 load types as well.

TABLE 1

| Test Limits Definitions |
|---|
| Limit_1[0] = 12 |
| Limit_1[1] = 24 |
| Limit_1[2] = 128 |
| Limit_1[3] = 64 |
| Limit_1[4] = 32 |
| Limit_1[5] = 64 |
| Limit_1[6] = 100 |
| Limit_1[7] = 100 |
| Limit_1[8] = 128 |
| Limit_1[9] = 32 |
| Limit_1[10] = 32 |
| Limit_2[0] = 12 |
| Limit_2[1] = 24 |
| Limit_2[2] = 128 |
| Limit_2[3] = 64 |
| Limit_2[4] = 32 |
| Limit_2[5] = 64 |
| Limit_2[6] = 100 |
| Limit_2[7] = 100 |
| Limit_2[8] = 128 |
| Limit_2[9] = 32 |
| Limit_2[10] = 32 |
| Limit_3[0] = 16 |
| Limit_3[1] = 16 |
| Limit_3[2] = 128 |
| Limit_3[3] = 32 |
| Limit_3[4] = 32 |
| Limit_3[5] = 64 |
| Limit_3[6] = 100 |
| Limit_3[7] = 64 |
| Limit_3[8] = 128 |
| Limit_3[9] = 32 |
| Limit_3[10] = 32 |

Figure 14A:
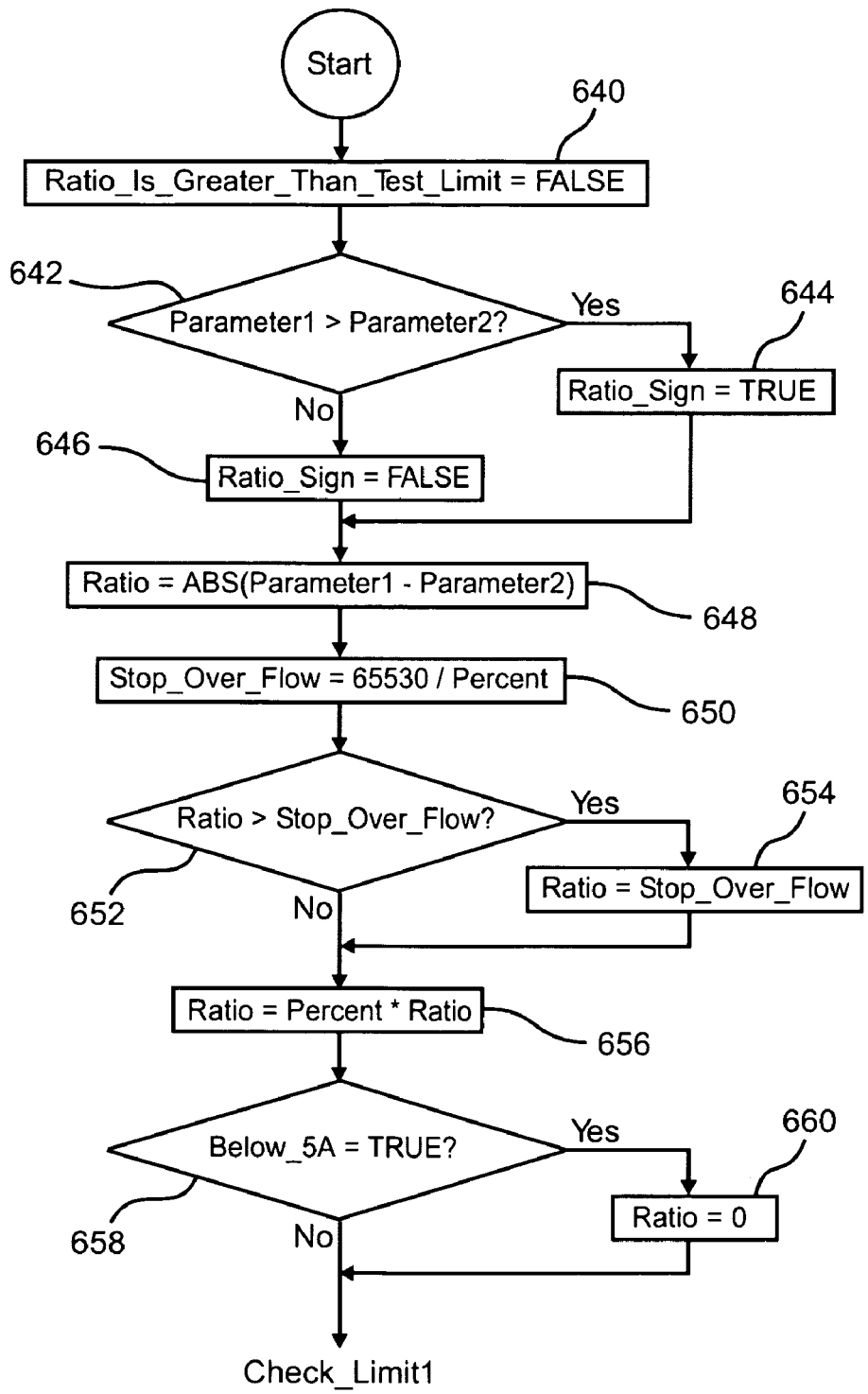
FIGS. 14A and 14B show a flowchart showing operation of a check limit program module.
Figure 14B:
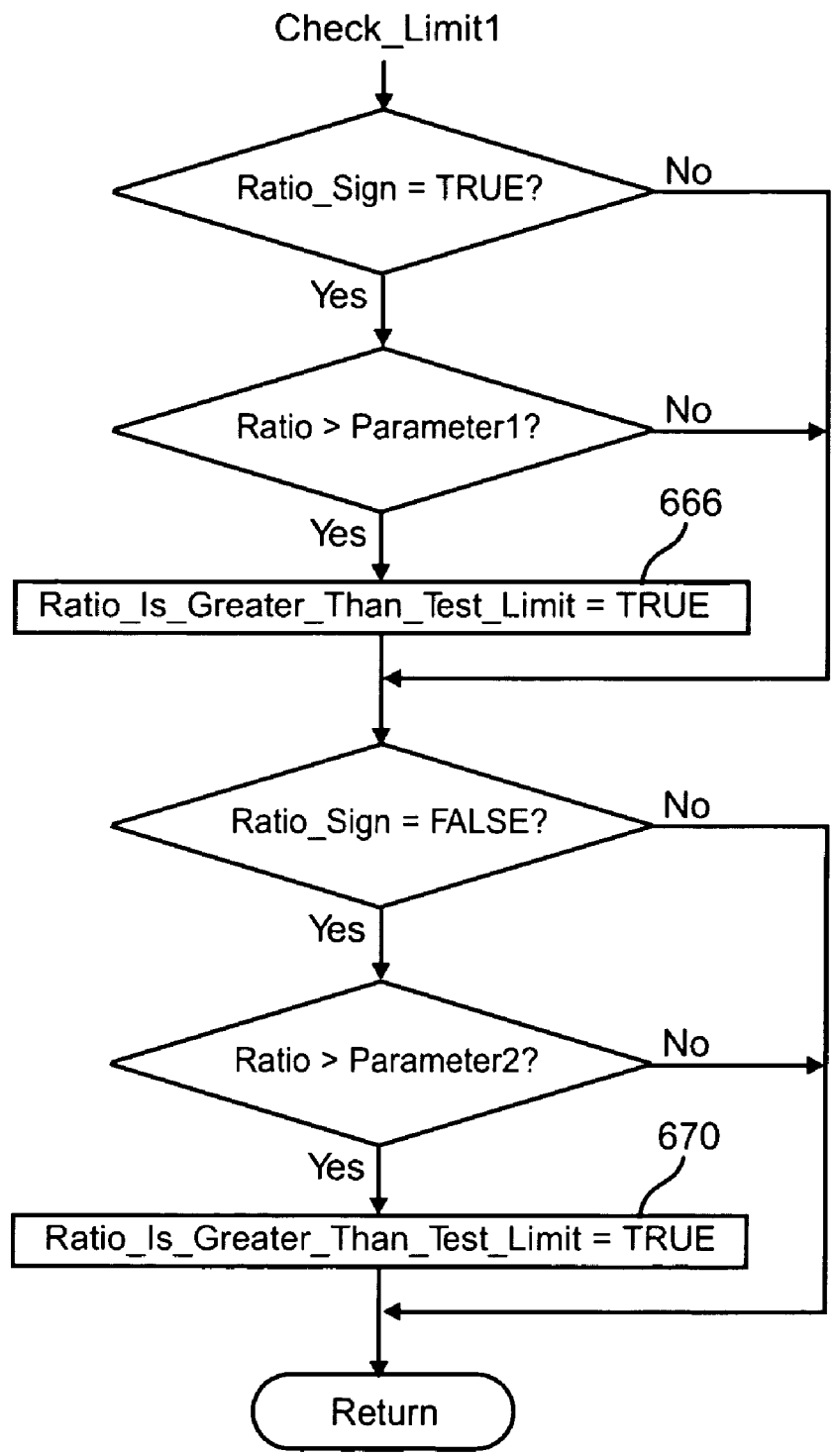

FIGS. 14A-14B show the check limit module 254. This module essentially checks to see if the "parameters" have changed by certain percentage limits as set in the module of FIGS. 13A-13F. A "ratio is greater than test limit" register or buffer is initially set to false as indicated at 640. The sign of the parameters from one sample to the next is next checked at 642 and if positive, indicating a rising wave form edge, the ratio sign is set true at 644 and if negative, indicating a falling edge, the ratio sign buffer is set false at 646. The value of a ratio register is then set as the absolute value of the difference between the parameters at 648, and at 650 a stop overflow limit is set. If the ratio is greater than the stop overflow setting as shown at 652, ratio is set equal thereto at 654 or is set equal to a percentage of the current ratio value at 656 if it is not greater than the stop overflow limit. The state of the below 5 amp buffer is checked at 658, and if true, the ratio is set to zero at 660. If not, if the ratio sign is true and ratio is greater than parameter 1, a ratio is greater than test limit register or buffer is set true at 666. If the ratio sign is set false and the ratio is greater than parameter 2, the ratio is greater than test limit buffer is set true as indicated at 670.

FIGS. 15A-15D show the check slope changes module 256. In the same fashion as the previous modules 250, 252 and 254, this module is also activated or run for each of the three algorithms in the illustrated embodiment, as indicated in FIGS. 5A-5C. It should be noted that in the modules as shown in the flowcharts, certain conventions have been used, including the use of an exclamation point (!) to indicate a logic NOT and && to indicate a logic AND.

Figure 15A:
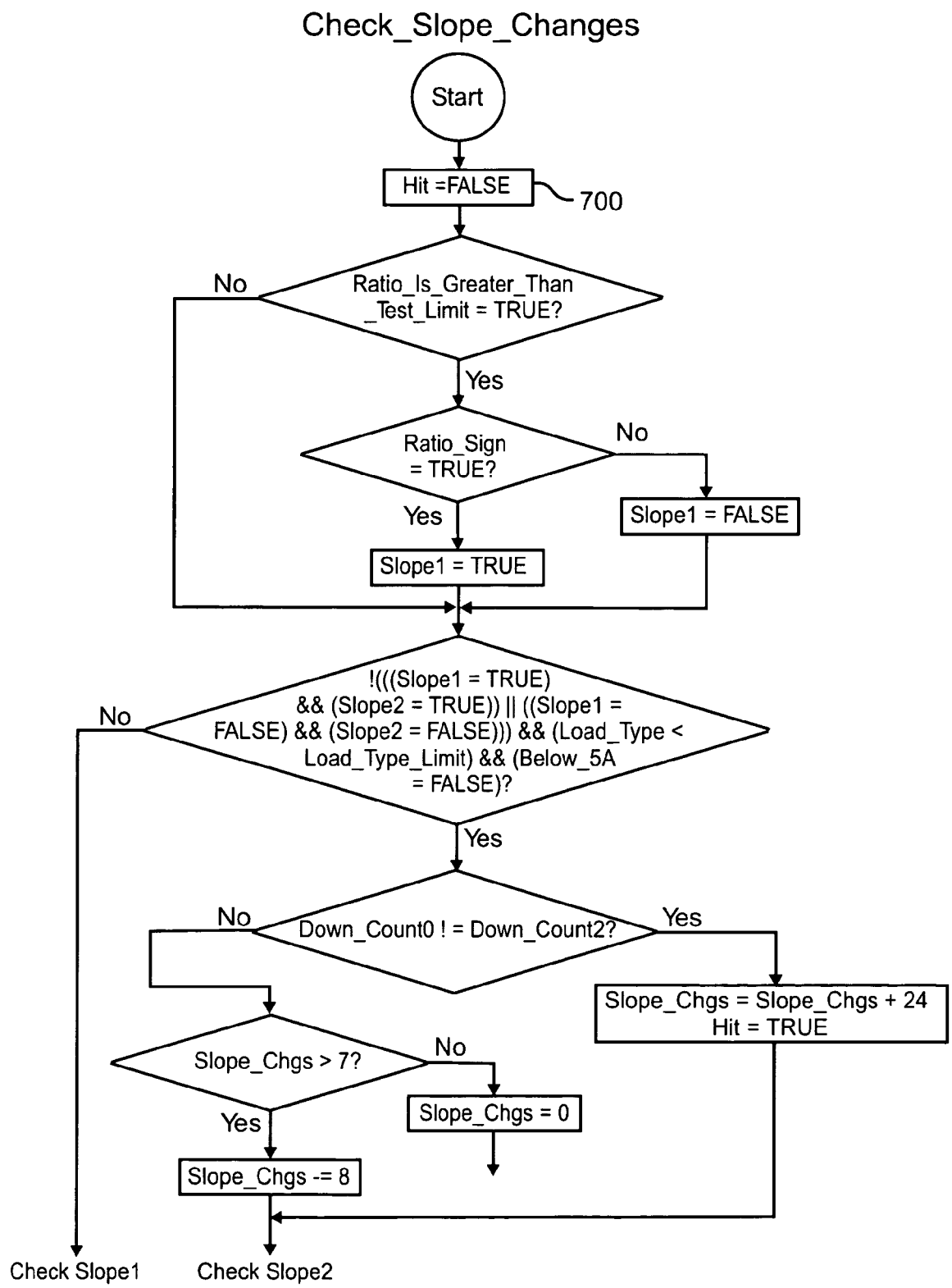
FIGS. 15A-15D show a flowchart showing operation of a check slope changes program module.
Figure 15B:
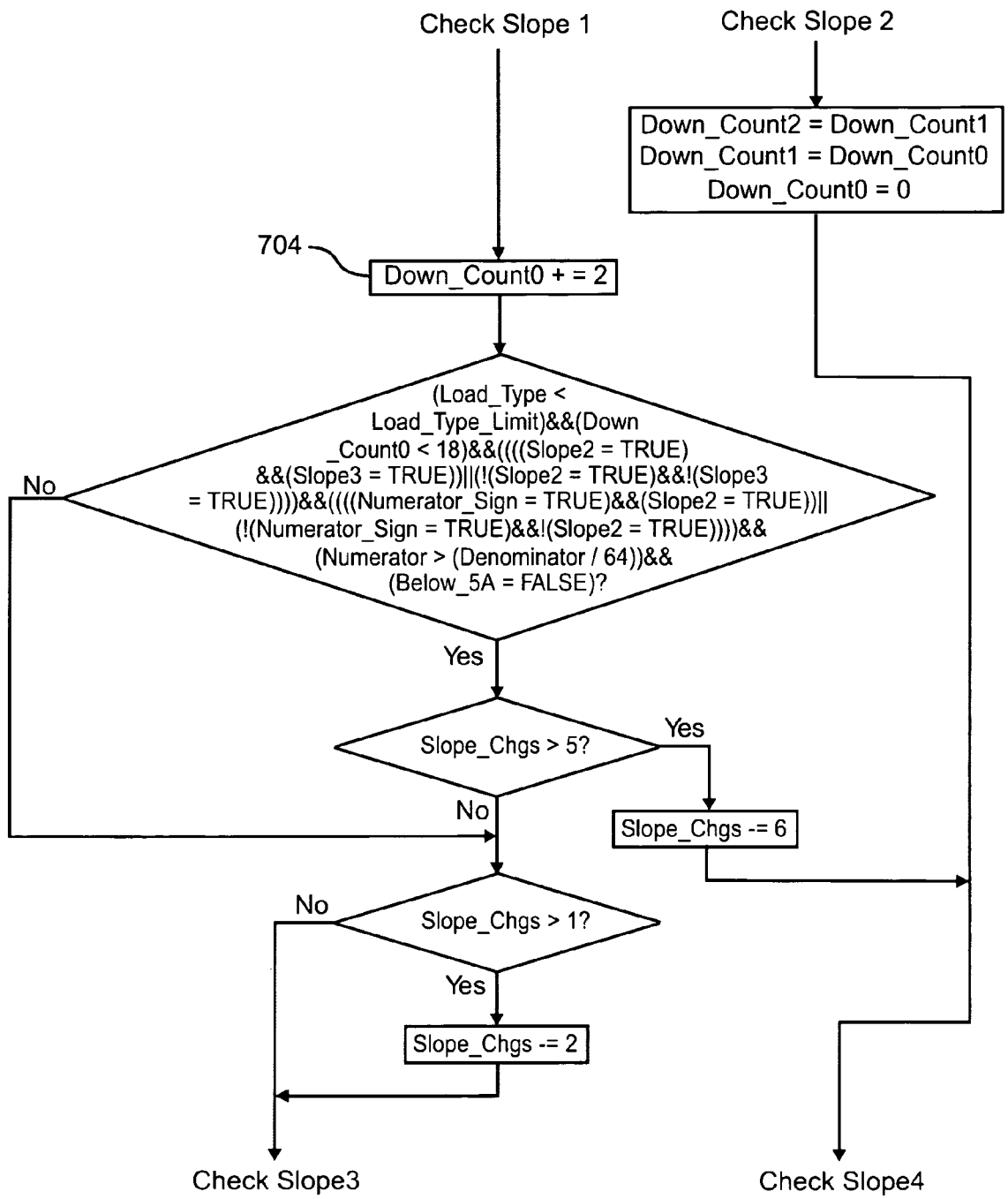
Figure 15C:
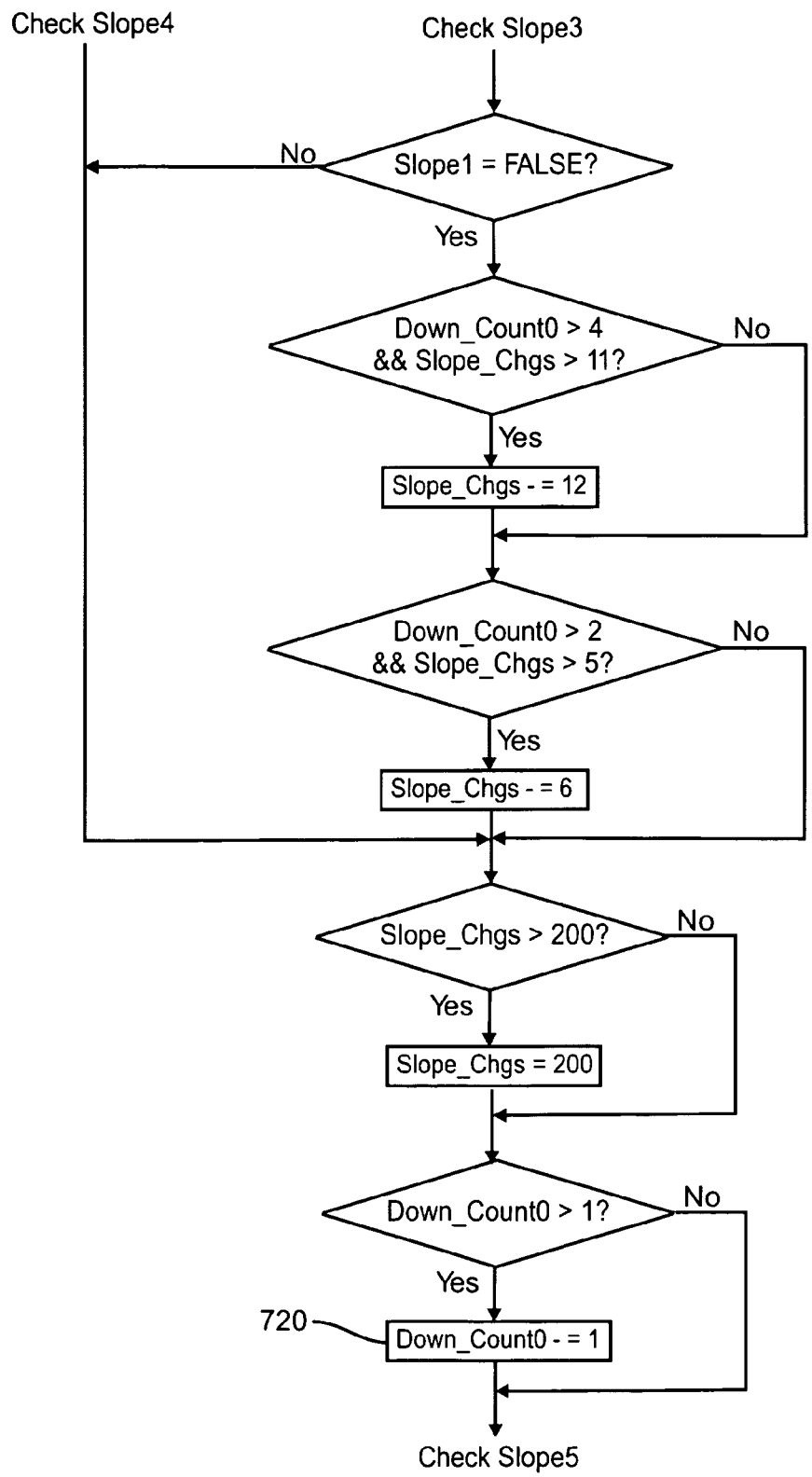
Figure 15D:
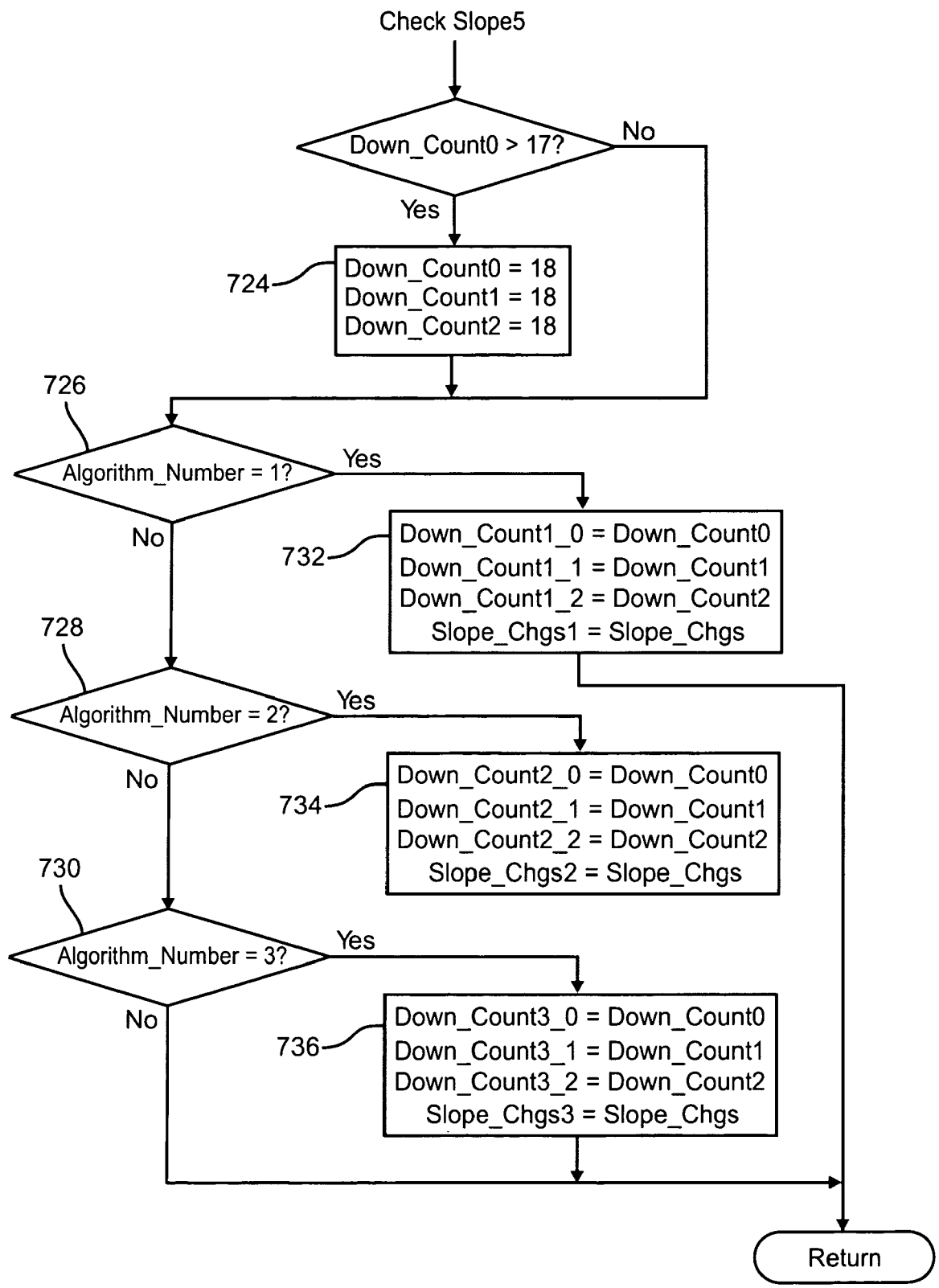

In the check slope changes module, initially a hit buffer is set false showing at reference numeral 700 and this buffer will be set true if certain slope change conditions are met as determined by the remainder of the module. Here, slope one refers to algorithm 1 and slope 2 to algorithm 2 and slope 3 to algorithm 3. The portion of the module in FIG. 15A determines whether the current signature appears more like a start up condition or more like an arcing condition. This portion of the module extends up to and including step 704 in FIG. 15B. Similarly, the portion of the module following step 704 through and including the remaining portion of FIG. 15B comprises further checks for start up conditions vs. arcing. In the portion of the module in FIG. 15C, as the down count increases, this indicates a greater probability of a start up condition. Finally, the down count is decremented each cycle as indicated at reference numeral 720 of FIG. 15C to avoid overfilling its register. In the illustrated embodiment, the maximum down count in the down count register is 18 as indicated in FIG. 15D at reference numeral 724. Finally, at reference numeral 726-730 the member of the algorithm (i.e. 1, 2 or 3) being run is determined and values of the down count registers suitable for the selected algorithm are set at 732, 734 and 736.

Referring to FIG. 16, a missing half cycle check module 274 is shown. This module essentially looks at peaks to determine when arcing is absent from a given half cycle of the current signature.

FIGS. 17A-17F, as mentioned above, are the "type B" algorithms for detecting parallel arcing and are essentially the same as the algorithms described in our above-referenced U.S. Pat. No. 6,259,996.

FIG. 18 shows the step start up algorithms 278 which are provided essentially to accommodate a new load coming online as determined by the current signature. If the start up algorithms as indicated in FIG. 18 are satisfied, tripping is prevented until all of the modules are run once again for a new half cycle.

Referring to FIGS. 19A-19J, the trip equation (algorithm) 262 for the described embodiment of the invention is illustrated. The trip algorithm decides whether or not to cause the controller to produce a trip signal based on a check of the states of different ones and combinations of ones of the counters and the states of various registers or buffers that were incremented and/or decremented or set to true or false or other states of values in the previously described modules.

Figure 19A:
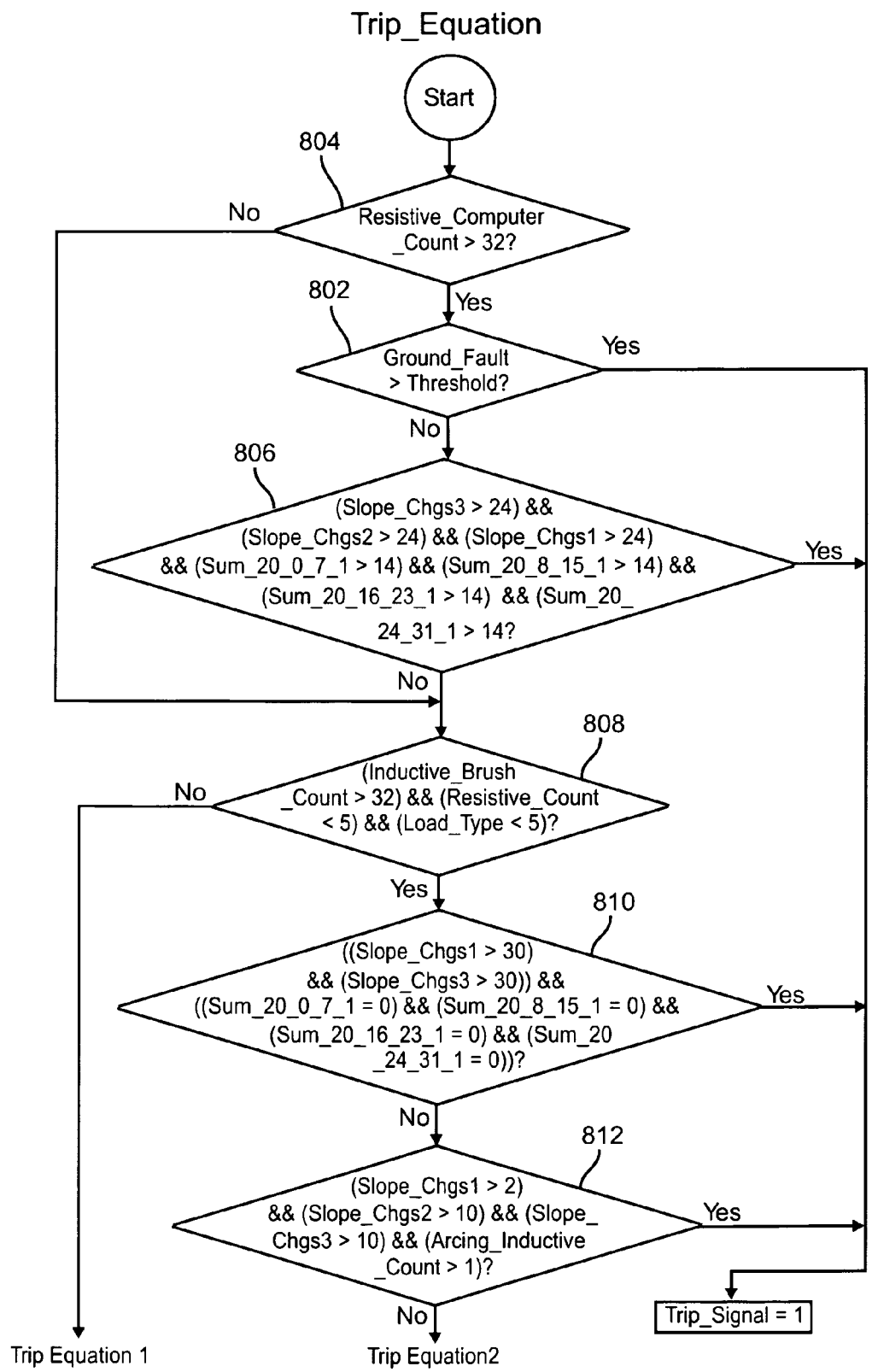
FIGS. 19A-19J show a flowchart showing operation of a trip equation program module.

In FIG. 19A, a trip signal is set at 1 if one of several conditions is met. One condition at 802 is a comparison of a ground fault counter to a threshold. Other criteria are a minimum count in a resistive computer counter at 804 and minimum counts in several slope change and sum counters at 806. Other such conditions include the counts in several slope change and sum counters as well as certain load type counters, as shown at 808-812. If the resistive computer count does not meet the minimum count indicated at 804, or if the conditions at 802-806 and those at 808 or 810 and 812 are not met, the program proceeds to test for an arcing fault based on a different set of criteria, as shown in FIG. 19B.

Figure 19B:
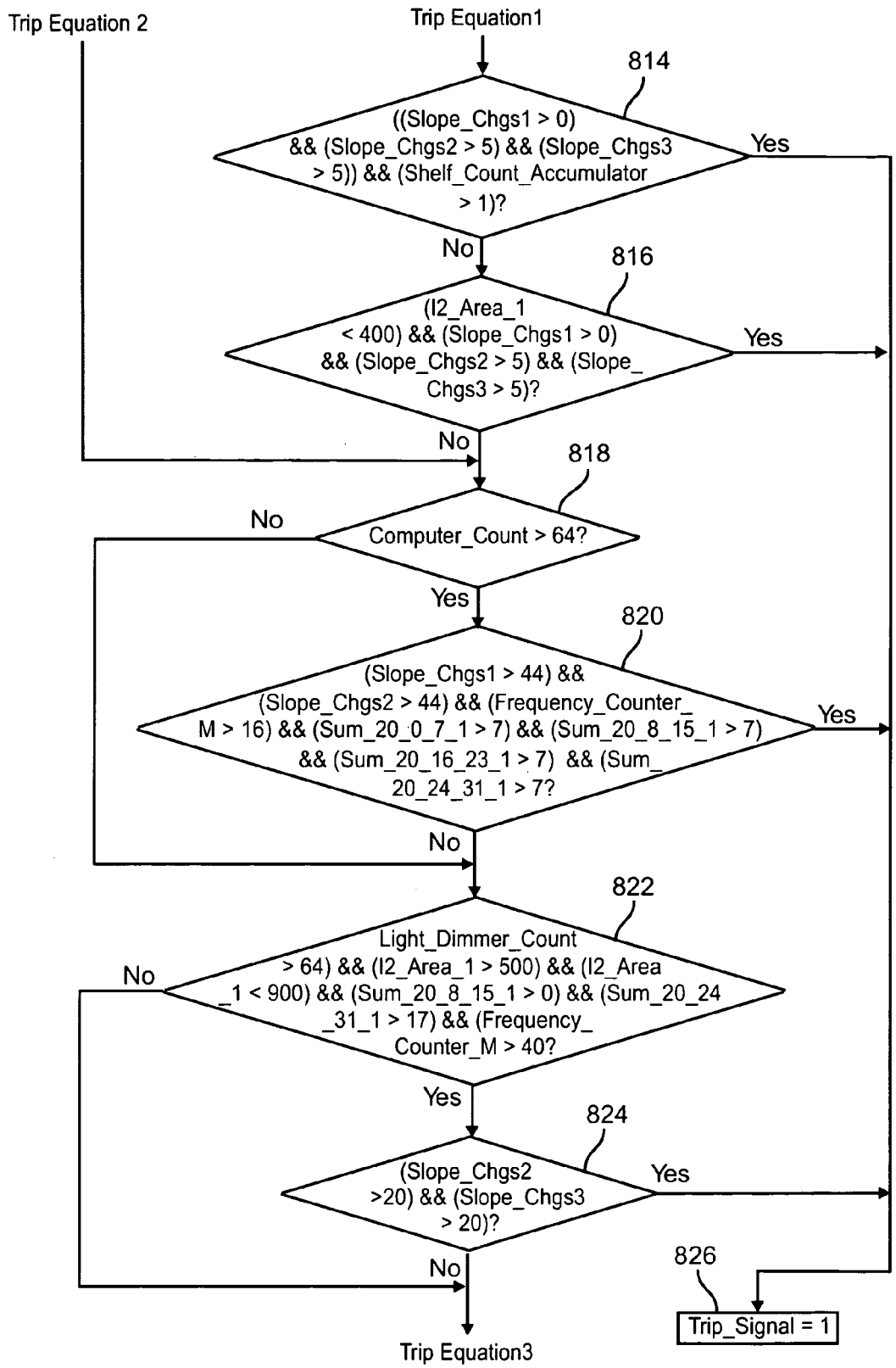
Figure 19C:
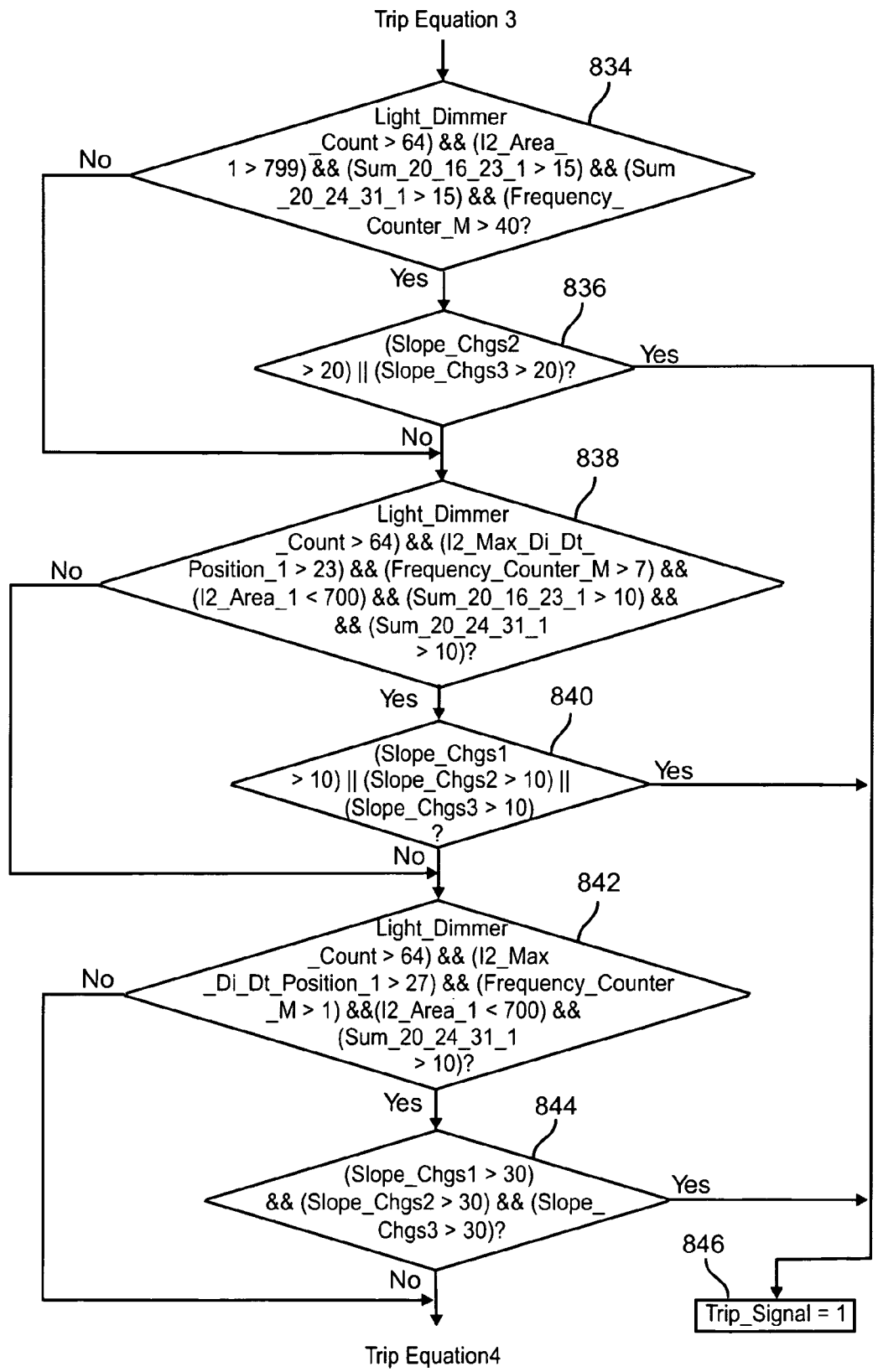
Figure 19D:
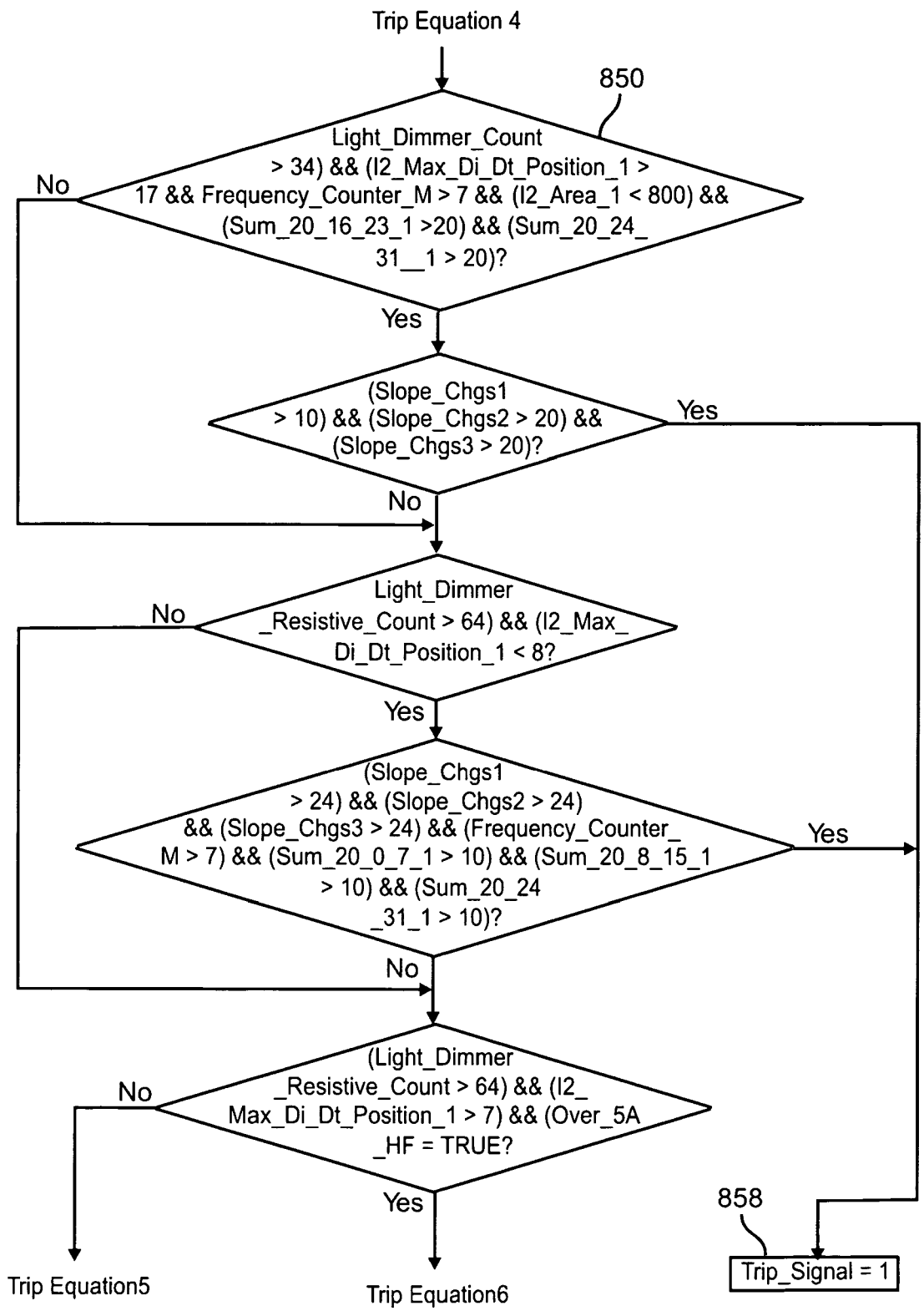
Figure 19E:
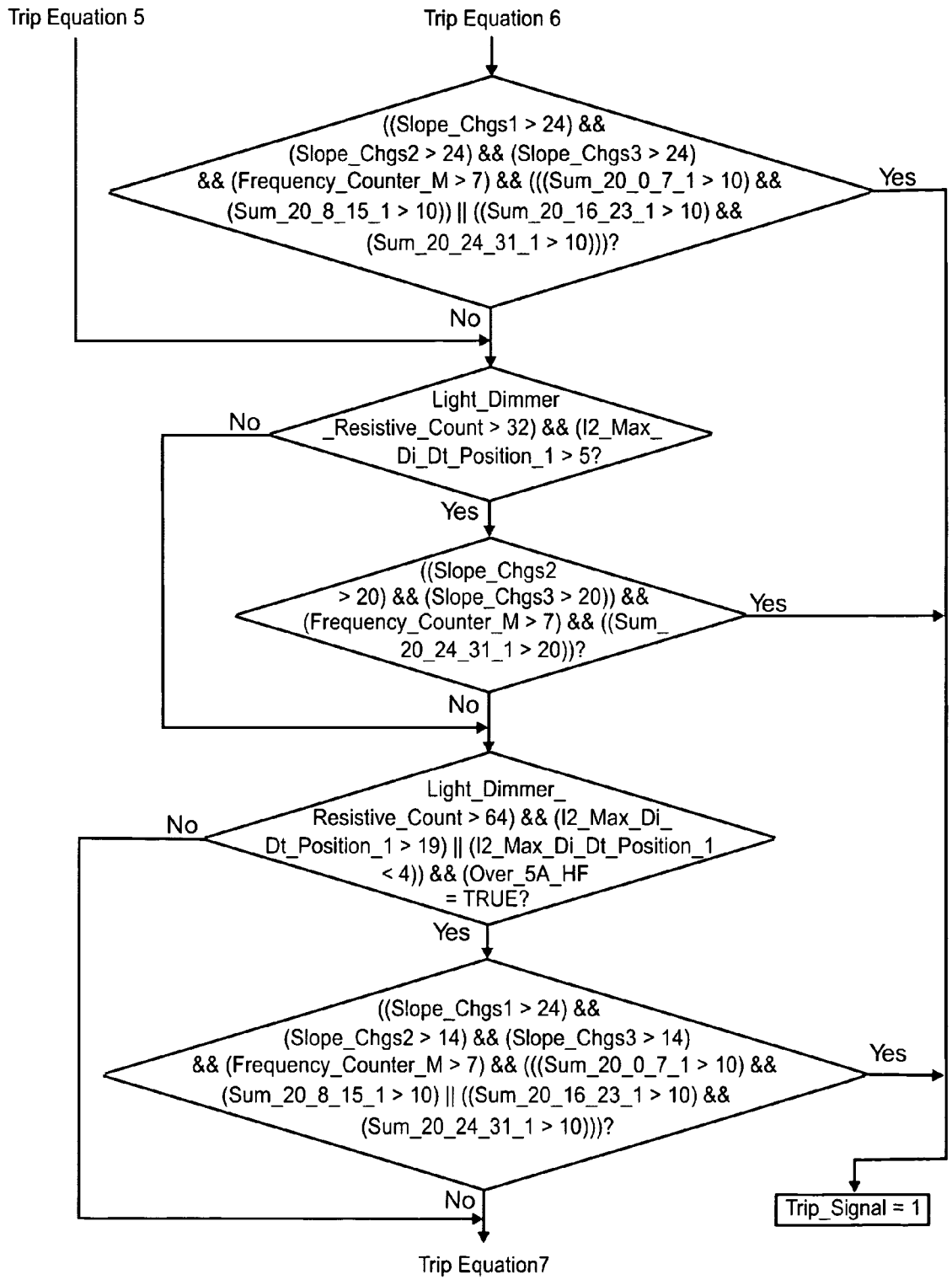
Figure 19F:
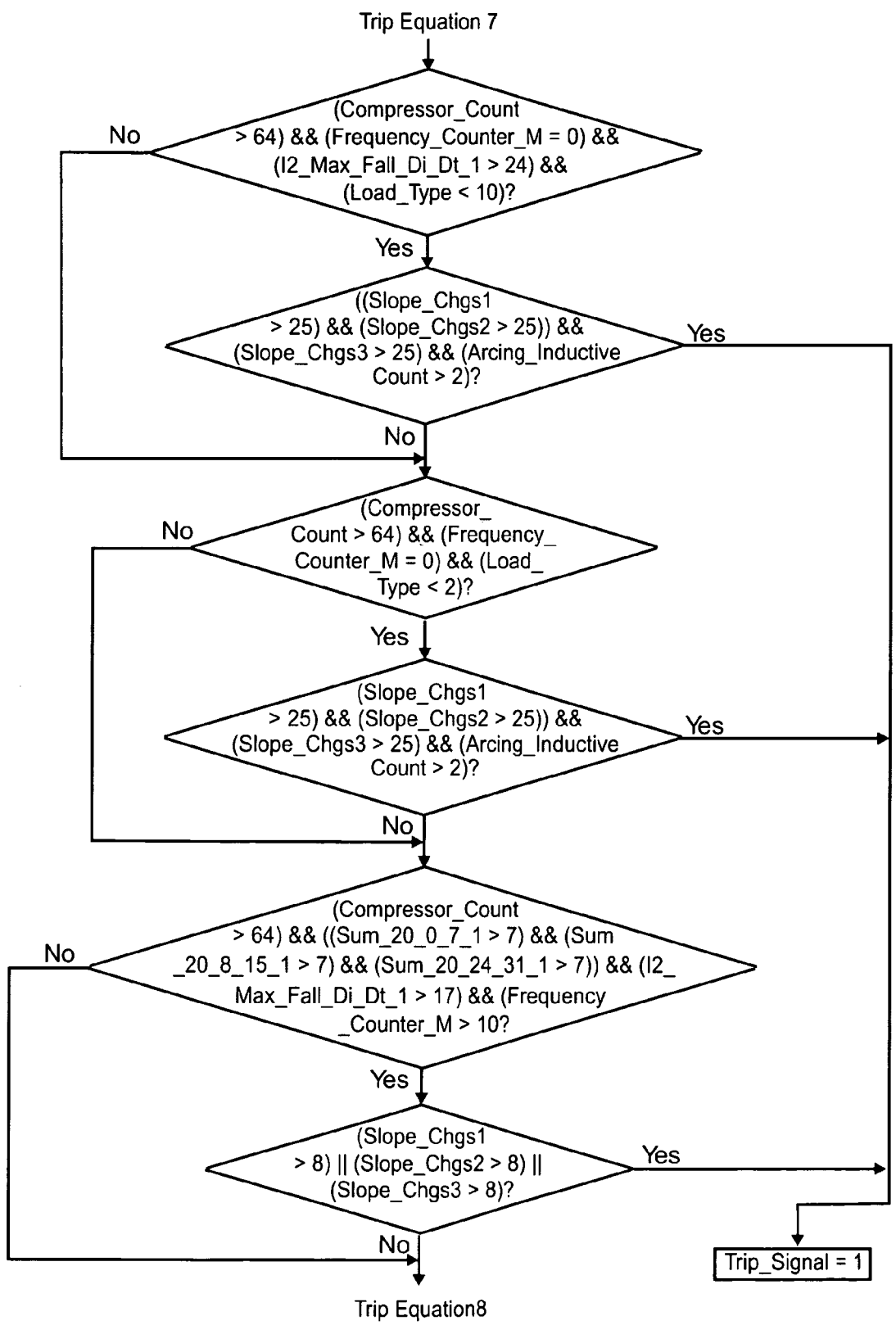
Figure 19G:
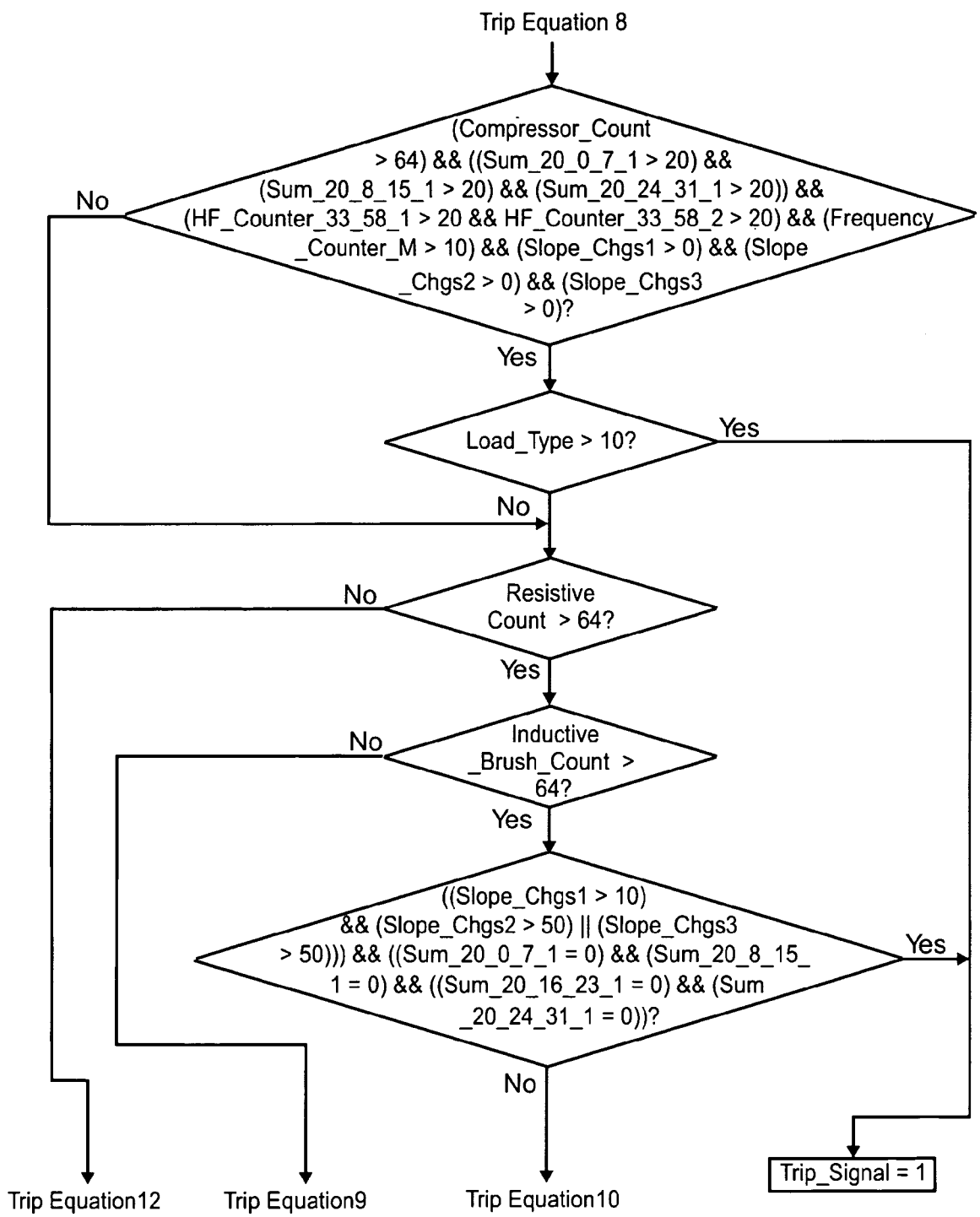
Figure 19H:
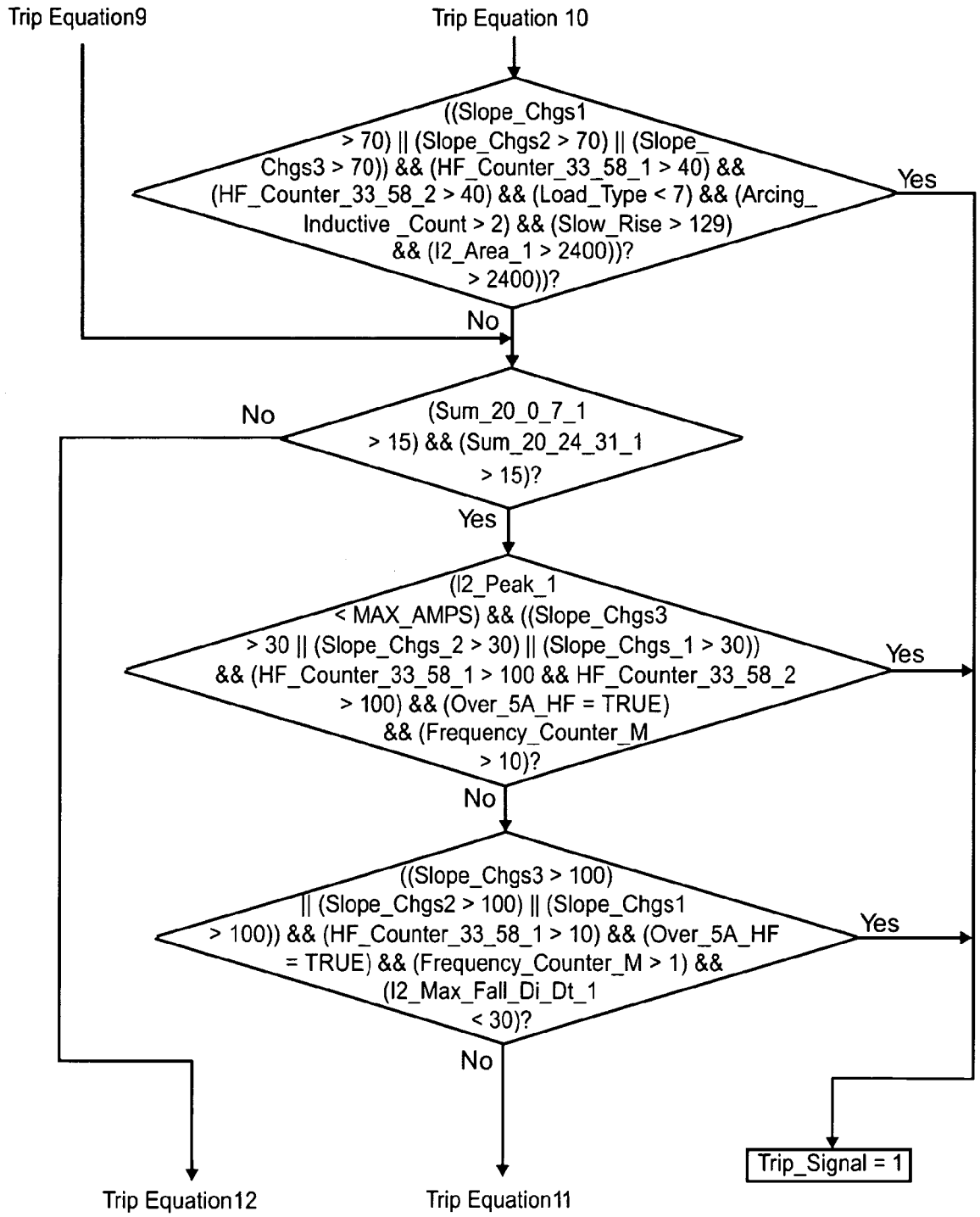
Figure 19I:
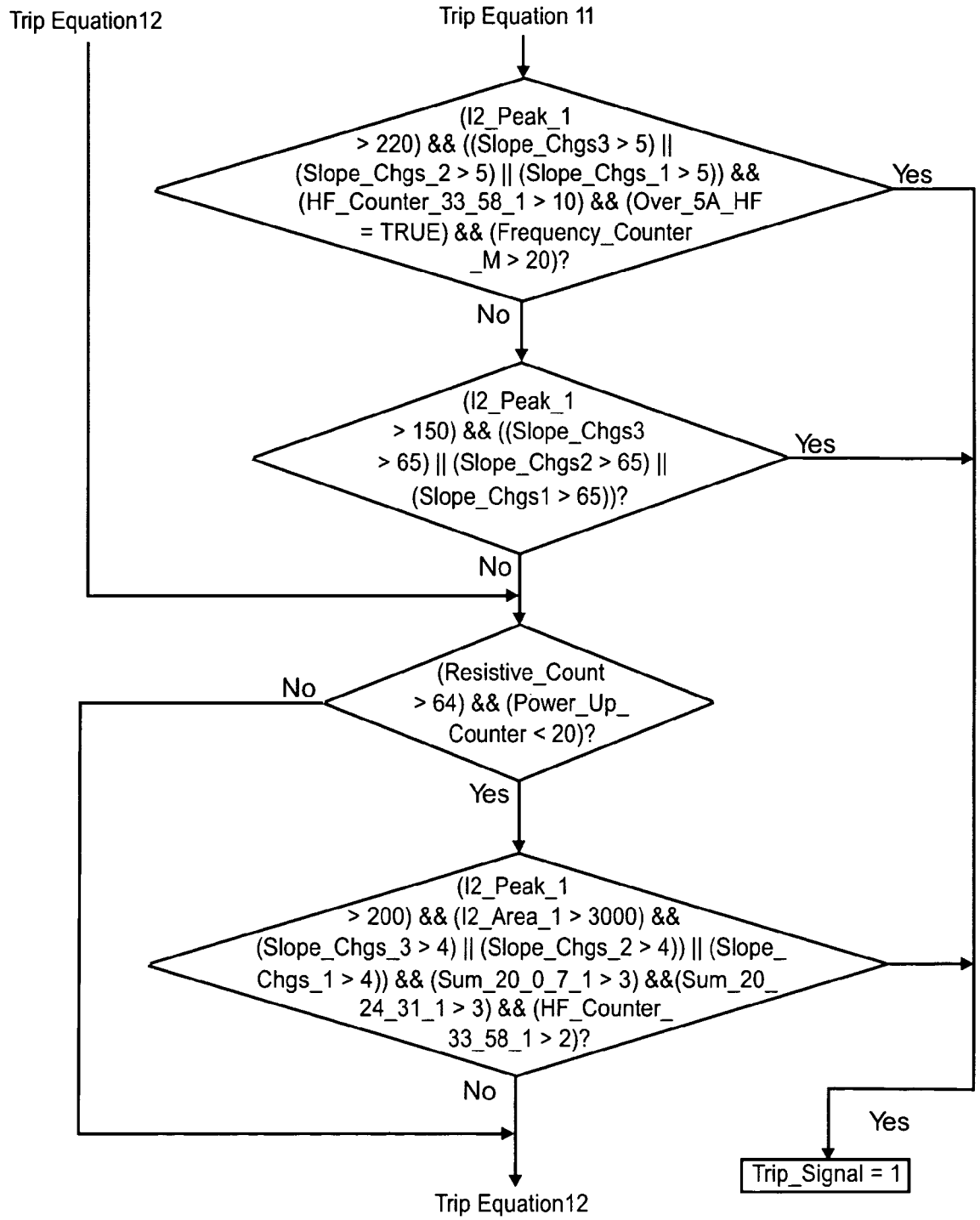
Figure 19J:
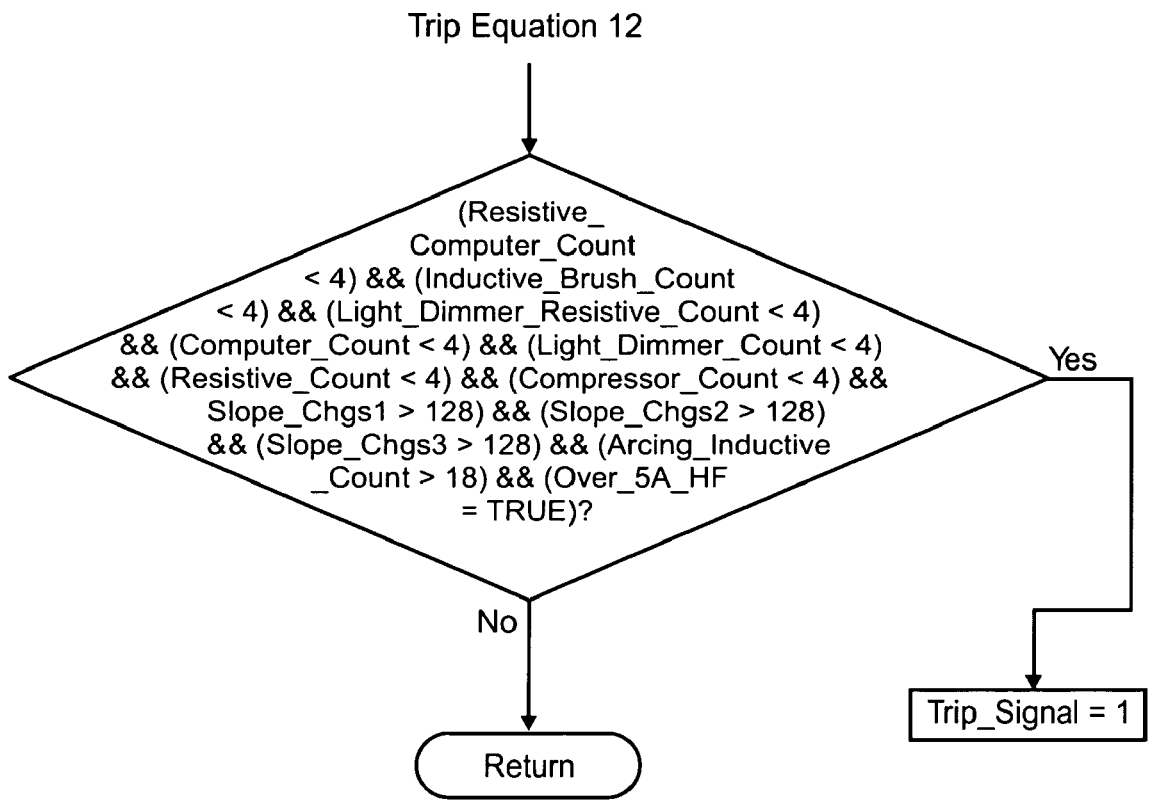

FIG. 19B shows a number of conditions which will cause the giving of a trip signal, including minimum readings in selected groups of counters, at steps 814 through 824. Some of these conditions, if met, will cause a trip signal to be set (826) and if not met, will cause the program to proceed to the next set of equations in FIG. 19C. In FIG. 19C, a similar process takes place focusing on a light dimmer load, and reading the counts in various counters and combinations of counters (834-844) to decide whether to set the trip signal at 846 or proceed to FIG. 19D. Similarly, FIG. 19D begins with a check of the light dimmer counter and other selected counters at 850 and proceed with a chain of checks of various counter contents which, as indicated in FIG. 19D will result in either setting a trip signal at 858 or proceeding to FIG. 19E.

In FIGS. 19E-19J, yet other selected groups of counters are read, and in similar fashion to the previously described FIGS. 19A-19D, either a trip signal is set or the module proceeds.

Figure 20A:
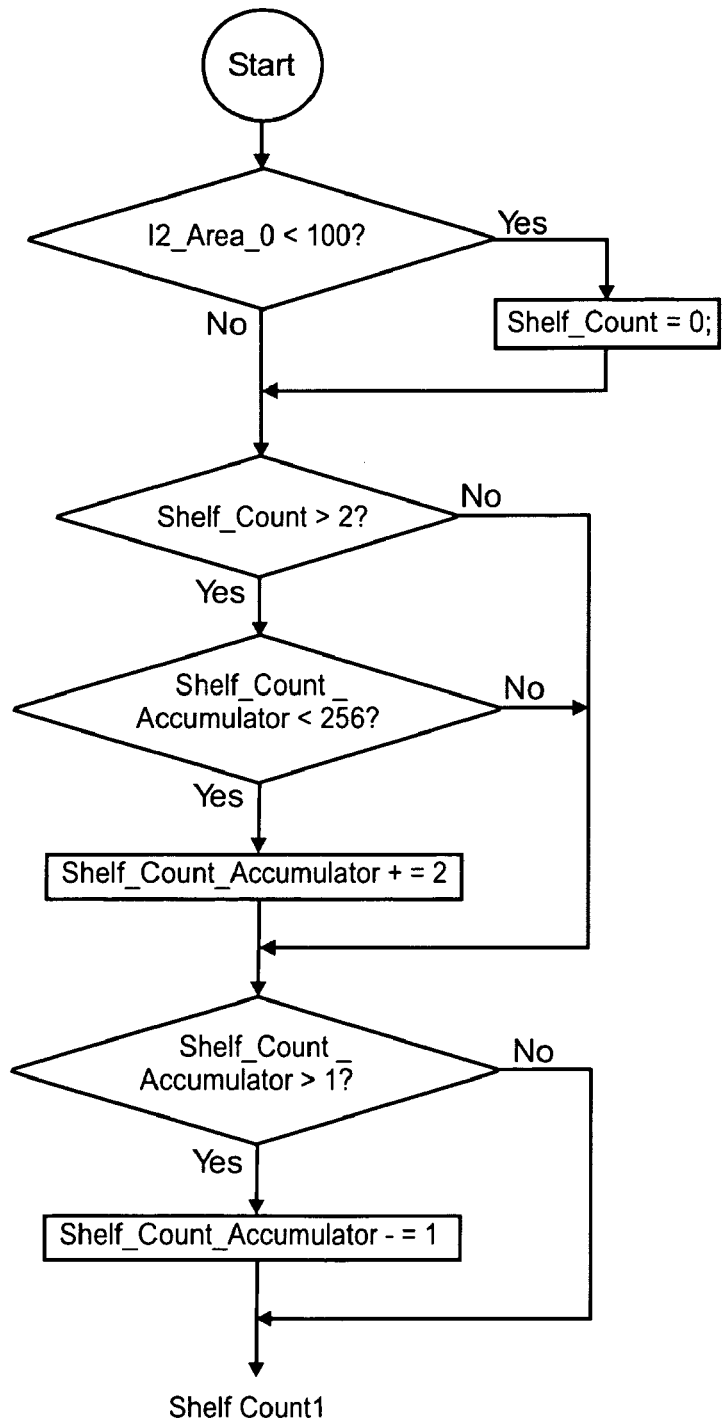
FIGS. 20A and 20B show a flowchart showing operation of a check for current shelf program module.
Figure 20B:
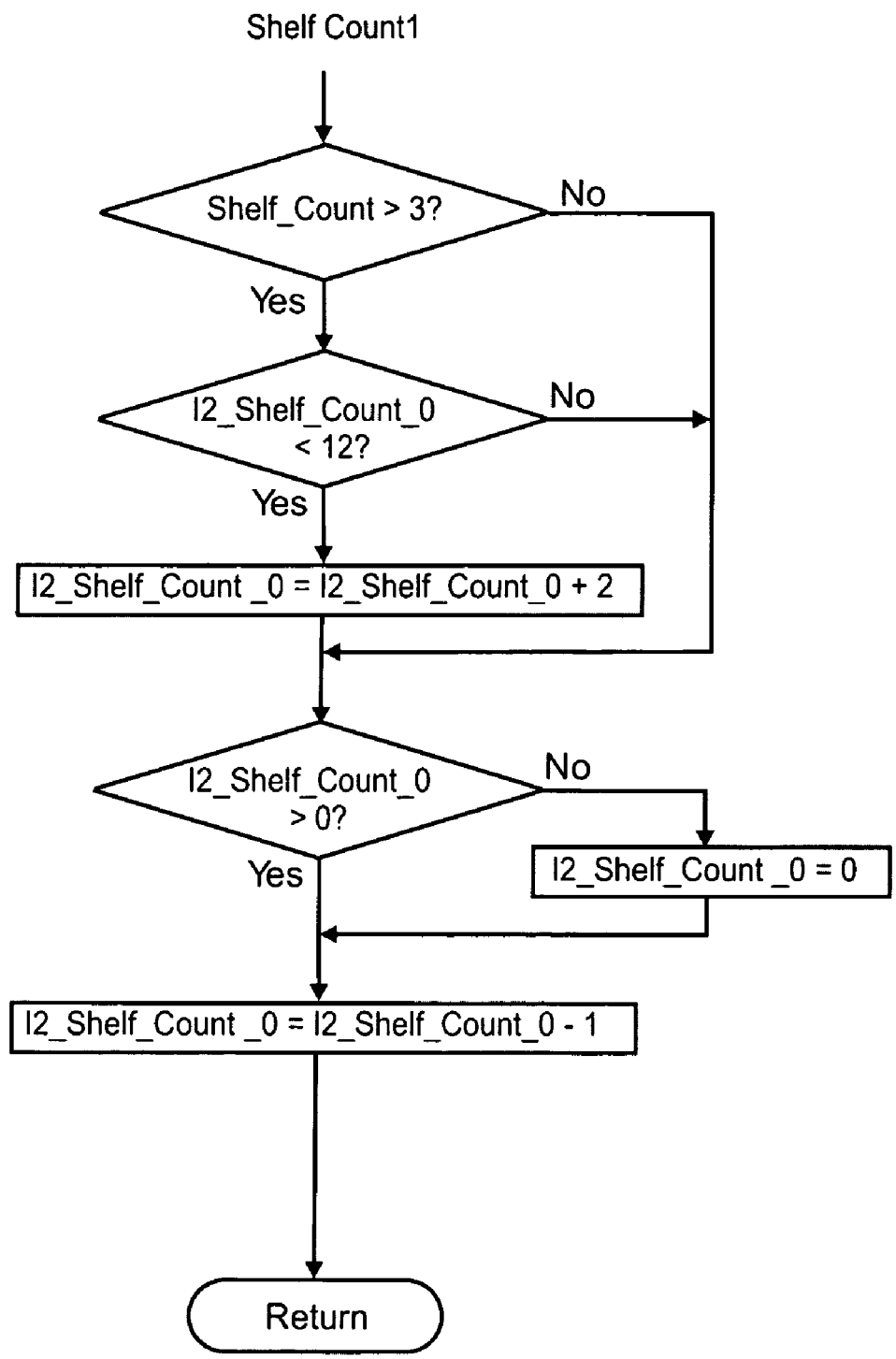

Referring to FIGS. 20A and 20B, the check for current shelf module 284 essentially looks for flat spots in the current signature. This module increments and/or decrements a shelf count accumulator in accordance with the area and shelf count registers as well as the current state of the shelf count accumulator.

Figure 21A:
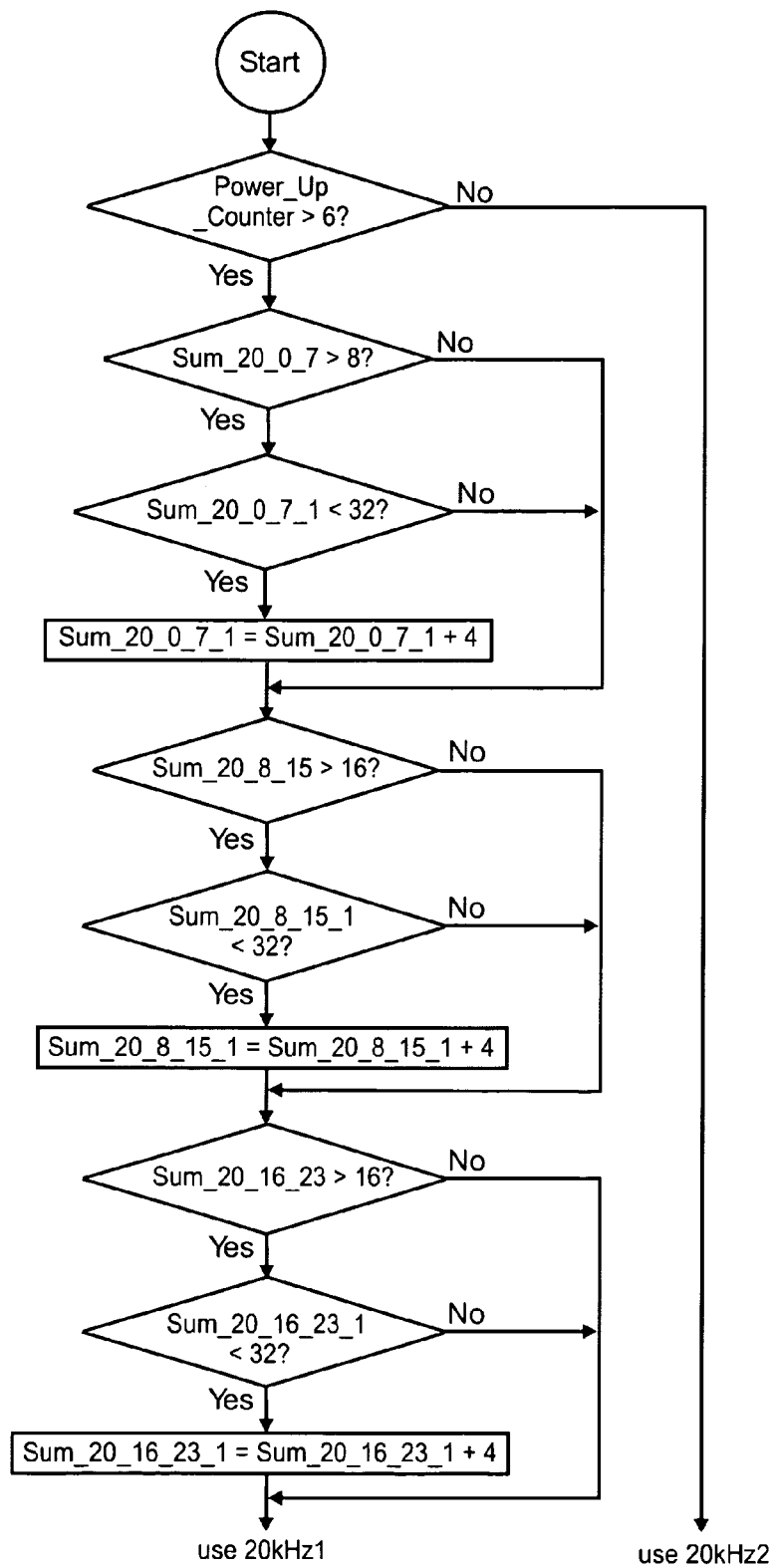
FIGS. 21A-21C show a flowchart showing operation of a use 20 KHz filter program module.
Figure 21B:
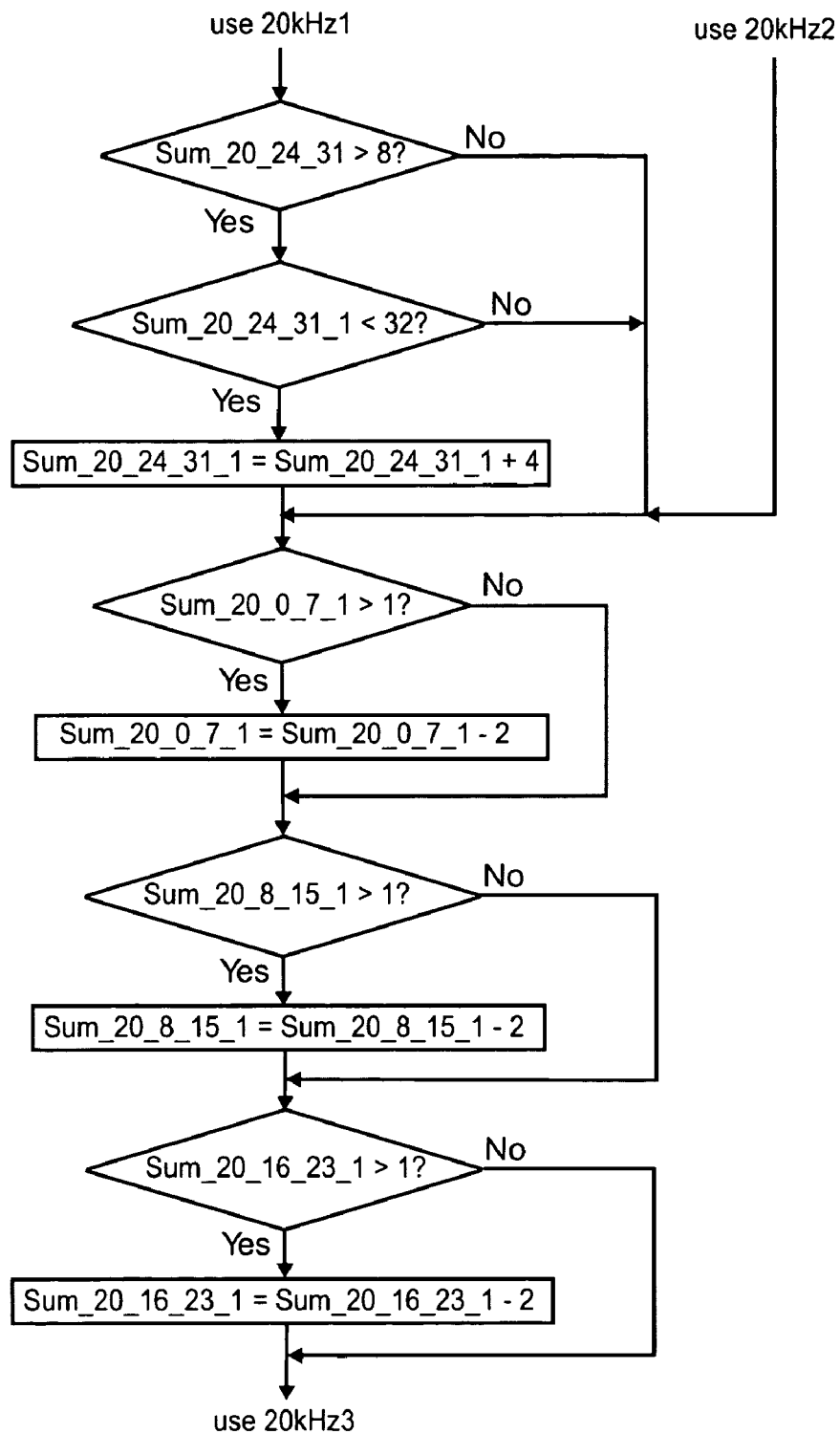
Figure 21C:
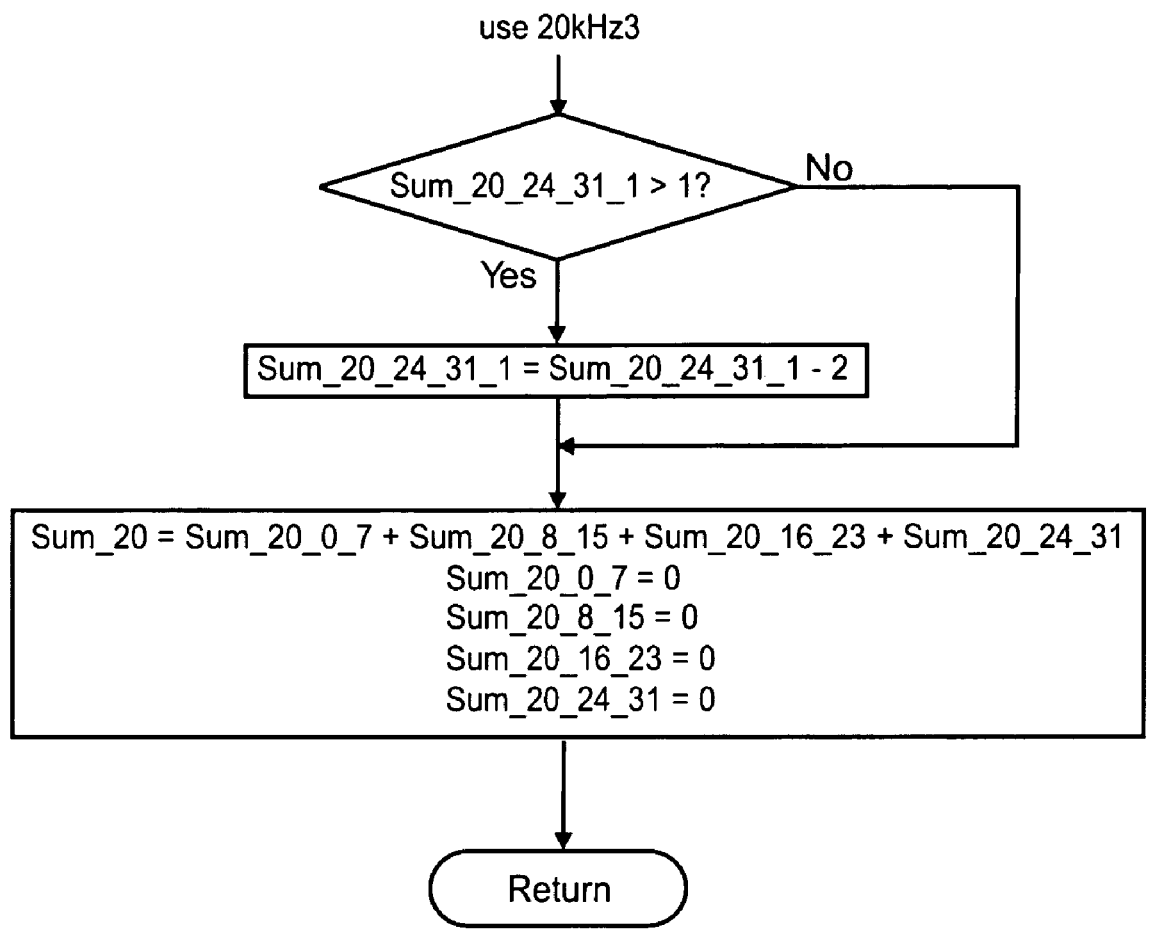

FIGS. 21A-21C show the use 20 KHz filter module 286. This module essentially splits the 20 KHz filter output into ⅛ cycle portions within which the 32 samples per half cycle are read. In this regard the maximum of each of the sum counters as shown in FIGS. 21A-21C is a count of 32. This algorithm sets the sum counters to various values as indicated therein and also sets and/or resets a shelf count accumulator as indicated.

Figure 22A:
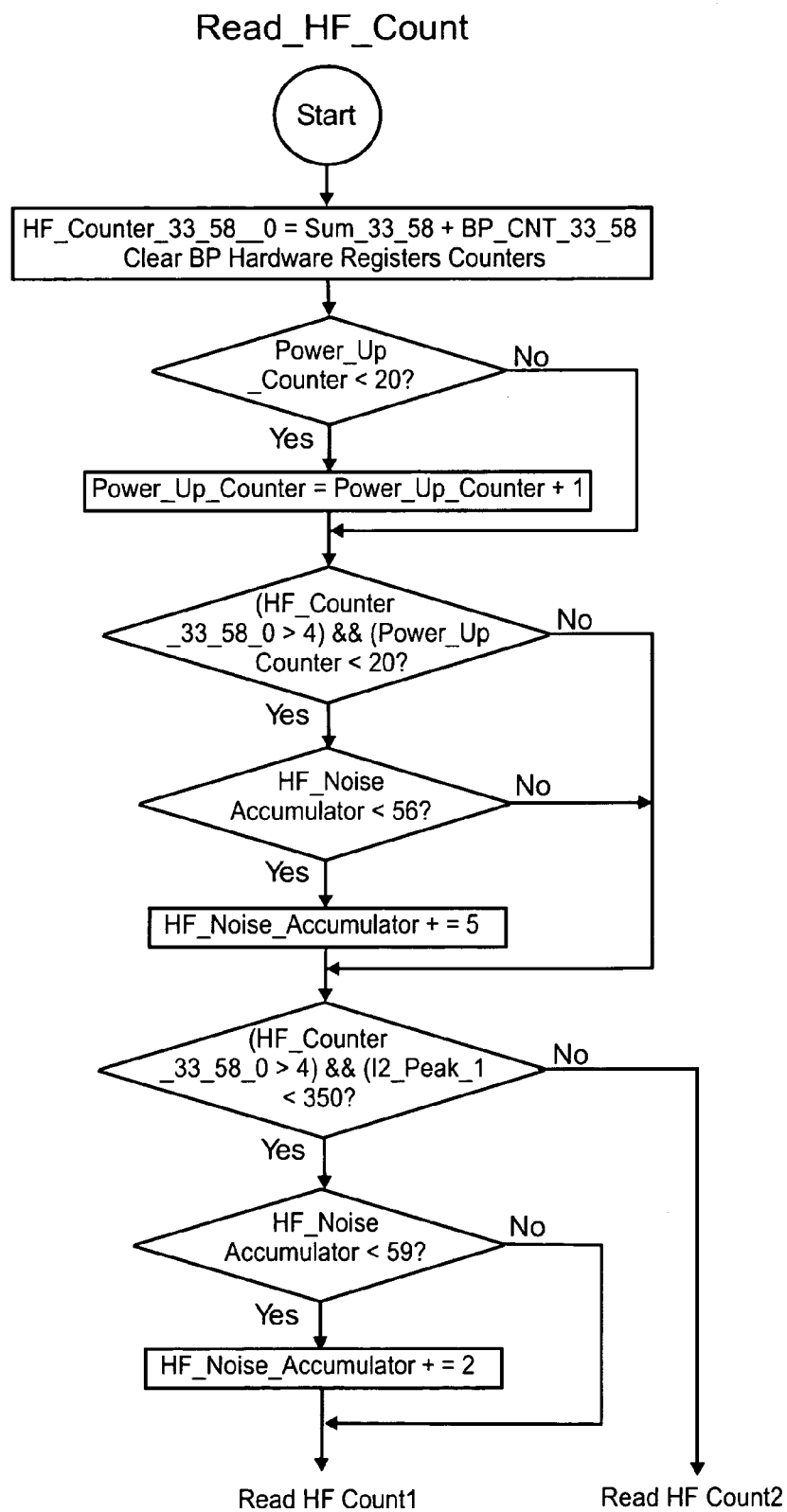
FIGS. 22A and 22B show a flowchart showing operation of a read HF count program module.
Figure 22B:
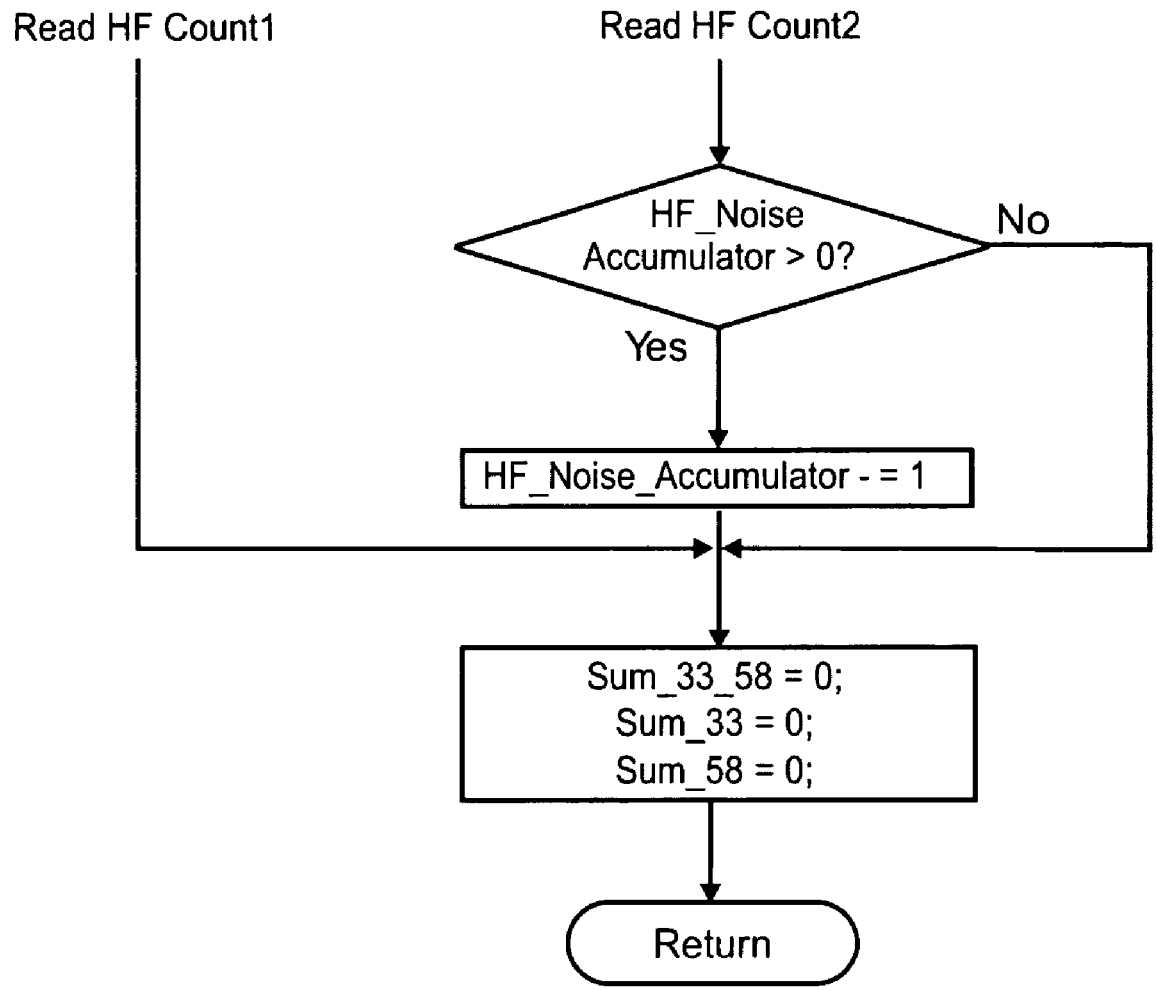

The read HF count module 288 is shown in FIGS. 22A and 22B. This module essentially checks various counters including the HF counter, the HF noise accumulator counter and power up counter and increments counters including the power up counter and HF noise accumulator counter as indicated. At the end of the module the "sum 3358," "sum 33" and "sum 58" counters are reset to zero.

Figure 23:
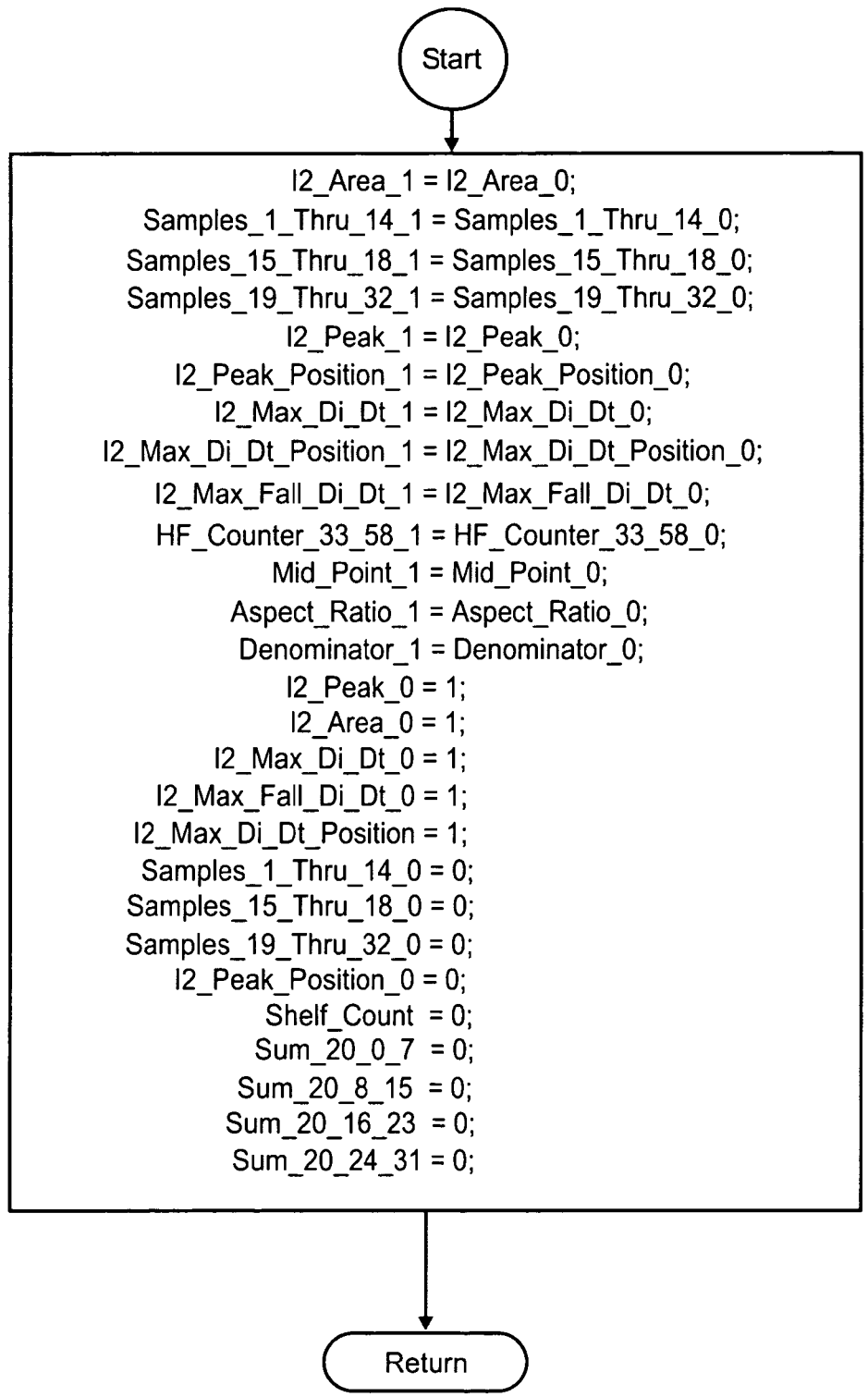
FIG. 23 is a flowchart showing operation of a store half cycle results program module.

Finally, FIG. 23 shows the store half cycle results module 290. This module again sets values into various registers or counters as indicated.

Figure 24:
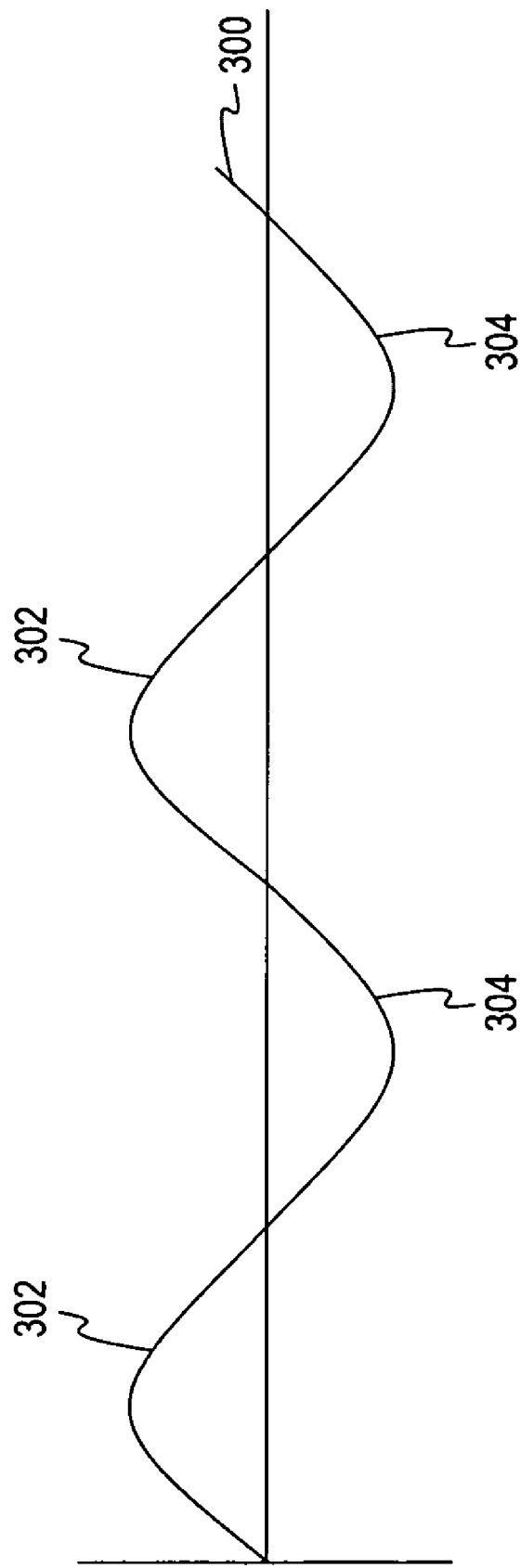
FIG. 24 is a graph illustrating a sample sine wave according to one embodiment of the present invention.

Turning now to FIGS. 24-27, additional algorithms that are used in conjunction with the slope change counters described above will be illustrated. In FIG. 24, a sample sine wave 300 is illustrated. The sine wave 300 includes maximums (peaks) 302 and minimums (valleys) 304. In one embodiment of the present invention, an algorithm measures the distance between each peak 302 and valley 304. If the distance between each peak and valley is the same, then the load current fluctuations are caused by the load, and not arcing, since arcing is a random event and would not create such a pattern.

Figure 25:
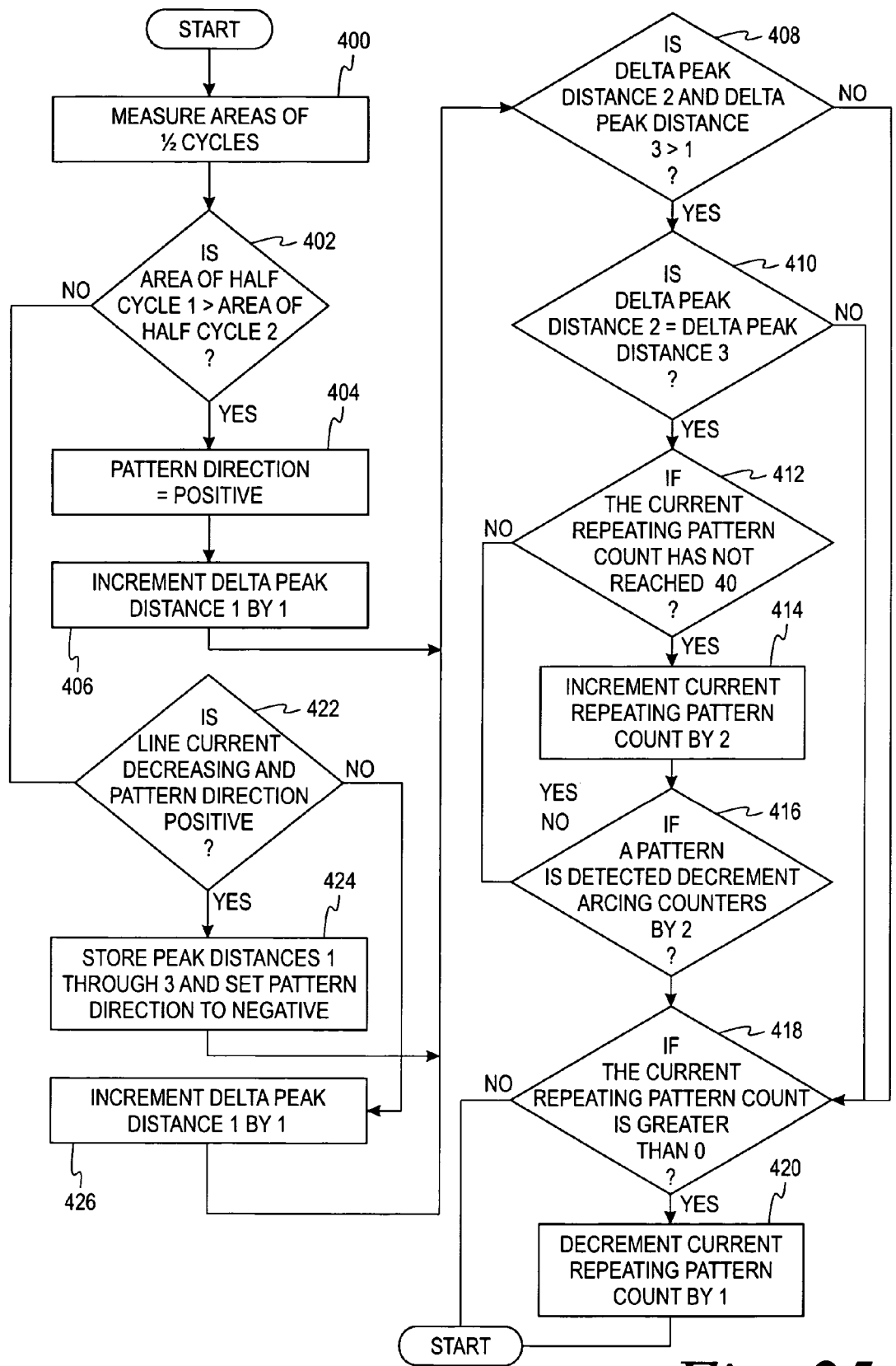
FIG. 25 is a flowchart showing operation of a pattern recognition program module according to one embodiment of the present invention.

Turning now to FIG. 25, a flow chart illustrating the pattern recognition method of FIG. 24 will be described. At step 400, areas of two half cycles of the current are measured. If, at step 402, it is determined that the area of the first half cycle is greater than the area of the second half cycle, then, at step 404, the pattern direction is set to positive. The pattern direction identifies whether the current is increasing or decreasing. If the pattern direction is set to positive, it indicates that the current is increasing. Next, a delta peak distance 1 is incremented by 1 at step 406. The delta peak distances (labeled in the chart as delta peak distance 1, delta peak distance 2, and delta peak distance 3) are indicators of the distance between the two peak loads. In other words, it is the distance between the peaks of the half cycles. Next, at step 408 it is determined whether a delta peak distance 2 and delta peak distance 3 are greater than 1. If the answer is yes, then at step 410, it is determined whether delta peak distance 2 is equal to delta peak distance 3. If the two are equal, then at step 412, it is determined whether the current repeating pattern count has reached 40. If it has not, then at step 414, the current repeating pattern count is incremented by two and the process proceeds to step 416.

If the current repeating pattern count has reached 40 (or after the repeating pattern count has been incremented by two), then at step 416, the arcing counters are decremented by two. Next, at step 418, it is determined whether the current repeating pattern is greater than zero. If it is, the process continues to step 420 and the current repeating pattern count is decremented by one and then the process ends. If the current repeating pattern count is not greater than zero, then the process ends.

Returning now to step 410, if the delta peak distance 2 is not equal to the delta peak distance 3, the process then advances to step 418 and proceeds as described above.

Similarly, at step 408, if the delta peak distance 2 and delta peak distance 3 are less than one, then the process also advances to step 418 and proceeds as described above.

Referring again to step 402, if the area of half cycle 1 is less than the area of half cycle 2, then the method proceeds to step 422 and it is determined whether the line current is decreasing whether the pattern direction is positive. If the answer is yes, then the peak distances 1 through 3 are stored and the pattern direction is set to negative at step 424. Next, the method advances to step 408, and continues as described above.

If, at step 422 the line current is not decreasing and the pattern direction is not positive, then the delta peak distance 1 is incremented by one at step 426 and the method proceeds to step 408 and progresses as described above.

Figure 26A:
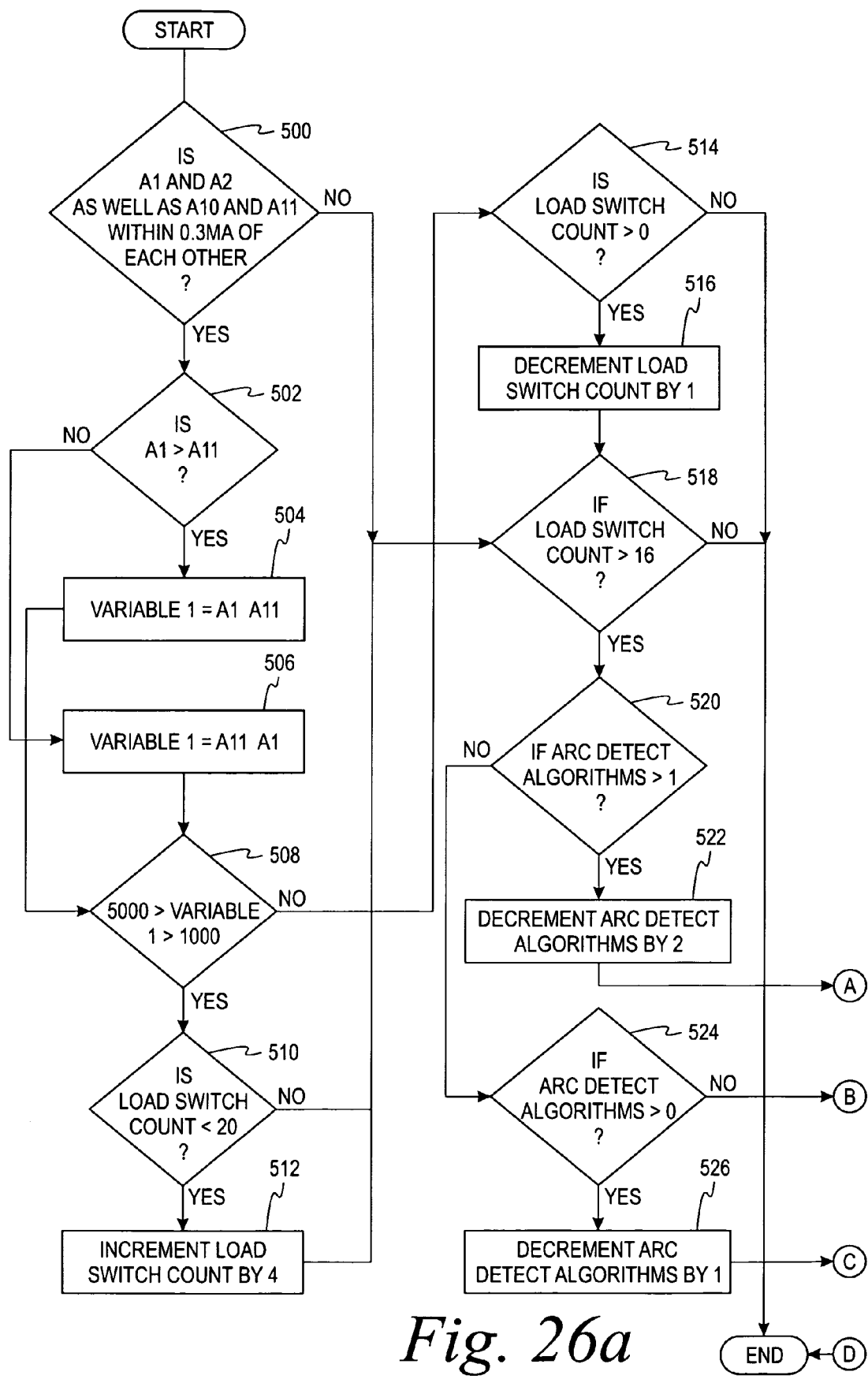
FIG. 26 is a flowchart showing operation of an on/off switching detection program module according to one embodiment of the present invention.
Figure 26B:
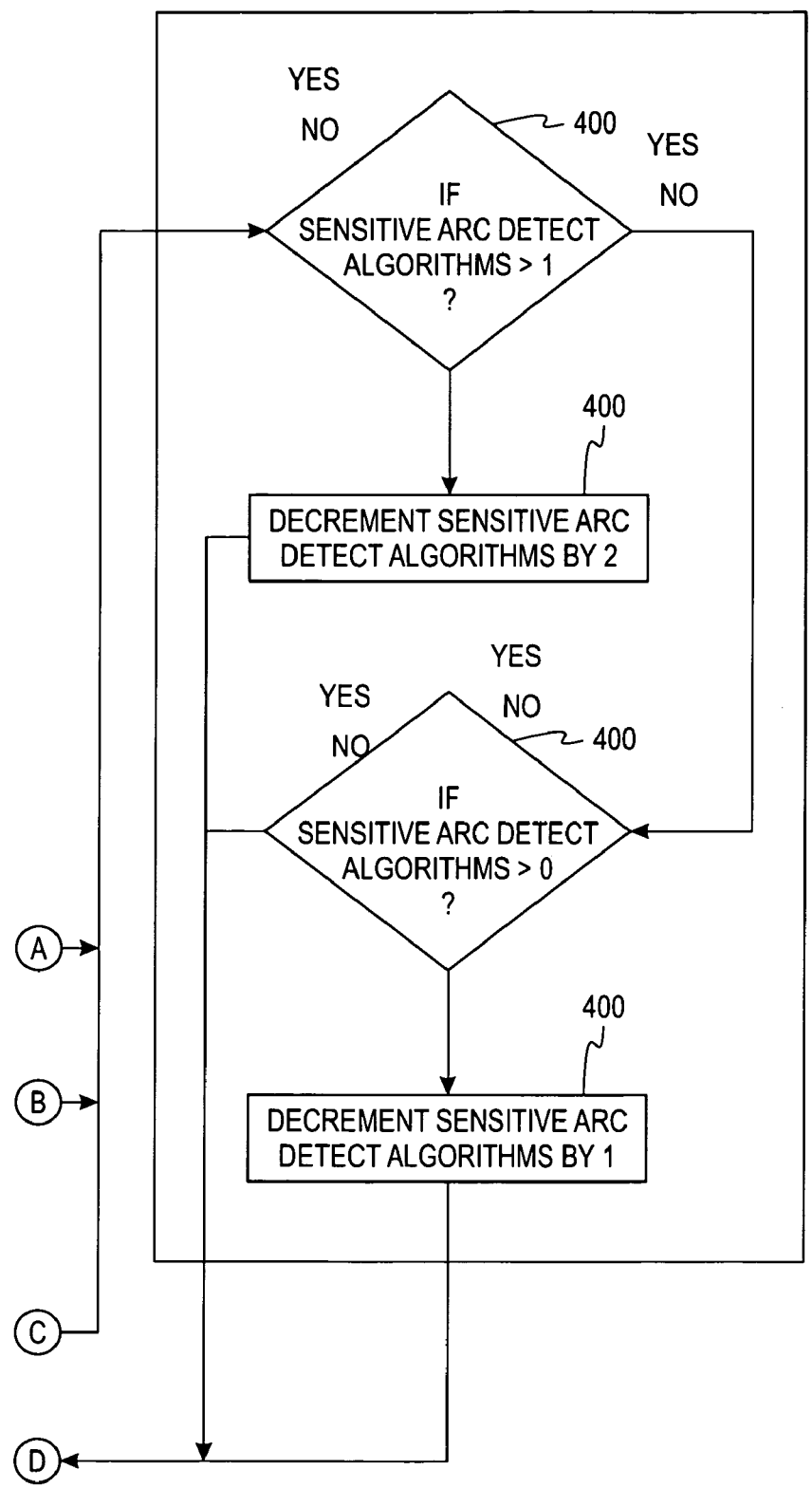

Turning now to FIG. 26, a flow chart of an on/off switching recognition method is illustrated. At step 500, it is determined if the areas of half cycles A1 and A2 as well as A10 and A11 are within a predetermined range (e.g., 0.3 mA). If they are, it is then determined wither A1 is greater than A11 at step 502. If A1 is greater than A11, then at step 504, a variable 1 (which is a variable that is pre-programmed) is set to A1-A11.

If A1 is not greater than A11, the method proceeds to step 506 where variable 1 is set to A11-A1. After variable 1 is set (in both steps 504 and 506), at step 508, it is determined whether variable 1 is between 5000 and 1000. If it is, then, at step 510, it is determined whether a counter that represents whether the load is switching on and off, hereinafter "the load switch count," is less than 20. If the load switch count is less than 20, then the load switch count is incremented by four (step 512). Next, at step 518 (which is also the next step if the load switch count is not less than 20), it is determined whether the load switch count is greater than 16. If it is not, the process ends. If the load switch count is greater then 16, then at step 520 it is determined whether arc detect algorithms, which are preprogrammed, are greater than 1. If it is, then at step 522, the arc detect algorithms are decremented by two and the process performs the sensitive arc algorithms, beginning at step 528. At step 528, it is determined whether the sensitive arc detect algorithms are greater than 1. If they are, then at step 530, the sensitive arc algorithms, which are also preprogrammed, are decremented by 2 and the program ends.

If the sensitive arc detect algorithms are not greater than 1, then it is determined at step 532 whether the sensitive arc detect algorithms are greater than 0. If not, then the program ends. If the sensitive arc detect algorithms are greater than 0, then at step 534 the sensitive arc detect algorithms are decremented by 1 and then the program ends.

Returning now to step 520 if the arc detect algorithms are less than or equal to 1, it is determined at step 524 if the arc detect algorithms are greater than zero. If not, the program proceeds to the sensitive are algorithms.

If the arc detect algorithms are greater than zero, then the arc detect algorithms are decremented by 1 at step 526. After step 526, the sensitive arc algorithms are initiated.

If, at step 508, the variable 1 is not within the range of 1000 and 5000, the method proceeds to step 514, where it is determined whether the load switch count is greater than zero. If it is not, the process ends. If it is, then, at step 516, the load switch count is decremented by 1, and the process advances to step 518 and proceeds as described above.

Returning back to step 500, if A1 and A2 as well as A10 and A11 are not within 0.3 mA, then the process continues at step 518.

Figure 27A:
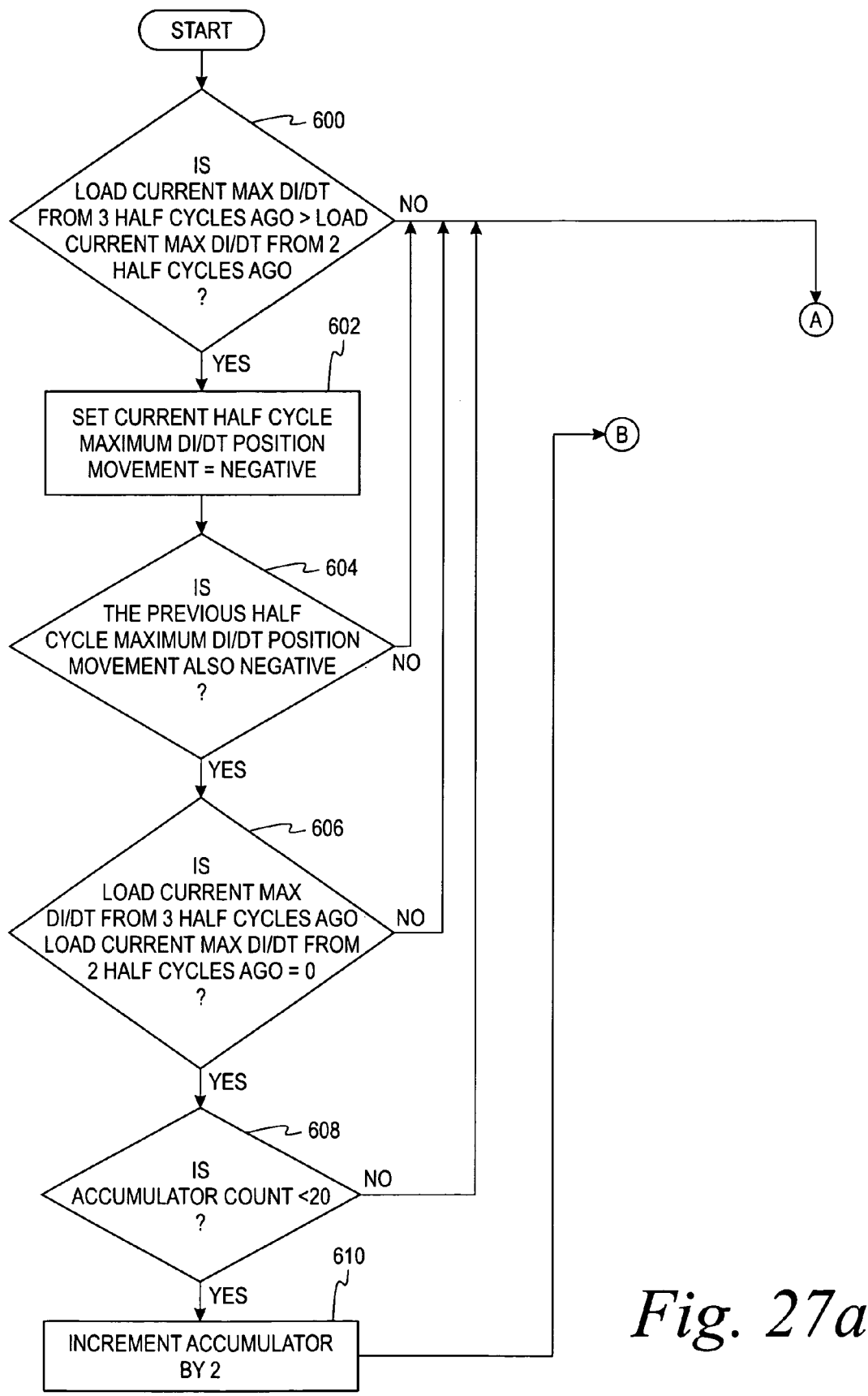
FIG. 27 is a flowchart showing operation of a thyristor sweep program module according to one embodiment of the present invention.
Figure 27B:
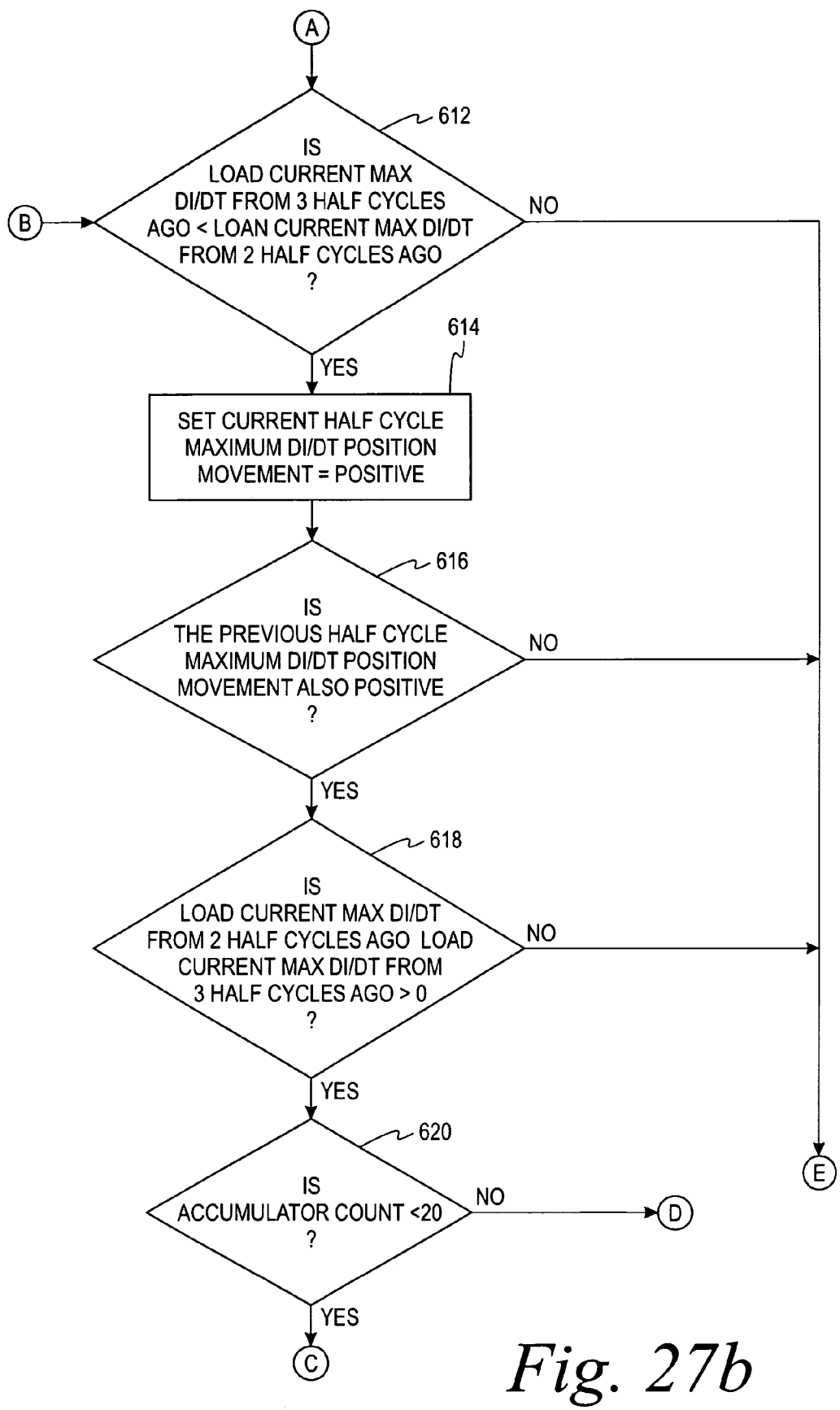
Figure 27C:
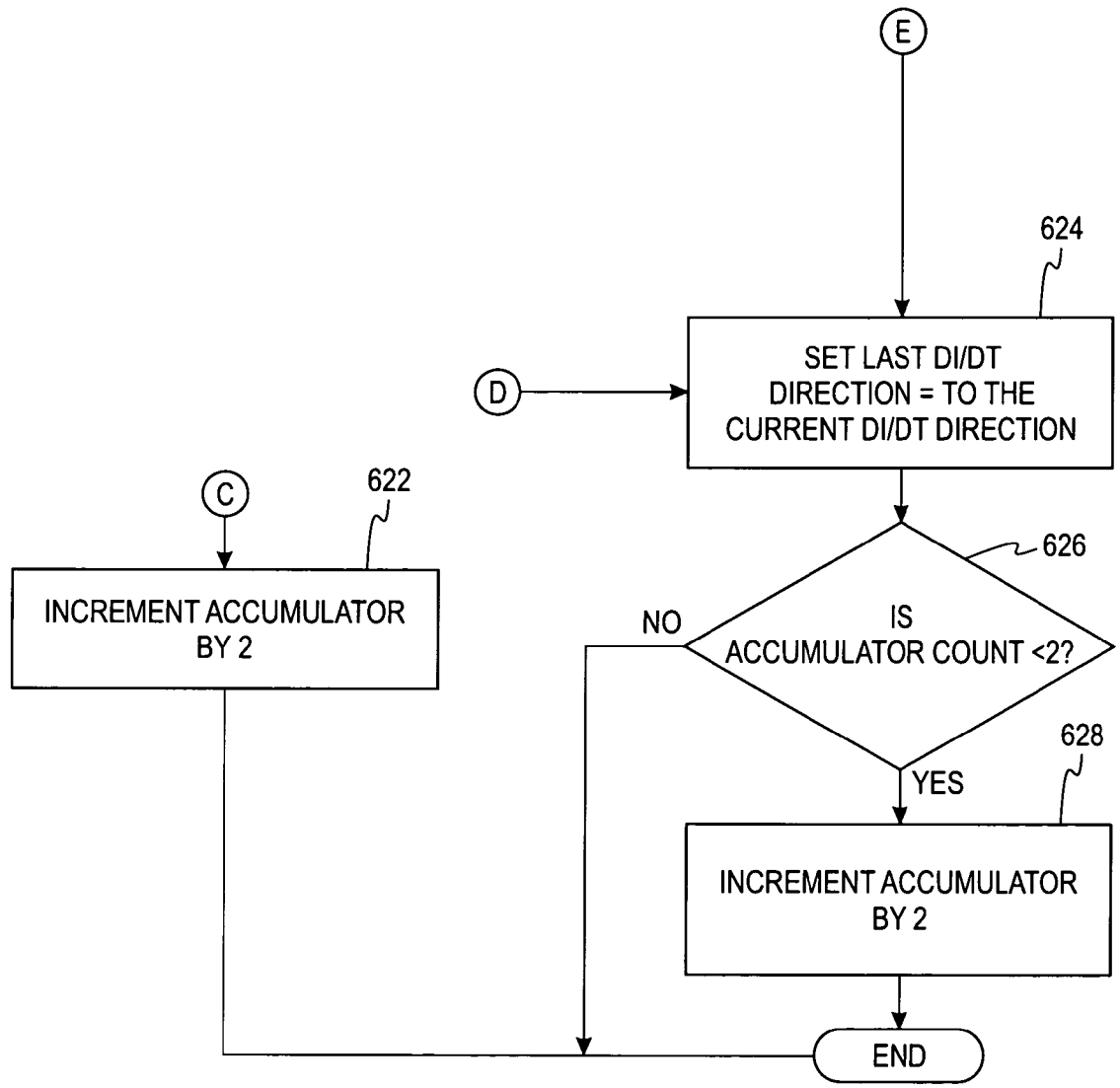

Turning now to FIG. 27, a method for a thyristor swap is illustrated. At step 600, it is determined whether the maximum change in current with respect to time from 3 half cycles in the past is greater than the maximum change in current with respect to time 2 half-cycles ago. If yes, then at 602, a variable relating to the current half cycle maximum change in current with respect time position movement is set to equal negative. Next, at step 604, it is determined whether the previous ½ cycle maximum change in current with respect to time position movement is also negative. If the answer is yes, at step 608, it is determined whether the accumulator count is less than 20. If yes, the accumulator count is incremented by 2 at step 610.

At step 612 (which is also the resultant step to negative responses at steps 600, 604, 606, 608), it is determined whether the maximum load current change with respect to time from 3½ cycles in the past is less than the maximum load current change with respect to time from 2½ cycles ago. If the response is yes, then at step 614, the current ½ cycle change in current with respect to time position movement is set to positive. At step 616, it is determined whether the previous ½ cycle change in current with respect to time position movement is also positive. If it is, then, at step 618, it is determined whether the maximum load current change with respect to time from 2½ cycles ago minus the maximum load current change with respect to time from 3½ cycles ago is greater than zero. If it is, then at step 620 it is determined whether the accumulator count is less than 20. If count is less than 20, then the accumulator is incremented by 2 and the program ends.

If the results at 612, 616, 618 or 620 are no, then at 624 the last change in current with respect to time direction is set to equal the current change in current with respect to time direction. Next at 626, it is determined whether the accumulator count is less than 20, if it is not, the program ends. If the count is less than 20, the accumulator is incremented by 2 and the process ends.

Figure 28:
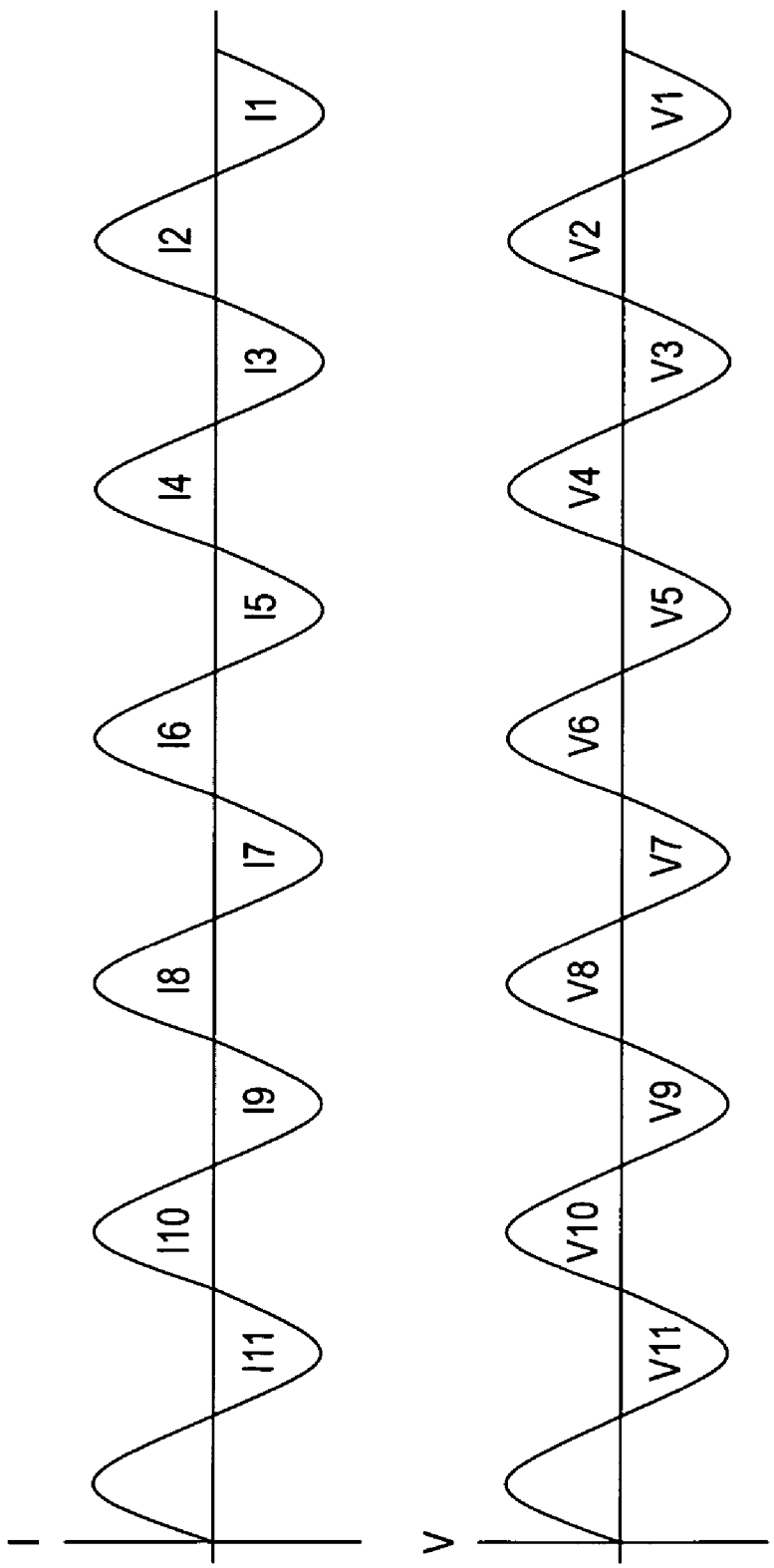
FIG. 28 is a graph illustrating sample current and voltage waveforms according to one embodiment of the present invention.
Figure 29:
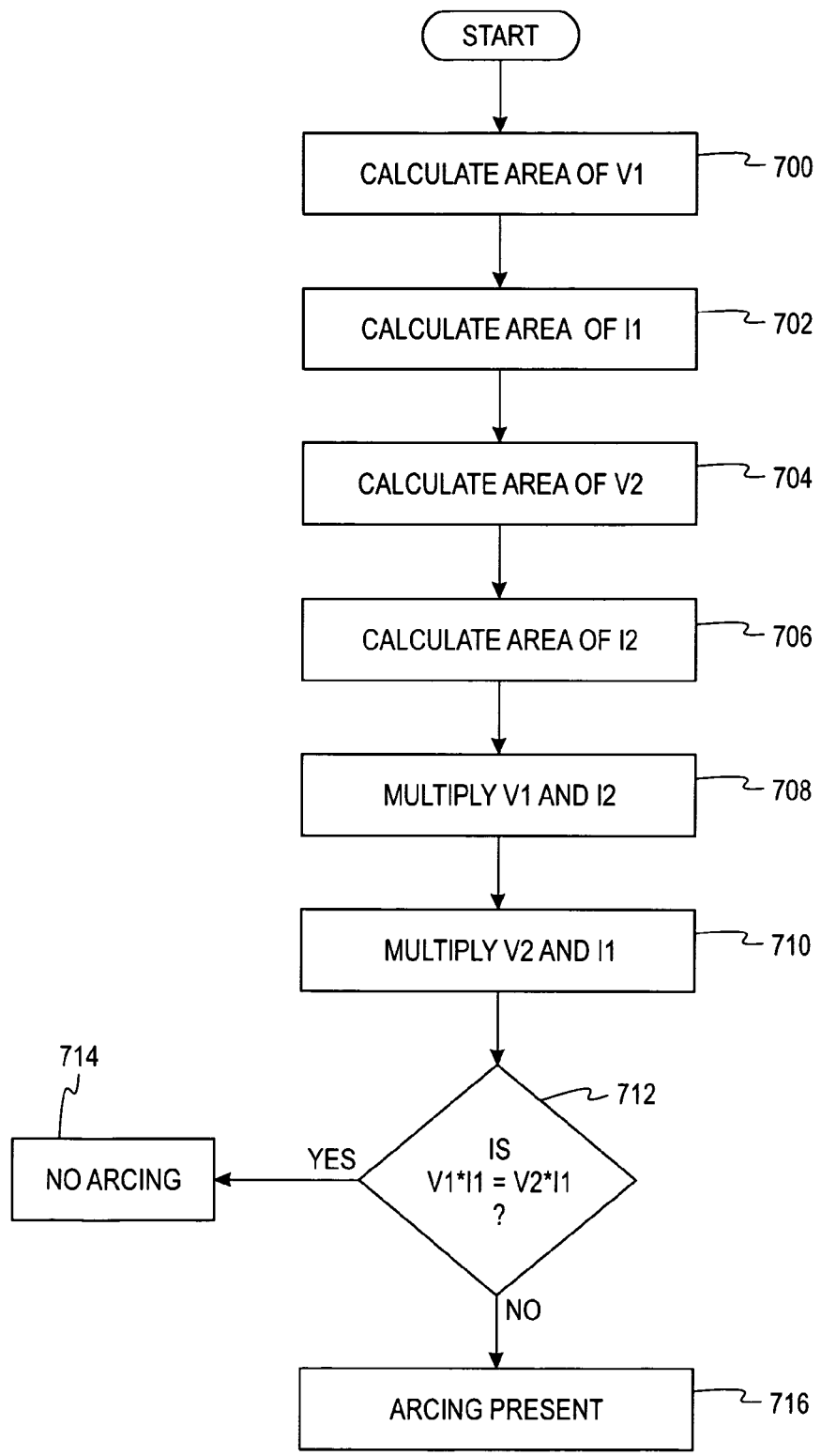
FIG. 29 is a flowchart showing operation of a normalization program module according to one embodiment of the present invention.

Turning now to FIGS. 28 and 29, normalization of load current and line voltage will be illustrated. FIG. 28 illustrates two sine waves. The first sine wave illustrates the current over time and the second illustrates voltage over time. According to one embodiment of the present invention, as shown in FIG. 29, the sum of the samples in a first voltage area V1 (FIG. 28) and the sum of the samples in a first current area I1 (FIG. 28) are obtained at steps 700 and 702. At steps 704 and 706, the sum of the samples in a second voltage area V2 (FIG. 28) and the sum of the samples in a second current area I2 (FIG. 28) are obtained. The sum of the samples in the voltage area V1 is then multiplied by the sum of the samples in the current area I2 at step 708. At step 710, the sum of the samples in the voltage area V2 are multiplied by the sum of the samples in the current area I1. At step 712, the product of V1 and I2 is compared to the product of V2 and I1. If the product of V1 and I2 is equal to the product of V2 and I1, then no arcing is determined to be present (step 714). If the product of V1 and I2 is not equal to the product of V2 and I1, then arcing is determined to be present (step 716).

In the embodiments described in FIGS. 28 and 29, the two adjacent areas are compared (V1 and V2). However, in other embodiments, any pair of areas may be compared.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of determining whether arcing is present in an electrical circuit comprising:
   sensing a change in current in the circuit and developing a corresponding input signal;
   analyzing the input signal to determine the presence of broadband noise in a predetermined range of frequencies, and producing a corresponding output signal;
   determining a type of load connected to the electrical circuit, based at least in part upon the input signal and the output signal;
   incrementing one or more of a plurality of counters in a predetermined fashion in accordance with the input signal and the output signal and determining whether an arcing fault is present based at least in part on the states of one or more of a plurality of counters; and
   decrementing one or more of the plurality of counters based upon a secondary analysis.

2. The method of claim 1 wherein the secondary analysis comprises measuring a distance between each of a plurality of half cycles of the input signal and comparing the distances between each of the plurality of half cycles.

3. The method of claim 2 wherein the secondary analysis further comprises decrementing one or more of the plurality of counters if the distance between each of the plurality of half cycles is the same.

4. The method of claim 1 wherein the secondary analysis comprises detecting a direction of movement of a maximum rise and comparing the direction of movement of a lower phase angle.

5. The method of claim 4 wherein the secondary analysis further comprises decrementing one or more of the plurality of counters if the direction of the rise and the direction of movement due to the sweep of the dimmer switch is the same.

6. The method of claim 1 wherein the secondary analysis comprises normalizing a voltage and a load current.

7. The method of claim 6 wherein the normalizing comprises:
   obtaining a first voltage, a first load current corresponding to the first voltage, a second voltage, and a second load current corresponding to the second voltages; and
   multiplying the first voltage by the second load current and multiplying the second voltage by the first load current.

8. The method of claim 7 wherein, in response to the product of the first voltage and the second load current being the same as the product of the second voltage and the first load current, the secondary analysis includes decrementing one or more of the plurality of counters.

9. The method of claim 1 wherein the secondary analysis comprises:
   measuring a plurality of load current areas;
   calculating a load current step from the plurality of load current areas;
   comparing the load current step to a predetermined value; and
   in response to the load current step being equal to or greater than the predetermined value, decrementing the counter by a predetermined number.

10. A system for determining whether arcing is present in an electrical circuit comprising:
    a sensor for sensing an alternating current in the circuit and developing a corresponding sensor signal;
    a circuit for analyzing the sensor signal to determine the presence of broadband noise in a predetermined range of frequencies, and producing a corresponding output signal;
    a controller for processing the sensor signal and the output signal to determine current characteristics and a type of load connected to the electrical circuit and to determine, using the load current characteristics and the presence of broadband noise, whether an arcing fault is present in the circuit; and
    at least one counter, wherein the at least one counter is incremented in a predetermined fashion in accordance with the input signal and the output signal and the at least one counter is adapted to be decremented based upon a secondary analysis;
    wherein the controller is adapted to determine whether an arcing fault is present based at least in part on the states of the at least one counter.

11. The system of claim 10, wherein the controller and the circuit for analyzing further are provided on a single ASIC.

12. The system of claim 10 wherein the controller increments one or more of a plurality of counters in a predetermined fashion in accordance with the sensor signal and the output signal and determines the type of load based at least in part on the states of one or more of the plurality of counters.

13. The system claim 10 wherein the controller increments one or more of a plurality of counters in accordance with the sensor signal and the output signal and periodically determines whether an arcing fault is present based at least in part on the states of one or more of the plurality of counters.

14. The system claim 13 wherein the controller periodically determines whether an arcing fault is present based at least in part on the states of one or more of the plurality of counters.

15. The system of claim 10, wherein the secondary analysis is selected from one of the group consisting of pattern recognition, on/off switching detection, thyristor sweep detection, and normalizing a line current or voltage.

16. A method of determining whether arcing is present in an electrical circuit in response to input signals, the input signals corresponding to an alternating current in the circuit and to the presence of broadband noise in a predetermined range of frequencies in the circuit, the method comprising:
    incrementing one or more of a plurality of counters in accordance with the input signals;

decrementing the one or more of the plurality of counters in accordance with a result of a secondary factor;

determining a type of load connected to the electrical circuit and whether an arcing fault is present using the states of one or more of the plurality of counters; and monitoring high frequency noise in the 20 KHz band for each ⅛ cycle of the alternating current.

17. The method of claim 16 and further including producing a trip signal in response to a determination that an arcing fault is present in the circuit.

18. The method of claim 16 wherein the counters are implemented in software.

19. The method of claim 16 wherein the secondary factors is at least one from the group consisting of pattern recognition, on/off switching detection, thyristor sweep detection, and normalizing a line current or voltage.

20. The method of claim 16 further including using the states of selected ones of the plurality of counters for determining the presence of selected sub-harmonics in the current and incrementing one or more others of the counters in response to the presence of the one or more of selected sub-harmonics.

* * * * *